US011832288B2

(12) United States Patent
Kimura et al.

(10) Patent No.: US 11,832,288 B2
(45) Date of Patent: Nov. 28, 2023

(54) COMMUNICATION CONTROL DEVICE, COMMUNICATION DEVICE, AND COMMUNICATION CONTROL METHOD

(71) Applicant: SONY GROUP CORPORATION, Tokyo (JP)

(72) Inventors: Ryota Kimura, Tokyo (JP); Sho Furuichi, Tokyo (JP); Hiroto Kuriki, Tokyo (JP); Shinichiro Tsuda, Tokyo (JP); Ryo Sawai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 165 days.

(21) Appl. No.: 17/441,501

(22) PCT Filed: Feb. 13, 2020

(86) PCT No.: PCT/JP2020/005653
§ 371 (c)(1),
(2) Date: Sep. 21, 2021

(87) PCT Pub. No.: WO2020/202828
PCT Pub. Date: Oct. 8, 2020

(65) Prior Publication Data
US 2022/0167357 A1 May 26, 2022

(30) Foreign Application Priority Data
Mar. 29, 2019 (JP) .................................. 2019-069155

(51) Int. Cl.
*H04B 7/185* (2006.01)
*H04B 7/204* (2006.01)
(Continued)

(52) U.S. Cl.
CPC ......... *H04W 72/541* (2023.01); *H04W 16/14* (2013.01); *H04W 72/044* (2013.01)

(58) Field of Classification Search
None
See application file for complete search history.

(56) References Cited

U.S. PATENT DOCUMENTS

| 6,879,829 B2 * | 4/2005 | Dutta | H04W 36/14 |
| | | | 455/12.1 |
| 7,308,229 B2 * | 12/2007 | Hane | H04N 7/20 |
| | | | 455/12.1 |

(Continued)

FOREIGN PATENT DOCUMENTS

| BR | 112015004485 A2 | 7/2017 |
| CA | 2884100 A1 | 3/2014 |

(Continued)

OTHER PUBLICATIONS

Extended European Search Report of EP Application No. 20783124.9, dated Mar. 25, 2022, 10 pages.

(Continued)

*Primary Examiner* — Tuan A Tran
(74) *Attorney, Agent, or Firm* — CHIP LAW GROUP

(57) ABSTRACT

A communication control device includes: a selection unit that selects, on the basis of a protection target range which is set to the air above a communication device of a second wireless system on the basis of a position of the communication device of the second wireless system which secondarily uses a frequency resource primarily used by a first wireless system, a communication device of the first wireless system as a target for calculating interference applied by the communication device of the second wireless system.

20 Claims, 51 Drawing Sheets

(51) Int. Cl.
*H04W 72/08* (2009.01)
*H04W 72/04* (2023.01)
*H04W 16/14* (2009.01)
*H04W 72/541* (2023.01)
*H04W 72/044* (2023.01)

(56) References Cited

U.S. PATENT DOCUMENTS

| | | | |
|---|---|---|---|
| 7,418,263 B2* | 8/2008 | Dutta | H04B 7/18541 455/430 |
| 7,962,134 B2* | 6/2011 | Wahlberg | H04B 7/195 455/12.1 |
| 8,121,605 B2* | 2/2012 | Monte | H04W 72/04 455/448 |
| 8,326,217 B2* | 12/2012 | Wahlberg | H04B 7/195 455/12.1 |
| 8,463,459 B2* | 6/2013 | Breshears | G01S 5/0081 342/353 |
| 8,472,879 B2* | 6/2013 | Hane | H04N 7/20 455/12.1 |
| 8,713,324 B2* | 4/2014 | Wahlberg | H04B 7/18567 455/12.1 |
| 9,820,159 B2* | 11/2017 | Ghasemzadeh | H04W 72/044 |
| 9,967,792 B2* | 5/2018 | Chan | H04L 5/003 |
| 10,484,929 B2* | 11/2019 | Jayawickrama | H04W 48/04 |
| 10,547,373 B2* | 1/2020 | Axmon | H04B 7/18523 |
| 10,680,703 B2* | 6/2020 | Smyth | H04B 7/0413 |
| 10,917,164 B2* | 2/2021 | Smyth | H04B 7/18519 |
| 10,958,335 B2* | 3/2021 | Kaen | H04W 84/06 |
| 10,965,364 B2* | 3/2021 | Smyth | H04W 24/08 |
| 11,101,877 B2* | 8/2021 | Buer | H04B 7/18515 |
| 2015/0237609 A1 | 8/2015 | Sun | |
| 2017/0339705 A1 | 11/2017 | Zhao et al. | |
| 2019/0007889 A1 | 1/2019 | Jayawickrama et al. | |
| 2019/0261282 A1 | 8/2019 | Furuichi | |

FOREIGN PATENT DOCUMENTS

| | | |
|---|---|---|
| CN | 103687030 A | 3/2014 |
| CN | 105657718 A | 6/2016 |
| CN | 108495319 A | 9/2018 |
| CN | 109891952 A | 6/2019 |
| EP | 2894910 A1 | 7/2015 |
| EP | 3220682 A1 | 9/2017 |
| EP | 3422756 A1 | 1/2019 |
| EP | 3531754 A1 | 8/2019 |
| JP | 2015-531554 A | 11/2015 |
| JP | 2016-019134 A | 2/2016 |
| JP | 6988814 B2 | 1/2022 |
| KR | 10-2015-0052231 A | 5/2015 |
| KR | 10-2017-0065679 A | 6/2017 |
| KR | 10-2017-0084022 A | 7/2017 |
| KR | 10-2019-0102095 A | 9/2019 |
| RU | 2598530 C1 | 9/2016 |
| RU | 2019110994 A | 10/2020 |
| TW | 201412168 A | 3/2014 |
| TW | 201817268 A | 5/2018 |
| WO | 2014/036856 A1 | 3/2014 |
| WO | 2016/074643 A1 | 5/2016 |
| WO | 2018/074177 A1 | 4/2018 |
| WO | 2019/026375 A1 | 2/2019 |

OTHER PUBLICATIONS

International Search Report and Written Opinion of PCT Application No. PCT/JP2020/005653, dated May 12, 2020, 08 pages of ISRWO.

Wireless Innovation Forum, "CBRS Certified Professional Installer Accreditation Technical Specification", Document WINNF-TS-0247, Version V1.0.0, Oct. 16, 2017, 18 pages.

Wireless Innovation Forum, "Signaling Protocols and Procedures for Citizens Broadband Radio Service (CBRS): Spectrum Access System (SAS)—Citizens Broadband Radio Service Device (CBSD) Interface Technical Specification", Document WINNIF-TS-0016, Version V1.2.1 3, Jan. 2018, 60 pages.

ECC Report 186, "Technical and operational requirements for the operation of white space devices under geo-location approach", Jan. 2013, 181 pages.

White Space Database Provider (WSDB) Contract, 2015, 125 pages.

Wireless Innovation Forum, "Signaling Protocols and Procedures for Citizens Broadband Radio Service (CBRS): Spectrum Access System (SAS)—SAS Interface Technical Specification", Document WINNF-TS-0096, Version 1.2.0, Oct. 20, 2017, 42 pages.

Wireless Innovation Forum, "Requirements for Commercial Operation in the U.S. 3550-3700 MHz Citizens Broadband Radio Service Band", Working Document WINNF-TS-0112, Version V1.4.1, Jan. 16, 2018, 77 pages.

"Coexistence Methods for Geo-location Capable Devices Operating under General Authorization", IEEE Std 302.19.1aTM-2017, 2017.

"Citizens Broadband Radio Service", 47 CFR, Part 96, Jun. 23, 2015, 27 pages.

Wireless Innovation Forum, "Operations for Citizens Broadband Radio Service (CBRS): Priority Access License (PAL) Database Technical Specification", Document WINNF-TS-0245, Version V1.0.0, Jul. 26, 2017, 10 pages.

Wireless Innovation Forum, "Test and Certification for Citizens Broadband Radio Service (CBRS); Conformance and Performance Test Technical Specification; SAS as Unit Under Test (UUT)", Document WINNF-TS-0061, Version V1.2.0, Jun. 6, 2018, 190 pages.

Wireless Innovation Forum, "Spectrum Sharing Committee Policy and Procedure Coordinated Periodic Activities Policy", WINNF-SSC-0008.

* cited by examiner

| EX-AMPLE | PROTECTION TARGET SELECTION | INTERFERENCE CONTROL |
|---|---|---|
| 1 | COMMUNICATION CONTROL DEVICE | COMMUNICATION CONTROL DEVICE |
| 2 | COMMUNICATION DEVICE OF SECONDARY SYSTEM | COMMUNICATION DEVICE OF SECONDARY SYSTEM |
| 3 | COMMUNICATION CONTROL DEVICE | COMMUNICATION DEVICE OF SECONDARY SYSTEM |
| 4 | COMMUNICATION DEVICE OF SECONDARY SYSTEM | COMMUNICATION CONTROL DEVICE |

COMMUNICATION CONTROL DEVICE, COMMUNICATION DEVICE, AND COMMUNICATION CONTROL METHOD

CROSS REFERENCE TO RELATED APPLICATIONS

This application is a U.S. National Phase of International Patent Application No. PCT/JP2020/005653 filed on Feb. 13, 2020, which claims priority benefit of Japanese Patent Application No. JP 2019-069155 filed in the Japan Patent Office on Mar. 29, 2019. Each of the above-referenced applications is hereby incorporated herein by reference in its entirety.

FIELD

The present invention relates to a communication control device, a communication device, and a communication control method.

BACKGROUND

The problem of depletion of radio resources (wireless resources) which can be allocated to wireless systems (wireless devices) has surfaced. Since all radio bands are already used by incumbent wireless systems (wireless devices), it is difficult to newly allocate radio resources to wireless systems. In this regard, in recent years, more effective use of radio resources by utilizing cognitive radio technology has begun to attract attention. In the cognitive radio technology, radio resources are generated by using the temporal and spatial free radio waves (White Space) of incumbent wireless systems.

CITATION LIST

Patent Literature

Patent Literature 1: JP 2016-19134 A

Non Patent Literature

Non Patent Literature 1: WINNF-TS-0247-V1.0.0 CBRS Certified Professional Installer Accreditation Technical Specification.
Non Patent Literature 2: WINNF-TS-0016-V1.2.1 Signaling Protocols and Procedures for Citizens Broadband Radio Service (CBRS): Spectrum Access System (SAS)—Citizens Broadband Radio Service Device (CBSD) Interface Technical Specification
Non Patent Literature 3: ECC Report 186, Technical and operational requirements for the operation of white space devices under geo-location approach, CEPT ECC, 2013 January
Non Patent Literature 4: White Space Database Provider (WSDB) Contract, available at https://www.ofcom.org.uk/_data/assets/pdf_file/0026/84077/white_space_database_contract_for_operational_use_of_wsds.pdf
Non Patent Literature 5: WINNF-TS-0096-V1.2.0 Signaling Protocols and Procedures for Citizens Broadband Radio Service (CBRS): Spectrum Access System (SAS)—SAS Interface Technical Specification
Non Patent Literature 6: WINNF-TS-0112-V1.4.1 Requirements for Commercial Operation in the U.S. 3550-3700 MHz Citizens Broadband Radio Service Band
Non Patent Literature 7: IEEE Std 802.19.1aTM-2017 "Coexistence Methods for Geo-location Capable Devices Operating under General Authorization"
Non Patent Literature 8: 47 C.F.R Part 96 Citizens Broadband Radio Service, https://www.ecfr.gov/cgi-bin/text-idx?node=pt47.5.96#se47.5.96
Non Patent Literature 9: WINNF-TS-0245-V1.0.0 Operations for Citizens Broadband Radio Service (CBRS): Priority Access License (PAL) Database Technical Specification
Non Patent Literature 10: WINNF-TS-0061-V1.2.0 Test and Certification for Citizens Broadband Radio Service (CBRS); Conformance and Performance Test Technical Specification; SAS as Unit Under Test (UUT)
Non Patent Literature 11: WINNF-SSC-0008 Spectrum Sharing Committee Policy and Procedure Coordinated Periodic Activities Policy

SUMMARY

Technical Problem

However, the effective use of radio resources is not necessarily realized simply by using free radio waves. For example, in order to realize effective use of radio resources, it is necessary to efficiently distribute free radio waves to wireless systems (wireless devices), but it is not easy to efficiently distribute free radio waves in the middle of a variety of use modes of radio waves.

In this regard, the present disclosure proposes a communication control device, a communication device, and a communication control method capable of realizing efficient use of radio resources.

Solution to Problem

To solve the above problem, a communication control device according to the present disclosure includes: a selection unit that selects, on a basis of a protection target range which is set to air above a communication device of a second wireless system on a basis of a position of the communication device of the second wireless system which secondarily uses a frequency resource primarily used by a first wireless system, a communication device of the first wireless system as a target for calculating interference applied by the communication device of the second wireless system.

DESCRIPTION OF EMBODIMENTS

Figure 1:
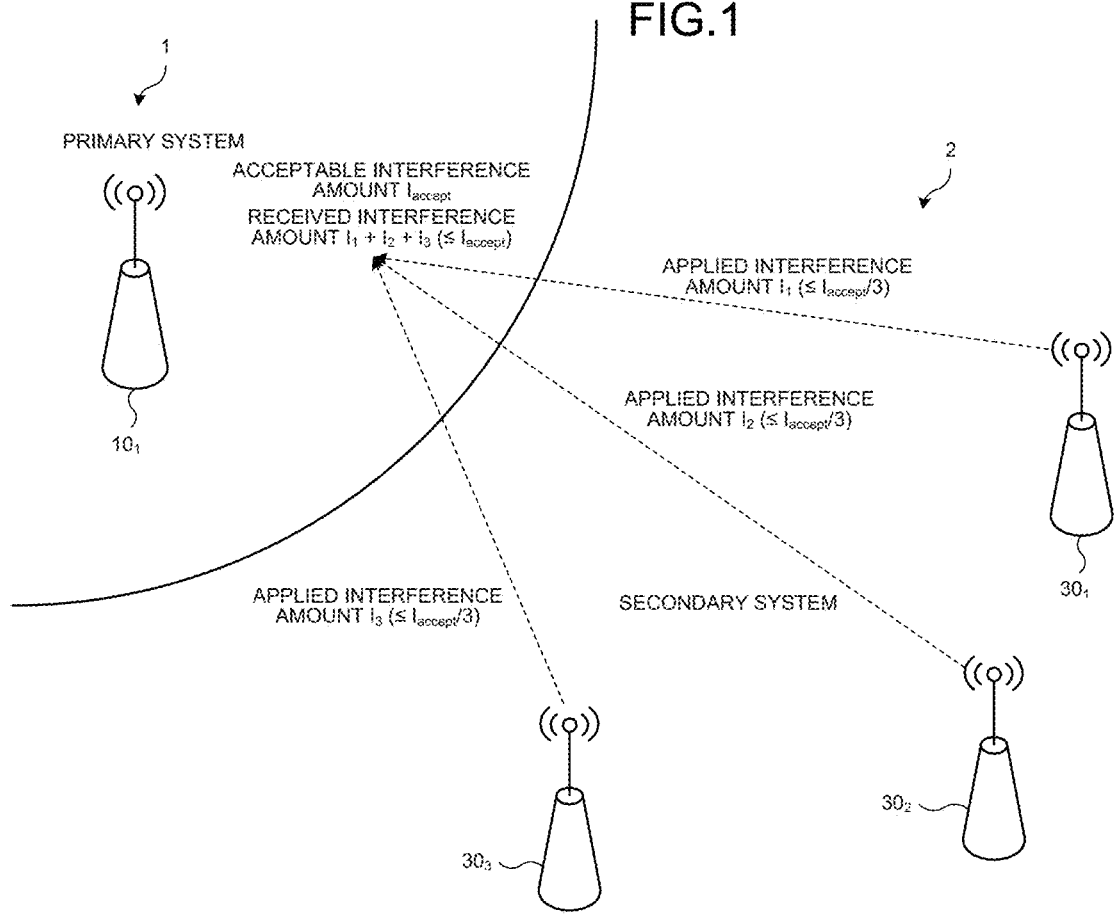
FIG. 1 is an explanatory diagram illustrating an example of distributing an interference margin to each communication device configuring a secondary system.

Hereinafter, embodiments of the present disclosure will be described in detail on the basis of the drawings. Incidentally, in each of the following embodiments, the same reference numerals are given to the same portions, and duplicate description will be omitted.

Further, in this specification and the drawings, a plurality of components having substantially the same functional configuration may be distinguished by adding different numbers after the same reference numerals. For example, a plurality of components having substantially the same functional configuration are distinguished to aerial communication devices $10A_1$ and $10A_2$ as necessary. Further, a plurality of components having substantially the same functional configuration are distinguished to terrestrial communication terminals $10B_1$ and $10B_2$ as necessary. For example, a plurality of components having substantially the same functional configuration are distinguished to terminal devices $20_1$ and $20_2$ as necessary. Further, a plurality of components having substantially the same functional configuration are distinguished to base station devices $30_1$ and $30_2$ as necessary. For example, a plurality of components having substantially the same functional configuration are distinguished to communication control devices $40_1$ and $40_2$ as necessary. However, in a case where it is not necessary to distinguish each of the plurality of components having substantially the same functional configuration, only the same reference numerals are given. For example, in a case where it is not necessary to distinguish the terminal devices $20_1$ and $20_2$, it is simply referred to as a terminal device 20. In a case where it is not necessary to distinguish the base station devices $30_1$ and $30_2$, it is simply referred to as a base station device 30. Further, in a case where it is not necessary to distinguish the communication control devices $40_1$ and $40_2$, it is simply referred to as a communication control device 40.

The present disclosure will be described according to the order of items described below.

1. Introduction
1-1. Control of wireless system for realizing spectrum sharing
1-2. Outline of this embodiment
1-3. As for terms regarding frequency and sharing
2. Configuration of communication system
2-1. Overall configuration of communication system
2-2. Configuration of terminal device
2-3. Configuration of base station device
2-4. Configuration of communication control device
2-5. Configuration of proxy device
3. Interference model
4. Primary system protection method
4-1. Interference margin simultaneous distribution type
4-2. Interference margin sequential distribution type
5. Explanation of various procedures
5-1. Registration procedure
5-2. Available spectrum query procedure
5-3. Spectrum grant procedure
5-4. Spectrum use notification
5-5. Supplement to various procedures
5-6. Procedures regarding terminal devices
5-7. Procedures occurring between communication control devices
6. Protection target selection
6-1. Operation subject of protection target selection and interference control
6-2. Selection of interference protection target for aerial communication device
6-3. Interference calculation
6-4. Reference points used for interference calculation
6-5. Notification and setting of communication parameters
7. Modification
7-1. Modification regarding system configuration
7-2. Another modification
8. Conclusion 1. Introduction In recent years, the problem of depletion of radio resources (for example, frequencies) which can be allocated to wireless systems has surfaced. However, since all radio bands are already used by incumbent wireless systems, it is difficult to allocate new radio resources. In this regard, in recent years, more effective use of radio resources by utilizing cognitive radio technology has begun to attract attention.

In the cognitive radio technology, radio resources are generated by utilizing the temporal and spatial free radio waves (White Space) of incumbent wireless systems (for example, dynamic spectrum sharing (DSA: dynamic spectrum access)). For example, in the United States, the legislation and standardization of a Citizens Broadband Radio Service (CBRS) which utilizes spectrum sharing technology is accelerating to aim to open the Federal use band (3.55-3.70 GHz) which overlaps with the frequency bands of 3GPP band 42, 43 worldwide to the general public.

Incidentally, the cognitive radio technology contributes not only to the dynamic spectrum sharing but also to the improvement of spectrum use efficiency by wireless systems. For example, in ETSI EN 303 387 and IEEE 802.19.1-2014, coexistence technology between wireless systems that use free radio waves is defined.

<1-1. Control of Wireless System for Realizing Spectrum Sharing>

Generally, in spectrum sharing, the protection of the wireless system (primary system) of the primary user licensed or authorized to use the frequency band is obliged by the national regulatory authority (NRA) of each country/region. Typically, an acceptable interference reference value of the primary system is set by the NRA, and for the wireless system (secondary system) of the secondary user, the interference caused by sharing is asked to be lower than the acceptable interference reference value.

In order to realize spectrum sharing, for example, a communication control device (for example, a frequency management database) controls the communication of the secondary system not to cause fatal interference to the primary system. The communication control device is a device which manages the communication of the communication device or the like. For example, the communication control device is a device (system) for managing radio resources (for example, frequency) such as Geo-location Database (GLDB) and Spectrum Access System (SAS). In the case of this embodiment, the communication control device corresponds to the communication control device 40 described later. The communication control device 40 will be described in detail later.

Here, the primary system is, for example, a system (for example, an incumbent system) that preferentially uses radio waves in a predetermined frequency band over other systems such as the secondary system. Further, the secondary system is, for example, a system that secondarily uses (for example, dynamic spectrum sharing) radio waves in the frequency band used by the primary system. Each of the primary system and the secondary system may be configured by a plurality of communication devices, or may be configured by one communication device. In the communication control device, an acceptable interference amount is distributed to one or more communication devices such that the aggregation of the interference (Interference Aggregation) of one or more communication devices configuring the secondary system to the primary system does not exceed the acceptable interference amount (also referred to as interference margin) of the primary system. At this time, the acceptable interference amount may be an interference amount predetermined by an operator of the primary system, a public institution which manages radio waves, or the like. In the following description, the term "interference margin" refers to the acceptable interference amount. Further, the aggregation of the interference may be referred to as an aggregated applied interference power.

FIG. 1 is an explanatory diagram illustrating an example of distributing the interference margin to each communication device configuring the secondary system. In the example of FIG. 1, a communication system 1 is the primary system, and a communication system 2 is the secondary system. The communication system 1 includes a communication device $10_1$ and the like. Further, the communication system 2 includes base station devices $30_1$, $30_2$, $30_3$, and the like. Incidentally, in the example of FIG. 1, the communication system 1 includes only one communication device 10, but the communication system 1 may have a plurality of communication devices 10. Further, in the example of FIG. 1, the communication system 2 includes three base station devices 30, but the number of the base station devices 30 included in the communication system 2 may be less than or more than three. Further, the wireless communication device included in the communication system 2 does not necessarily have to be the base station device. Incidentally, in the example of FIG. 1, only one primary system (the communication system 1 in the example of FIG. 1) and one secondary system (the communication system 2 in the example of FIG. 1) are described, but a plurality of the primary systems and a plurality of the secondary systems may be provided.

Each of the communication device $10_1$ and the base station devices $30_1$, $30_2$, and $30_3$ can transmit and receive radio waves. The amount of interference allowed by the communication device $10_1$ is $I_{accept}$. Further, the amounts of the interferences applied by the base station devices $30_1$, $30_2$, and $30_3$ to a predetermined protection point of the communication system 1 (primary system) are the applied interference amounts $I_1$, $I_2$, and $I_3$, respectively. Here, the protection point is an interference calculation reference point for protection of the communication system 1.

The communication control device distributes the interference margin $I_{accept}$ to a plurality of base station devices 30 such that the interference aggregation (received interference amount $I_1+I_2+I_3$ illustrated in FIG. 1) with a predetermined protection point of the communication system 1 does not exceed the interference margin $I_{accept}$. For example, the communication control device distributes the interference margin $I_{accept}$ to each base station device 30 such that each of the applied interference amounts $I_1$, $I_2$, and $I_3$ is $I_{accept}/3$. Alternatively, the communication control device distributes the interference margin $I_{accept}$ to each base station device 30 such that each of the applied interference amounts $I_1$, $I_2$, and $I_3$ is $I_{accept}/3$ or less. Of course, a method of distributing the interference margin is not limited to this example.

The communication control device calculates a maximum transmission power (hereinafter, referred to as a maximum acceptable transmission power) allowed for each base station device 30 on the basis of distributed interference amount (hereinafter, referred to as a distributed interference amount). For example, the communication control device calculates the maximum acceptable transmission power of each base station device 30 by back-calculating from the distributed interference amount on the basis of a propagation loss, an antenna gain, and the like. Then, the communication control device notifies each base station device 30 of the calculated maximum acceptable transmission power information.

<1-2. Outline of this Embodiment>

Due to the evolution of the cognitive radio technology, attention is being paid to spectrum sharing (Dynamic Spectrum Access) of sharing overlapping frequencies among a plurality of communication systems having different priorities for spectrum use.

In the spectrum sharing, a method may be adopted in which communication parameters such as the frequency band, transmission power, transmission filter, and wireless access method to be used by the communication system are centrally managed by a database device. Such databases are used in the form of GLDB and SAS in TV White Spaces in the United Kingdom and the United States, and CBRS in the United States.

One of the roles of the database is to avoid/reduce the interference applied by communication systems with low priority (Secondary System and the like) to communication systems (Primary System, Incumbent System, and the like) with high priority in a certain frequency band.

In Patent Literature 1 above, a mechanism is disclosed in which whether or not the secondary system may secondarily use the frequency preferentially allocated to the primary system in terms of location and space is determined by using the position information (a latitude, a longitude, an altitude, and the like) of the communication device of the primary system, the position information of the communication device of the secondary system, and the assumed radio wave propagation characteristics in order to avoid/reduce fatal interference of the database device with the communication device of the primary system.

However, in the above-described Patent Literature 1, only the feasibility (OK/NG) of the secondary frequency use of the secondary system is determined, and a more detailed determination is not conducted. This means that there is a possibility that the operation of the secondary system is not permitted even in a place/space where the spectrum sharing between the secondary system and the primary system can be realized by adjusting the communication parameters of the secondary system in actuality. In other words, there is a concern that the improvement of utilization efficiency of finite frequency resources is hindered.

In this regard, in this embodiment, the communication control device (for example, a SAS) selects which aerial communication device of the primary system is necessarily considered as the protection target of interference from the communication device of the secondary system. The "interference" here refers to, for example, interference from a single communication device or aggregated interference from a plurality of communication devices. Further, the interference with the aerial communication device is, for example, the interference with a communication link of a terrestrial communication device (a terrestrial terminal device and a terrestrial fixed communication device) of the primary system to the aerial communication device, or the interference of the secondary system with a communication link between the aerial communication devices.

Here, the selection of the aerial communication device of the primary system is performed, as one of the purposes, such that the interference applied from the communication device of the secondary system to the aerial communication device of the primary system is controlled to a predetermined level or less.

When the interference is controlled to the predetermined level or less in this way, the opportunity to realize spectrum sharing between the secondary system and the primary system is promoted as compared with Patent Literature 1 described above, and thus it becomes possible to suppress that the improvement of utilization efficiency of finite frequency resources is hindered. As a result, the efficient use of radio resources is realized.

<1-3. As for Terms Regarding Frequency and Sharing>

Incidentally, in this embodiment, the primary system (communication system 1) and the secondary system (communication system 2) are assumed to be in a dynamic spectrum sharing environment. Hereinafter, this embodiment will be described by taking CBRS, which has been established by the Federal Communications Commission (FCC) in the United States, as an example. Incidentally, the communication system 1 and the communication system 2 of this embodiment are not limited to the CBRS.

Figure 2:
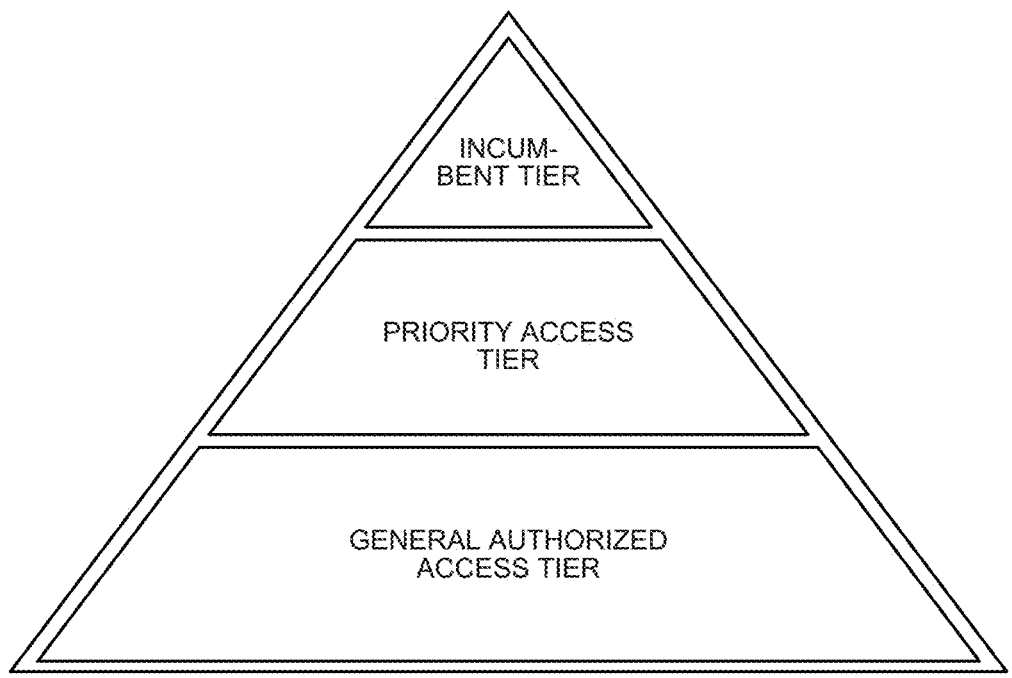
FIG. 2 is an explanatory diagram illustrating a hierarchical structure in CBRS.

FIG. 2 is an explanatory diagram illustrating a hierarchical structure in the CBRS. As illustrated in FIG. 2, each of the users in the frequency band is classified into one of three groups. This group is called "tier". Each of these three groups has a defined hierarchical structure configured by an incumbent tier, a priority access tier, and a general authorized access tier. In this hierarchical structure, the priority access tier is positioned above the general authorized access tier, and the incumbent tier is positioned above the priority access tier. Taking the CBRS as an example, the system (incumbent system) positioned in the incumbent tier becomes the primary system, and the system positioned in the general authorized access tier and the priority access tier becomes the secondary system.

The incumbent tier is a group of incumbent users in the shared frequency band. In the CBRS, the Department of Defense (DOD), fixed satellite operators, and Grandfathered Wireless Broadband Licensee (GWBL) are defined as the incumbent users. The "Incumbent Tier" is not required to avoid or suppress interference with "Priority Access Tier" and "General Authorized Access (GAA) Tier" with lower priority. Further, the "Incumbent Tier" is protected from the interference of the "Priority Access Tier" and "GAA Tier". That is, the user of the "Incumbent Tier" can use the frequency band without considering the existence of other groups.

The priority access tier is a group of users having a license called Priority Access License (PAL). It is required to avoid or suppress the interference with "Incumbent Tier" which has a higher priority than "Priority Access Tier", but it is not required to avoid or suppress the interference with "GAA Tier" which has a lower priority. Further, the "Priority Access Tier" is not protected from the interference of the "Incumbent Tier" having a higher priority but is protected from the interference of the "GAA Tier" having a lower priority.

The general authorized access tier (GAA Tier) is a group of all other users who do not belong to the "Incumbent Tier" and "Priority Access Tier" above. It is required to avoid or suppress the interference with the "Incumbent Tier" and "Priority Access Tier" having a higher priority. Further, the "GAA Tier" is not protected from the interference of the "Incumbent Tier" and the "Priority Access Tier" having a higher priority. That is, "GAA Tier" is a "tier" that legally requires opportunistic spectrum use.

Incidentally, the hierarchical structure is not limited to these definitions. The CBRS is generally called a 3-tier structure but may have a 2-tier structure. Typical examples include a 2-tier structure such as Licensed Shared Access (LSA) or TV band White Space (TVWS). The LSA has a structure equivalent to the combination of "Incumbent Tier" and "Priority Access Tier" above. Further, the TVWS adopts a structure equivalent to the combination of "Incumbent Tier" and "GAA Tier" above. Further, there may be four or more tiers. Specifically, for example, the intermediate tier corresponding to "Priority Access Tier" may be further prioritized. Further, for example, the "GAA Tier" may be prioritized in the same manner.

Figure 3:
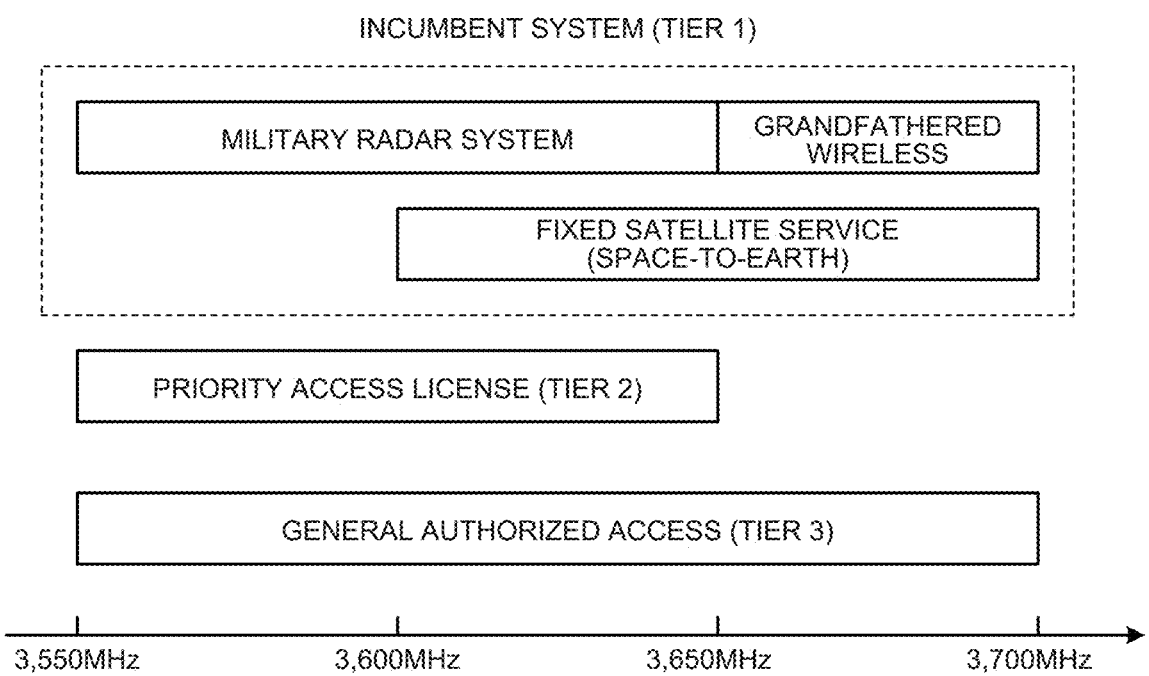
FIG. 3 is an explanatory diagram illustrating a band of the CBRS.

FIG. 3 is an explanatory diagram illustrating the band of the CBRS. Taking the above-described CBRS as an example, the primary system includes a Military Radar System, a Grandfathered Wireless System, or a Fixed Satellite Service (space-to-earth). Here, the military radar system is representatively a carrier-based radar. Further, the secondary system is a wireless network system configured by a base station called a Citizens Broadband Radio Service Device (CBSD) and an End User Device (EUD), and a terminal. The secondary system has a higher priority, and a priority access license (PAL) which allows licensed use of shared bandwidth and a general authorized access (GAA) that is equivalent to non-requirement of license are defined. Tier 1 illustrated in FIG. 3 corresponds to the incumbent tier illustrated in FIG. 2. Further, Tier 2 illustrated in FIG. 3 corresponds to the priority access tier illustrated in FIG. 2. Further, Tier 3 illustrated in FIG. 3 corresponds to the general authorized access tier illustrated in FIG. 2.

Incidentally, the primary system (communication system 1) of this embodiment is not limited to the example illustrated in FIG. 3. Another type of wireless system may be used as the primary system (communication system 1). For example, another wireless system may be used as the primary system depending on the country/region/frequency band to which the system is applied. For example, the primary system may be a television broadcasting system such as a Digital Video Broadcasting-Terrestrial (DVB-T) system. Further, the primary system may be a wireless system called a fixed system (FS). Further, the spectrum sharing may be performed in another frequency band. For example, typical examples include LSA and TVWS (TV band White Space). Further, the primary system may be a cellular communication system such as Long Term Evolution (LTE) or New Radio (NR). Further, the primary system may be an aeronautical radio system such as Aeronautical Radio Navigation Service (ARNS). Of course, the primary system is not limited to the above wireless system and may be another type of wireless system.

The free radio waves (White Space) used by the communication system 2 are not limited to the radio waves of the Federal use band (3.55-3.70 GHz). The communication system 2 may use radio waves in a frequency band different from the Federal use band (3.55-3.70 GHz) as free radio waves. For example, when the primary system (communication system 1) is a television broadcasting system, the communication system 2 may be a system which uses a TV white space as a free radio wave. Here, the TV white space refers to a frequency band that is not used by the television broadcasting system among the frequency channels allocated to the television broadcasting system (primary system). At this time, the TV white space may be a channel which is not used depending on a region.

The relationship between the communication system 1 and the communication system 2 is not limited to the spectrum sharing relationship in which the communication system 1 is the primary system, and the communication system 2 is the secondary system. The relationship between the communication system 1 and the communication system 2 may be a network coexistence relationship between the same or different wireless systems using the same frequency.

Generally, in spectrum sharing, the incumbent system which uses a target band is called the primary system, and the system of the secondary user is called the secondary system. However, in a case where this embodiment is applied to other than the spectrum sharing environment, these (the primary system and the secondary system) may be replaced with systems of other terms. For example, a macro cell in HetNet may be the primary system, and a small cell or a relay station may be the secondary system. Further, the base station may be the primary system, and the Relay UE or Vehicle UE which realizes D2D or V2X existing in the coverage thereof may be the secondary system. The base station is not limited to the fixed type and may be a portable type/mobile type. In such a case, for example, the communication control device provided by the present invention may be provided in the base station, the relay station, the Relay UE, or the like.

Incidentally, the term "frequency" which appears in the following description may be replaced with another term. For example, the term "frequency" may be replaced with the terms of "resource", "resource block", "resource element", "channel", "component carrier", "carrier", and "subcarrier", and a term having similar meaning. Incidentally, the frequency is a kind of radio resource. "Radio resource" can also be replaced with "frequency resource".

2. Configuration of Communication System

Hereinafter, a communication system 100 according to the embodiment of the present disclosure will be described. The communication system 100 includes the communication system 1 and the communication system 2. The communication system 1 (first wireless system) is a wireless communication system which performs wireless communication by using (primary use) a predetermined frequency band. Further, the communication system 2 (second wireless system) is a wireless communication system which performs wireless communication by secondarily using the frequency band used by the communication system 1. For example, the communication system 2 is a wireless communication system which performs dynamic spectrum sharing of the free radio waves of the communication system 1. The communication system 2 uses a predetermined radio access technology to provide a wireless service to a user or a device owned by the user.

Here, "primary use" means that a certain wireless system (for example, the communication system 1) uses a frequency resource exclusively allocated to the wireless system or a frequency resource preferentially allocated thereto. Further, "secondary use" means that a certain wireless system (for example, the communication system 2) uses a frequency resource exclusively allocated to another wireless system (communication system 1) or a frequency resource preferentially allocated thereto with a lower priority than the other wireless system (communication system 1).

Here, the communication systems 1 and 2 may be cellular communication systems such as Wideband Code Division Multiple Access (W-CDMA), Code Division Multiple Access 2000 (cdma2000), LTE, and NR. In the following description, "LTE" is assumed to include LTE-Advanced (LTE-A), LTE-Advanced Pro (LTE-A Pro), and Evolved Universal Terrestrial Radio Access (EUTRA). Further, "NR" is assumed to include New Radio Access Technology (NRAT) and Further EUTRA (FEUTRA).

NR is a radio access technology (RAT) of the next generation (fifth generation) of LTE. NR is a radio access technology that can support various use cases including Enhanced Mobile Broadband (eMBB), Massive Machine Type Communications (mMTC), and Ultra-Reliable and Low Latency Communications (URLLC).

Incidentally, the communication systems 1 and 2 are not limited to the cellular communication system. For example, the communication system 2 may be another wireless communication system such as a wireless Local Area Network (LAN) system, a television broadcasting system, an aeronautical radio system, or a space wireless communication system.

In this embodiment, it is assumed that the communication system 1 is the primary system, and the communication system 2 is the secondary system. As described above, the communication system 1 may be plural, and the communication system 2 may be plural. Incidentally, in the example of FIG. 1, the communication system 1 is configured by one communication device 10 (communication device $10_1$ illustrated in FIG. 1), but as described above, the communication system may be configured by a plurality of communication devices 10. The configuration of the communication device 10 may be the same as or different from the configuration of the terminal device 20 or the base station device 30 described later.

<2-1. Overall Configuration of Communication System>

The communication system 100 typically configured by the following entities:
Communication device (for example, a base station device and a proxy device)
Terminal device
Communication control device Incidentally, in the following description, the entities which serve as communication devices are the communication device 10, the base station device 30, and/or a proxy device 50. However, the entities which serve as communication devices are not limited to these devices and may be other communication devices (for example, the terminal device 20 and the communication control device 40).

Figure 4:
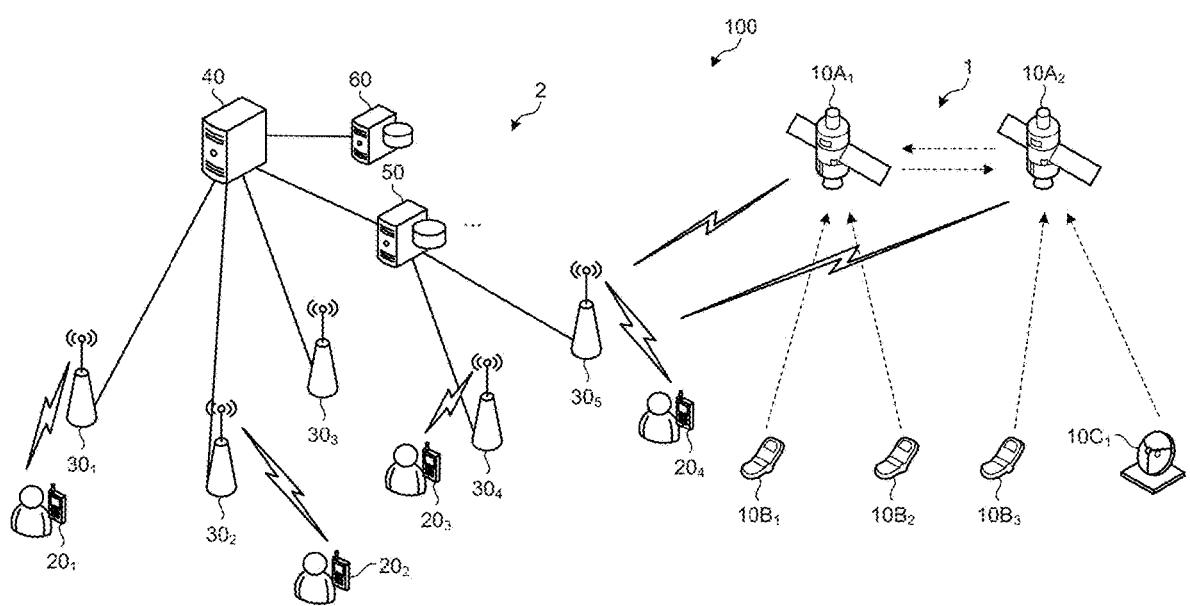
FIG. 4 is a diagram illustrating a configuration example of a communication system according to an embodiment of the present disclosure.

FIG. 4 is a diagram illustrating a configuration example of the communication system 100 according to the embodiment of the present disclosure. As described above, the communication system 100 includes the communication system 1 and the communication system 2. Incidentally, the device in the drawing can also be considered as a device in a logical sense. That is, a part of the devices in the same drawing may be realized by a virtual machine (VM), a container, a docker, and the like, which may be implemented on physically the same hardware.

The communication system 1 includes the aerial communication devices $10A_1$ and $10A_2$, terrestrial terminal devices $10B_1$, $10B_2$, and $10B_3$, and a terrestrial fixed communication device $10C_1$ as examples of the communication device 10. Here, examples of the aerial communication device 10A include a fixed satellite communication device, a mobile satellite communication device, and a drone communication device. Incidentally, in the example of FIG. 4, the communication system 1 includes two aerial communication devices 10A. However, the number of the aerial communication devices 10A included in the communication system 1 may be less than or more than two. Further, in the example of FIG. 4, the communication system 1 includes three terrestrial communication terminals 10B. However, the number of the terrestrial communication terminals 10B included in the communication system 1 may be less than or more than three. Further, in the example of FIG. 4, the communication system 1 includes one terrestrial fixed communication device 10C. However, the number of the terrestrial fixed communication devices 10C included in the communication system 1 may be more than one. In the case of the example of FIG. 4, it is also possible to regard each of the aerial communication devices $10A_1$ and $10A_2$, the terrestrial terminal devices $10B_1$, $10B_2$, and $10B_3$, and the terrestrial fixed communication device $10C_1$ as one communication system 1.

Examples of the communication system 2 include a terrestrial communication system (such as a 4G (LTE) or 5G (NR) cellular system and a wireless LAN system). However, the communication system 2 may include an aerial communication device. The communication device (the terminal device, the base station device, the access point device, or the like) of the communication system 2 is connected with the communication control device (Management Entity, Geolocation Database (GLDB), Spectrum Access System (SAS), or the like) 40 directly or via other communication devices (for example, a communication device (Serving Gateway (S-GW)), Packet Gateway (P-GW), Mobility Management Entity (MME), or the like) in a core network or a communication device (a server, a cloud, an edge, a router, a switch, or the like) in the Internet).

The invention is not limited to this example, and the terminal device 20 of the communication system 2 may be a device called Customer Premise Equipment (CPE) used for a wireless backhaul. In some cases (for example, during interference calculation), such a terminal device 20 may be treated as the base station device 30. That is, the CPE has the properties of both the terminal device 20 and the base station device 30.

The communication system 2 includes the terminal device 20, the base station device 30, the communication control device 40, and the proxy device 50. The communication system 2 provides a wireless service to a user or a device owned by the user by operating the devices (for example, the communication device such as the wireless communication device) configuring the communication system 2 in cooperation with each other. The wireless communication device is a device having a wireless communication function and corresponds to the terminal device 20 and the base station device 30 in the example of FIG. 4.

The communication systems 1 and 2 provide a wireless service to a user or a device owned by the user by operating the devices (for example, the communication device such as the wireless communication device) configuring the communication systems 1 and 2 in cooperation with each other. The wireless communication device is a device having a wireless communication function. In the example of FIG. 4, the aerial communication devices $10A_1$, $10A_2$, the terrestrial terminal devices $10B_1$, $10B_2$, and $10B_3$, the terrestrial fixed communication device $10C_1$, the terminal device 20, and the base station device 30 correspond to the wireless communication devices.

Incidentally, the communication control device 40 and the proxy device 50 may have a wireless communication function. In this case, the communication control device 40 and the proxy device 50 can also be regarded as the wireless communication device. In the following description, the wireless communication device may be simply referred to as a communication device. Incidentally, the communication device is not limited to the wireless communication device. For example, a device which does not have a wireless communication function and can only perform wired communication can be regarded as the communication device.

Incidentally, in this embodiment, the concept of "communication device" includes not only a portable mobile device (for example, the terminal device) such as a portable terminal, but also a device installed on a structure or a mobile body. The structure or the mobile body itself may be regarded as the communication device. Further, the concept of the communication device includes not only the terminal device but also the base station device and the relay device. The communication device is a type of a processing device and an information processing device. The description of "communication device" appearing in the following description can be appropriately replaced with "transmission device" or "reception device". Incidentally, in this embodiment, the concept of "communication" includes "broadcasting". In this case, the description of "communication device" can be appropriately replaced with "broadcasting device". Of course, the description of "communication device" may be appropriately replaced with "transmission device" or "reception device".

The communication system 2 may include a plurality of terminal devices 20, a plurality of base station devices 30, a plurality of communication control devices 40, and a plurality of proxy devices 50. In the example of FIG. 4, the communication system 2 includes terminal devices $20_1$, $20_2$, $20_3$, $20_4$, and so on as the terminal device 20. Further, in the example of FIG. 4, the communication system 2 includes base station devices $30_1$, $30_2$, $30_3$, $30_4$, $30_5$, and so on as the base station device 30. Further, in the example of FIG. 4, the communication system 2 includes only one communication control device 40. However, the number of the communication control devices 40 included in the communication system 2 may be more than one.

Incidentally, in the following description, the wireless communication device may be referred to as a wireless system. For example, each of the aerial communication devices $10A_1$ and $10A_2$, the terrestrial terminal devices $10B_1$, $10B_2$, and $10B_3$, and the terrestrial fixed communication device $10C_1$ is one wireless system. Further, each of the base station devices $30_1$ to $30_5$ is one wireless system.

Further, each of the terminal devices $20_1$ to $20_4$ is one wireless system. Incidentally, in the following description, one or more communication devices 10 included in the communication system 1 are regarded as the first wireless system. However, each of one or more communication devices 10 included in the communication system 1 or the communication system 1 itself may be regarded as the first wireless system. Further, in the following description, each of one or more base station devices 30 included in the communication system 2 is regarded as the second wireless system. However, the communication system 2 itself may be regarded as the second wireless system, and each of one or more terminal devices 20 included in the communication system 2 may be regarded as the second wireless system. When the communication control device 40 and the proxy device 50 have a wireless communication function, each of the communication control devices 40 or each of the proxy devices 50 may be regarded as the second wireless system.

Incidentally, the wireless system may be one system configured by a plurality of communication devices including at least one wireless communication device. For example, a system configured by one or more aerial communication devices 10A and one or more subordinate terrestrial communication terminals 10B, or one or more terrestrial fixed communication devices 10C may be regarded as one wireless system. Further, a system configured by one or more base station devices 30 and one or more subordinate terminal devices 20 may be regarded as one wireless system. Further, it is also possible to regard each of the communication system 1 and the communication system 2 as one wireless system. In the following description, a communication system configured by a plurality of communication devices including at least one wireless communication device may be referred to as a wireless communication system or simply a communication system. Incidentally, one system configured by a plurality of communication devices including one wireless communication device may be regarded as the first wireless system or the second wireless system.

Incidentally, in this embodiment, the system means a set of a plurality of components (devices, modules (parts), and the like). At this time, all the components configuring the system may be in the same housing or may not be in the same housing. For example, a plurality of devices housed in separate housings and connected via wired and/or wireless are one system. Further, one device in which a plurality of modules are housed in one housing is also one system.

[Terminal Device]

The terminal device 20 is a communication equipment having a communication function. The terminal device 20 is typically a communication equipment such as a smartphone. The terminal device 20 may be a user terminal such as a mobile phone, a smart device (a smartphone or a tablet), a wearable terminal, an Internet of Things (IoT) device, a Personal Digital Assistant (PDA), or a personal computer. The terminal device may be referred to as User Equipment, User Terminal, User Station, Mobile Terminal, Mobile Station, or the like.

The terminal device 20 may be capable of sidelink communication with another terminal device 20. The terminal device 20 may be able to use an automatic retransmission technique such as Hybrid Automatic Repeat reQuest (ARQ) (HARQ) when performing sidelink communication. Incidentally, the wireless communication (including the sidelink communication) used by the terminal device 20 may be wireless communication using radio waves or may be wireless communication (optical radio) using infrared rays or visible light.

The terminal device 20 may be a mobile device. Herein, the mobile device is a mobile wireless communication device. At this time, the terminal device 20 may be a wireless communication device installed on a mobile body or may be a mobile body itself. For example, the terminal device 20 may be a vehicle, such as a car, a bus, a truck, or a motorcycle, which moves on a road or a wireless communication device mounted on the vehicle. Incidentally, the mobile body may be a mobile terminal or may be a mobile body which moves on land (on the ground in a narrow sense), underground, on the water, or underwater. Further, the mobile body may be a mobile body, such as a drone or a helicopter, which moves in the atmosphere or may be a mobile body, such as an artificial satellite, which moves outside the atmosphere.

The terminal device 20 may connect a plurality of base station devices or a plurality of cells at the same time to perform communication. For example, in a case where one base station device supports a communication area via a plurality of cells (for example, pCell and sCell), with carrier aggregation (CA) technology, dual connectivity (DC) technology, or multi-connectivity (MC) technology, the plurality of cells are bundled so that communication can be performed between the terminal device 20 and the base station device 30. Alternatively, with the coordinated multi-point transmission and reception (CoMP) technology, the terminal device 20 and the plurality of base station devices 30 can communicate through the cells of the different base station devices 30.

Incidentally, the terminal device 20 does not have to be used by a person. The terminal device 20 may be a sensor installed in a machine in a factory or a building as in a so-called Machine Type Communication (MTC). Further, the terminal device 20 may be a Machine to Machine (M2M) device or an Internet of Things (IoT) device. Further, the terminal device 20 may be a device equipped with a relay communication function as represented by Device to Device (D2D) and Vehicle to everything (V2X). Further, the terminal device 20 may be an equipment called Client Premises Equipment (CPE) used in a wireless backhaul or the like. Further, the terminal device 20 may be a wireless communication device installed on a mobile body or may be a mobile body itself.

[Base Station Device]

The base station device 30 (second wireless system) is a wireless communication device which wirelessly communicates with the terminal device 20 or another communication device (another base station device 30 and another proxy device 50). The base station device 30 is a type of communication device. The base station device 30 is, for example, a device corresponding to a wireless base station (Node B, eNB, gNB, and the like) or a wireless access point. The base station device 30 may be a wireless relay station. The base station device 30 may be a road base station device such as a Road Side Unit (RSU). Further, the base station device 30 may be an optical extension device called a Remote Radio Head (RRH). In this embodiment, the base station of the wireless communication system may be referred to as the base station device. Incidentally, the radio access technology used by the base station device 30 may be a cellular communication technology or may be a wireless LAN technology. Of course, the radio access technology used by the base station device 30 is not limited to these and may be another radio access technology.

The base station device 30 does not necessarily have to be fixed and may be installed in a moving object such as a car. Further, the base station device 30 does not necessarily have to exist on the ground, and a communication device function may be provided in an object, such as an aircraft, a drone, a helicopter, and a satellite, which exists in the air or in space or an object, such as a ship and a submarine, which exists at sea or in the sea. In such a case, the base station device 30 can perform wireless communication with another communication device which is fixedly installed.

Incidentally, the concept of the base station device (also referred to as a base station) includes not only a donor base station but also a relay base station (also referred to as a relay station or a relay station device). The concept of the base station also includes an access point. Further, the concept of the base station includes not only a structure having a function of the base station but also a device installed in the structure.

The structure is, for example, a building such as an office building, a house, a steel tower, a station facility, an airport facility, a port facility, or a stadium. Incidentally, the concept of the structure includes not only buildings but also non-building structures such as tunnels, bridges, dams, walls, and iron pillars, and facilities such as cranes, gates, and windmills. Further, the concept of the structure includes not only structures on land (on the ground in a narrow sense) or underground, but also structures on the water such as piers and mega floats and underwater structures such as ocean observation facilities.

The base station device 30 may be a donor station or a relay station. Further, the base station device 30 may be a fixed station or a mobile station. The mobile station is a wireless communication device (for example, the base station device) configured to be movable. At this time, the base station device 30 may be a device installed on a mobile body or may be a mobile body itself. For example, a relay station device having mobility can be regarded as the base station device 30 as the mobile station. Further, a device, such as a vehicle, a drone, and a smartphone, which originally has mobility and is mounted with the functions (at least a part of the functions of the base station device) of the base station device also corresponds to the base station device 30 as the mobile station.

Herein, the mobile body may be a mobile terminal such as a smartphone or a mobile phone. Further, the mobile body may be a mobile body (for example, a vehicle such as a car, a bicycle, a bus, a truck, a motorcycle, a train, and a linear motor car) which moves on land (on the ground in a narrow sense) or may be a mobile body (for example, a subway) which moves underground (for example, in a tunnel).

The mobile body may be a mobile body (for example, a ship such as a passenger ship, a cargo ship, or a hovercraft) which moves on the water or may be a mobile body (for example, a submersible ship such as a submersible, a submarine, and an unmanned submarine) which moves underwater.

The mobile body may be a mobile body (for example, an aircraft such as an airplane, an airship, and a drone) which moves in the atmosphere or may be a mobile body (for example, an artificial object such as an artificial satellite, a spacecraft, a space station, and a probe) which moves outside the atmosphere. The mobile body which moves outside the atmosphere can be referred to as a space mobile body.

The base station device 30 may be a ground base station device (ground station device) installed on the ground. For example, the base station device 30 may be a base station device arranged in a structure on the ground or may be a base station device installed in a mobile body moving on the ground. More specifically, the base station device 30 may be an antenna installed in a structure such as a building and a signal processing device connected to the antenna. Of course, the base station device 30 may be a structure or a mobile body itself. "On the ground" is not only on land (on the ground in a narrow sense) but also on the ground in a broad sense including underground, water, and underwater.

Incidentally, the base station device 30 is not limited to the ground base station device. The base station device 30 may be a non-ground base station device (non-ground station device) capable of floating in the air or space. For example, the base station device 30 may be an aircraft station device or a satellite station device.

The aircraft station device is a wireless communication device, such as an aircraft, which can float in the atmosphere. The aircraft station device may be a device mounted on an aircraft or the like or may be an aircraft itself. Incidentally, the concept of the aircraft includes not only a heavy aircraft such as an airplane and a glider but also a light aircraft such as a balloon and an airship. Further, the concept of the aircraft includes not only the heavy aircraft and the light aircraft but also a rotorcraft such as a helicopter and an autogyro. Incidentally, the aircraft station device (or the aircraft on which the aircraft station device is mounted) may be an unmanned aerial vehicle such as a drone.

Incidentally, the concept of the unmanned aerial vehicle also includes an unmanned aircraft system (UAS) and a tethered UAS. Further, the concept of the unmanned aerial vehicle includes a light unmanned aircraft system (LTA: Lighter than Air UAS) and a heavy unmanned aircraft system (HTA: Heavier than Air UAS). In addition, the concept of the unmanned aerial vehicle also includes high altitude UAS platforms (HAPs).

The satellite station device is a wireless communication device which can float outside the atmosphere. The satellite station device may be a device mounted on a space mobile body such as an artificial satellite or may be a space mobile body itself. The satellite which serves as a satellite station device may be any satellite of a low earth orbiting (LEO) satellite, a medium earth orbiting (MEO) satellite, a geostationary earth orbiting (GEO) satellite, and a highly elliptical orbiting (HEO) satellite. Of course, the satellite station device may be a device mounted on a low earth orbiting satellite, a medium earth orbiting satellite, a geostationary earth orbiting satellite, or a highly elliptical orbiting satellite.

As described above, the base station device 30 may be a relay station device. The relay station device is, for example, an aviation station or an earth station. The relay station device can be regarded as a kind of the above-described relay device. The aviation station is a radio station installed on the ground or on a mobile body moving on the ground to communicate with an aircraft station device. Further, the earth station is a radio station positioned on the earth (including in the air) to communicate with a satellite station device. The earth station may be a large earth station or may be a small earth station such as Very Small Aperture Terminal (VSAT).

Incidentally, the earth station may be a VSAT controlled earth station (also referred to as a master station or a HUB station) or may be a VSAT earth station (also referred to as a slave station). Further, the earth station may be a radio station installed in a mobile body moving on the ground. For example, Earth Stations on board Vessels (ESV) is an earth station mounted on a ship. Further, the earth station may also include an aircraft earth station which is installed on an aircraft (including a helicopter) and communicates with a satellite station. Further, the earth station may include an aviation earth station which is installed on a mobile body moving on the ground and communicates with an aircraft earth station via a satellite station. Incidentally, the relay station device may be a portable mobile radio station which communicates with a satellite station or an aircraft station.

The size of the coverage of the base station device 30 also may be as large as a macro cell or as small as a picocell. Of course, the size of the coverage of the base station device 30 may be as extremely small as a femtocell. Further, in a case where the base station device 30 has a beamforming capability, a cell or a service area may be formed for each beam.

The base station device 30 can be used, operated, and/or managed by various entities. For example, it may be assumed that the base station device 30 is mobile network operators (MNOs), mobile virtual network operators (MVNOs), mobile virtual network enablers (MVNEs), and neutral host network (NHN) operators, enterprises, educational institutions (such as school corporations and local government education committees), real estate (such as buildings and condominiums) administrators, individuals, or the like. Of course, the entity of use, operation, and/or management of the base station device 30 is not limited to these.

The base station device 30 may be installed and/or operated by one operator or may be installed and/or operated by an individual. Of course, the installation/operation entity of the base station device 30 is not limited to these. For example, the base station device 30 may be jointly installed and operated by a plurality of operators or a plurality of individuals. Further, the base station device 30 may be a shared facility used by a plurality of operators or a plurality of individuals. In this case, the installation and/or operation of the facility may be carried out by a third party different from the user.

The base station device 30 operated by the operator is typically connected to the Internet via a core network. Further, the base station device 30 is operated, administrated, and maintained by a function called Operation, Administration & Maintenance (OA & M). Incidentally, the communication system 2 may have, for example, a network manager which integrally controls the base station device 30 in a network.

[Communication Control Device]

The communication control device 40 is a device which manages the base station device 30. For example, the communication control device 40 is a device which controls the wireless communication of the base station device 30. For example, the communication control device 40 is a device which determines communication parameters (also referred to as operation parameters) used by the base station device 30 and gives a permission or instruction to the base station device 30.

At this time, the communication control device 40 may be a network manager which integrally controls wireless devices in a network. Taking ETSI EN 303 387 and IEEE 802.19.1-2014 as an example, the communication control device 40 may be a control device, such as Spectrum Manager/Coexistence Manager, which controls radio wave interference between wireless apparatuses. Further, for example, Registered Location Secure Server (RLSS) defined by IEEE 802.11-2016 may also be the communication control device 40. Further, in a spectrum sharing environment, databases (database servers, devices, systems) such as Geolocation database (GLDB) and Spectrum Access System (SAS) may also be the communication control device 40.

Incidentally, when the communication system 2 is a cellular communication system, the communication control device 40 may be a device configuring the core network. For example, a core network CN is an Evolved Packet Core (EPC) or a 5G Core network (5GC). When the core network is an EPC, the communication control device 40 may be, for example, a device having a function as a Mobility Management Entity (MME). Further, when the core network is 5GC, the communication control device 40 may be, for example, a device having a function as an Access and Mobility Management Function (AMF). Incidentally, even in a case where the communication system 2 is a cellular communication system, the communication control device 40 does not necessarily have to be a device configuring the core network. For example, the communication control device 40 may be a device which functions as a Radio Network Controller (RNC).

Incidentally, the communication control device 40 may have a function of a gateway. For example, when the core network is an EPC, the communication control device 40 may be a device having a function as a Serving Gateway (S-GW) or a Packet Data Network Gateway (P-GW). Further, when the core network is a 5GC, the communication control device 40 may be a device having a function as a User Plane Function (UPF). Incidentally, the communication control device 40 does not necessarily have to be a device configuring the core network. For example, it is assumed that the core network is a core network of W-CDMA or cdma2000. At this time, the communication control device 40 may be a device which functions as a Radio Network Controller (RNC).

Basically, the control target of the communication control device 40 is the base station device 30, but the communication control device 40 may control the subordinate terminal device 20. Further, the communication control device 40 may control a plurality of secondary systems. In this case, the communication system 2 can be regarded as a system including a plurality of secondary systems.

Figure 5:
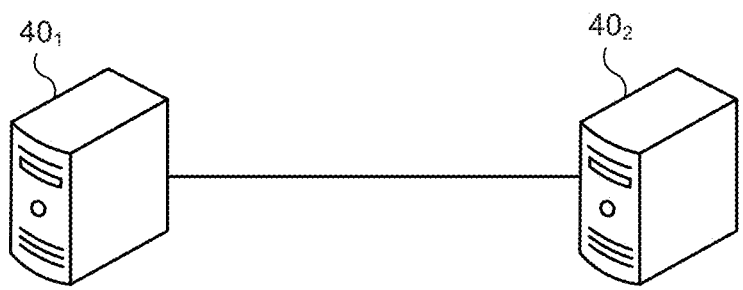
FIG. 5 is a diagram illustrating a model in which communication control devices are arranged in a distributed manner.

Further, a plurality of communication control devices 40 may exist in one communication system 2. FIG. 5 is a diagram illustrating a model in which the communication control devices 40 are arranged in a distributed manner. In this case, the plurality of communication control devices 40 (in the case of the example of FIG. 5, the communication control device $40_1$ and the communication control device $40_2$) exchange information of the managed base station devices 30 with each other and performs the allocation of necessary frequencies and the calculation of interference control.

Figure 6:
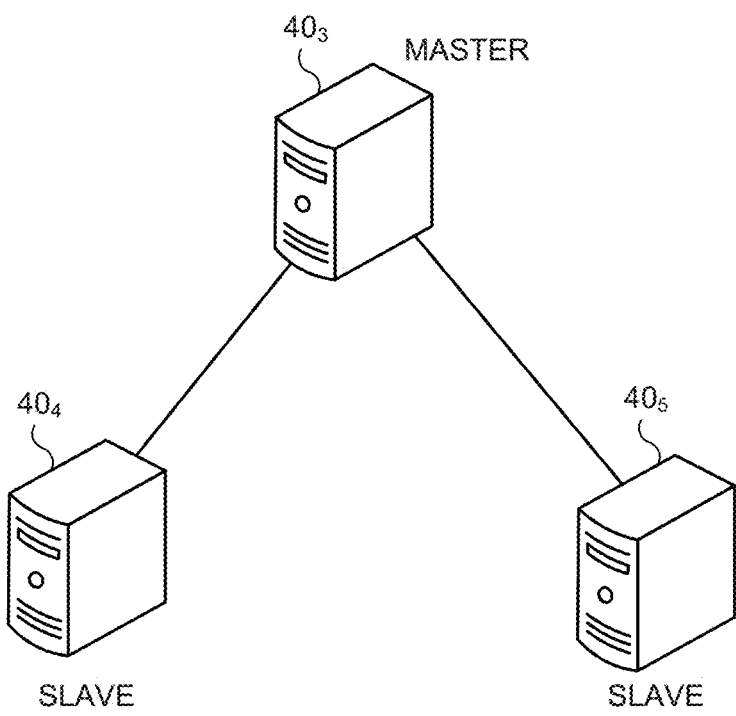
FIG. 6 is a diagram illustrating a model in which one communication control device centrally controls a plurality of communication control devices.

The communication control device 40 may be a master-slave type device. FIG. 6 is a diagram illustrating a model (so-called master-slave type model) in which one communication control device centrally controls a plurality of communication control devices. In the example of FIG. 6, the communication control device $40_3$ is a master communication control device, and the communication control devices $40_4$ and $60_5$ are slave communication control devices. In the case of such a system, the master communication control device can control a plurality of slave communication control devices and make a determination intensively. Further, the master communication control device can transfer or destroy determination-making authority to each slave communication control device for the purpose of load balancing or the like.

Incidentally, the communication control device 40 can acquire necessary information from entities other than the terminal device 20, the base station device 30, and the proxy device 50 for the role thereof. Specifically, the communication control device 40 can acquire information necessary for protection, such as the position information of the primary system, from a database (regulatory database) managed and operated by a national/regional radio wave administrative agency, for example. Examples of the regulatory database include the Universal Licensing System (ULS) operated by the Federal Communications Commissions. Other examples of information necessary for protection may include Out-of-Band Emission (OOBE) Limit, Adjacent Channel Leakage Ratio (ACLR), Adjacent Channel Selectivity, fading margin, and/or protection ratio (PR), and the like. For these examples, it is desirable to use the examples in a case where numerical values are fixedly given by law.

As another example, it may be assumed that the communication control device 40 acquires radio wave sensing information from a radio wave sensing system installed and operated for the purpose of detecting radio waves in the primary system. As a specific example, the communication control device 40 may acquire the radio wave detection information of the primary system from the radio wave sensing system such as an environmental sensing capability (ESC) in the United States CBRS. Further, in a case where the communication device or the terminal has a sensing function, the communication control device 40 may acquire the radio wave detection information of the primary system therefrom.

[Proxy Device]

The proxy device 50 (proxy system) is a device which communicates with the communication control device 40 on behalf of (representatively) one or more communication devices (for example, the base station device 30). The proxy device 50 is also a type of communication device.

The proxy device 50 may be a Domain Proxy (DP) defined in Non Patent Literature 2 and the like. Here, DP refers to an entity that communicates with the SAS on behalf of each of a plurality of CBSDs or a network configured by the plurality of CBSDs. Incidentally, the proxy device 50 is not limited to the DP defined in Non Patent Literature 2 as long as the proxy device has a function of communicating with the communication control device 40 on behalf of (representatively) one or more communication devices. The network manager that controls the base station device 30 in the network in an integrated manner may be regarded as the proxy device 50.

Incidentally, the proxy system may be configured by one device or may be configured by a plurality of devices. The communication between the proxy device 50 and the base station device 30 may be wired communication or may be wireless communication. Similarly, the communication between the proxy device 50 and the communication control device 40 may be wired communication or may be wireless communication.

Incidentally, the communication device substituted (represented) by the proxy device 50 is not limited to the base station device 30 and may be, for example, the terminal device 20. In the following description, one or more communication devices (for example, one or more base station devices 30) substituted (represented) by the proxy device 50 may be referred to as subordinate communication devices (for example, subordinate base station devices 30).

Hereinafter, the configuration of each device included in the communication system 100 will be specifically described.

<2-2. Configuration of Terminal Device>

Figure 7:
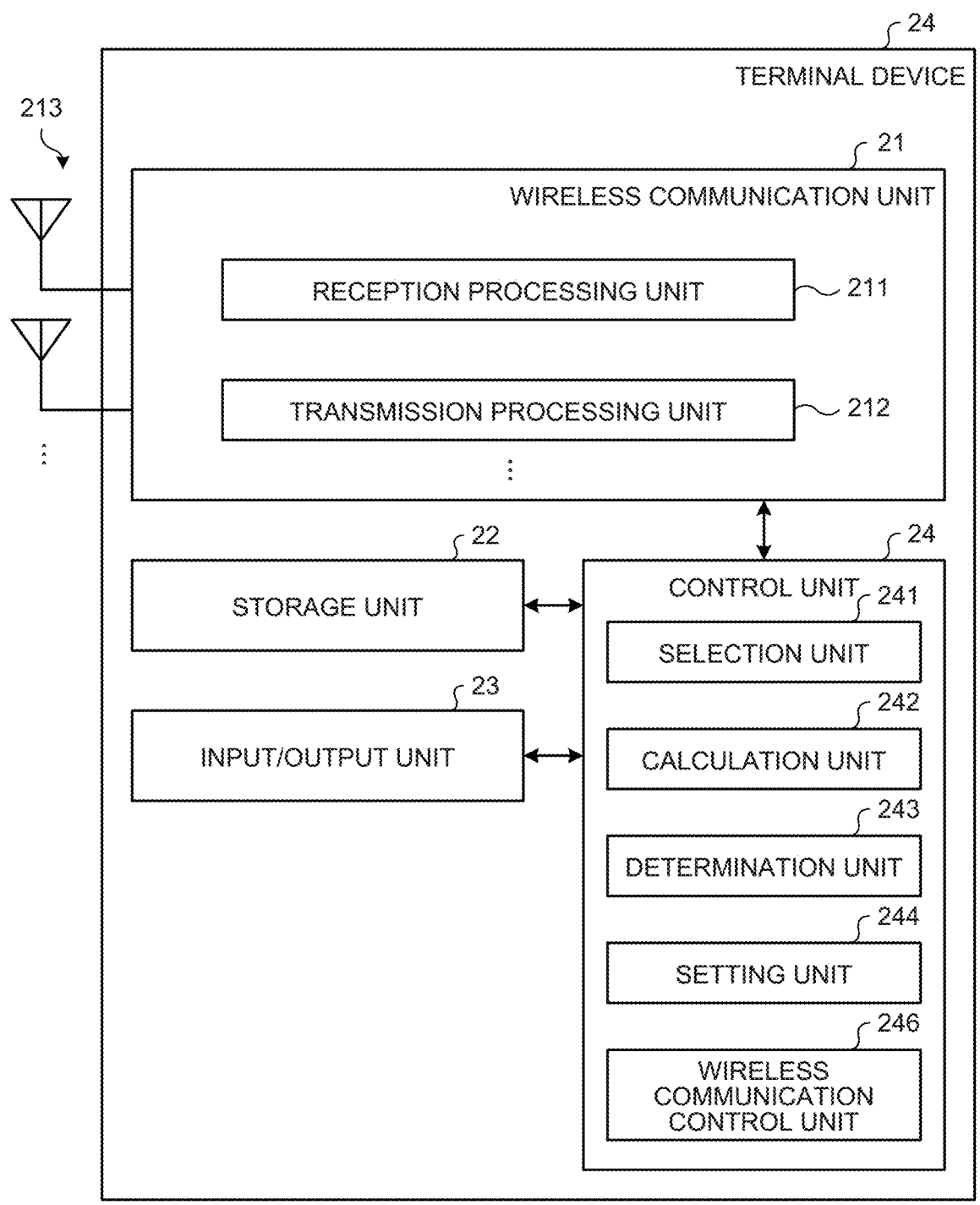
FIG. 7 is a diagram illustrating a configuration example of a terminal device according to the embodiment of the present disclosure.

Next, the configuration of the terminal device 20 will be described. FIG. 7 is a diagram illustrating a configuration example of the terminal device 20 according to the embodiment of the present disclosure. The terminal device 20 is a communication device which wirelessly communicates with the base station device 30 and/or the communication control device 40. Incidentally, in this embodiment, the concept of the communication device (or wireless communication device) includes not only the base station device and the proxy device but also the terminal device. The communication device (or wireless communication device) can be referred to as a wireless system.

The terminal device 20 includes a wireless communication unit 21, a storage unit 22, an input/output unit 23, and a control unit 24. Incidentally, the configuration illustrated in FIG. 7 is a functional configuration, and a hardware configuration may be different therefrom. Further, the functions of the terminal device 20 may be distributed and implemented in a plurality of physically separated configurations.

The wireless communication unit 21 is a wireless communication interface which wirelessly communicates with other communication devices (for example, the base station device 30 and another terminal device 20). The wireless communication unit 21 operates according to the control of the control unit 24. The wireless communication unit 21 supports one or more wireless access methods. For example, the wireless communication unit 21 supports both NR and LTE. The wireless communication unit 21 may support other wireless access methods such as W-CDMA and cdma2000.

The wireless communication unit 21 includes a reception processing unit 211, a transmission processing unit 212, and an antenna 213. The wireless communication unit 21 may include a plurality of reception processing units 211, a plurality of transmission processing units 212, and a plurality of antennas 213. Incidentally, in a case where the wireless communication unit 21 supports a plurality of wireless access methods, each unit of the wireless communication unit 21 may be individually configured for each wireless access method. For example, the reception processing unit 211 and the transmission processing unit 212 may be individually configured by LTE and NR. The configurations of the reception processing unit 211 and the transmission processing unit 212 are the same as those of the reception processing unit 311 and the transmission processing unit 312 of the base station device 30 described later.

The storage unit 22 is a storage device, such as a Dynamic Random Access Memory (DRAM), a Static RAM (SRAM), a flash memory, and a hard disk, which can read and write data. The storage unit 22 functions as a storage means of the terminal device 20.

The input/output unit 23 is a user interface for exchanging information with the user. For example, the input/output unit 23 is an operation device, such as a keyboard, a mouse, operation keys, and a touch panel, for the user performing various operations. Alternatively, the input/output unit 23 is a display device such as a liquid crystal display and an organic electroluminescence display (organic EL display). The input/output unit 23 may be an audio device such as a speaker and a buzzer. Further, the input/output unit 23 may be a lighting device such as a Light Emitting Diode (LED) lamp. The input/output unit 23 functions as an input/output means (an input means, an output means, an operation means, or a notification means) of the terminal device 20.

The control unit 24 is a controller which controls each unit of the terminal device 20. For example, the control unit 24 is realized by a processor such as a Central Processing Unit (CPU) or a Micro Processing Unit (MPU). For example, the control unit 24 is realized when the processor executes various programs stored in the storage device inside the terminal device 20 by using RAM or the like as a work area. Incidentally, the control unit 24 may be realized by an integrated circuit such as an Application Specific Integrated Circuit (ASIC) and a Field Programmable Gate Array (FPGA). Any one of the CPU, MPU, ASIC, and FPGA can be regarded as a controller. Incidentally, the control unit 34 may have each functional block of the control unit of the base station device 30.

As illustrated in FIG. 7, the control unit 24 includes a selection unit 241, a calculation unit 242, a determination unit 243, a setting unit 244, and a wireless communication control unit 246. Each of the blocks (the selection unit 241 to the setting unit 244 and the wireless communication control unit 246) configuring the control unit 24 is a functional block indicating the function of the control unit 24. These functional blocks may be software blocks or may be hardware blocks. For example, each of the above-described functional blocks may be one software module realized by software (including a microprogram) or one circuit block on a semiconductor chip (die). Of course, each functional block may be one processor or one integrated circuit. A method of configuring the functional block is arbitrary. Incidentally, the control unit 24 may be configured in a functional unit different from the above-described functional blocks.

The operations of the selection unit 241, the calculation unit 242, and the determination unit 243 configuring the control unit 24 may be the same as the operations of respective blocks of a selection unit 441, a calculation unit 442, and a determination unit 443 configuring a control unit 44 of the communication control device 40. In this case, the description of "terminal device 20" appearing in the following description may be appropriately replaced with "communication control device 40". Similarly, the descriptions of "control unit 24", "selection unit 241", "calculation unit 242", and "determination unit 243" appearing in the following description can be appropriately replaced with "control unit 44", "selection unit 441", "calculation unit 442", and "determination unit 443". Further, the control unit 24 does not necessarily have to include all of the selection unit 241, the calculation unit 242, and the determination unit 243. The control unit 24 includes some or all blocks of the selection unit 241, the calculation unit 242, and the determination unit 243 between the control unit 34 of the base station device 30 and the control unit 44 of the communication control device 40 in a distributed manner.

The operations of the setting unit 244 and the wireless communication control unit 246 configuring the control unit 24 may be the same as the operations of respective blocks of the setting unit 344 and the wireless communication control unit 346 configuring the control unit 34 of the base station device 30. In this case, the description of "terminal device 20" appearing in the following description may be appropriately replaced with "base station device 30". Similarly, the descriptions of "control unit 24", "setting unit 244", and "wireless communication control unit 246" appearing in the following description are appropriately replaced with "control unit 34", "setting unit 344", and "wireless communication control unit 346".

The operation of each block configuring the control unit 24 will be described later.

<2-3. Configuration of Base Station Device>

Figure 8:
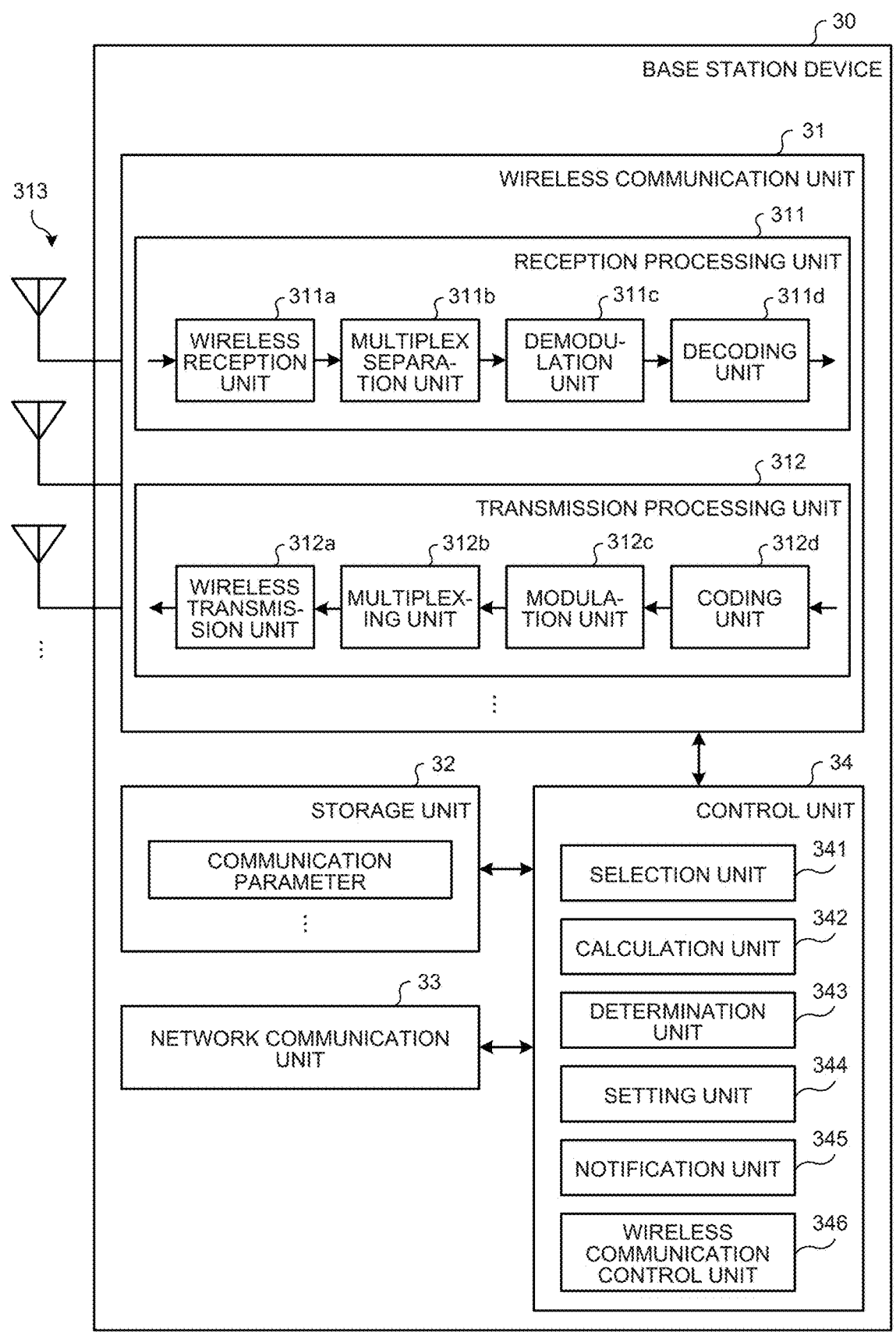
FIG. 8 is a diagram illustrating a configuration example of a base station device according to the embodiment of the present disclosure.

Next, the configuration of the base station device 30 will be described. FIG. 8 is a diagram illustrating a configuration example of the base station device 30 according to the embodiment of the present disclosure. The base station device 30 is a communication device (wireless system) which wirelessly communicates with the terminal device 20 according to the control of the communication control device 40. The base station device 30 is a type of information processing device.

The base station device 30 includes a wireless communication unit 31, a storage unit 32, a network communication unit 33, and the control unit 34. Incidentally, the configuration illustrated in FIG. 8 is a functional configuration, and a hardware configuration may be different therefrom. Further, the functions of the base station device 30 may be distributed and implemented in a plurality of physically separated devices.

The wireless communication unit 31 is a wireless communication interface which wirelessly communicates with other communication devices (for example, the terminal device 20, the communication control device 40, the proxy device 50, and another base station device 30). The wireless communication unit 31 operates according to the control of the control unit 34. The wireless communication unit 31 may support a plurality of wireless access methods. For example, the wireless communication unit 31 may support both NR and LTE. The wireless communication unit 31 may support other cellular communication methods such as W-CDMA and cdma2000. Further, the wireless communication unit 31 may support a wireless LAN communication method in addition to the cellular communication method. Of course, the wireless communication unit 31 may only support one wireless access method.

The wireless communication unit 31 includes the reception processing unit 311, the transmission processing unit 312, and an antenna 313. The wireless communication unit 31 may include a plurality of reception processing units 311, a plurality of transmission processing units 312, and a plurality of antennas 313. Incidentally, in a case where the wireless communication unit 31 supports a plurality of wireless access methods, each unit of the wireless communication unit 31 may be individually configured for each wireless access method. For example, when the base station device 30 supports NR and LTE, the reception processing unit 311 and the transmission processing unit 312 may be individually configured by NR and LTE.

The reception processing unit 311 performs processing of the uplink signal received via the antenna 313. The reception processing unit 311 includes a wireless reception unit 311a, a multiplex separation unit 311b, a demodulation unit 311c, and a decoding unit 311d.

With respect to the uplink signal, the wireless reception unit 311a performs down-conversion, the removal of unnecessary frequency components, the control of amplification level, orthogonal demodulation, the conversion to digital signals, the removal of guard interval, the extraction of frequency domain signals by fast Fourier transform, and the like. For example, it is assumed that the wireless access method of the base station device 30 is a cellular communication method such as LTE. At this time, the multiplex separation unit 311b separates uplink channels such as a Physical Uplink Shared Channel (PUSCH) and a Physical Uplink Control Channel (PUCCH) and uplink reference signals from the signal output from the wireless reception unit 311a. The demodulation unit 311c demodulates the received signal for the modulation symbol of the uplink channel by using a modulation method such as Binary Phase Shift Keying (BPSK) and Quadrature Phase shift Keying (QPSK). The modulation method used by the demodulation unit 311c may be 16 Quadrature Amplitude Modulation (QAM), 64QAM, or 256QAM. The decoding unit 311d performs decoding processing on encoded bits of the demodulated uplink channel. The decoded uplink data and uplink control information are output to the control unit 34.

The transmission processing unit 312 performs transmission processing of downlink control information and downlink data. The transmission processing unit 312 includes a coding unit 312*a*, a modulation unit 312*b*, a multiplexing unit 312*c*, and a wireless transmission unit 312*d*.

The coding unit 312*a* encodes the downlink control information and the downlink data input from the control unit 34 by using a coding method such as block coding, convolutional coding, and turbo coding. The modulation unit 312*b* modulates the encoded bits output from the coding unit 312*a* by using a predetermined modulation method such as BPSK, QPSK, 16QAM, 64QAM, and 256QAM. The multiplexing unit 312*c* multiplexes the modulation symbol and the downlink reference signal of each channel and arranges the result in a predetermined resource element. The wireless transmission unit 312*d* performs various signal processing on the signal from the multiplexing unit 312*c*. For example, the wireless transmission unit 312*d* performs processing such as the conversion to time domains by fast Fourier transform, the addition of guard intervals, the generation of baseband digital signals, the conversion to analog signals, quadrature modulation, up-conversion, the removal of extra frequency components, and power amplification. The signal generated by the transmission processing unit 312 is transmitted from the antenna 313.

The storage unit 32 is a storage device, such as a DRAM, an SRAM, a flash memory, and a hard disk, which can read and write data. The storage unit 32 functions as a storage means of the base station device 30. The storage unit 32 stores desired transmission power information, operation parameters, possessed resource information, and the like.

The desired transmission power information is information on the transmission power which the base station device 30 requests to the communication control device 40 as the information on the transmission power required for transmitting radio waves.

The operation parameter is information (for example, setting information) regarding the radio wave transmission operation of the base station device 30. For example, the operation parameter is information on the maximum value (maximum acceptable transmission power) of the transmission power allowed in the base station device 30. Of course, the operation parameters are not limited to the information on the maximum acceptable transmission power.

The possessed resource information is information regarding possession of the wireless resource of the base station device 30. For example, the possessed resource information is information on the wireless resource currently available to the base station device 30. For example, the possessed resource information is information on the holding amount of interference margin allocated by the base station device 30 from the communication control device 40. The information on the holding amount may be the information for each resource block described later. That is, the possessed resource information may be information (for example, a resource block holding amount) regarding the resource block possessed by the base station device 30.

The network communication unit 33 is a communication interface for communicating with other devices (for example, the communication control device 40, the proxy device 50, and another base station device 30). For example, a network communication unit 43 is a local area network (LAN) interface such as a network interface card (NIC). The network communication unit 33 may be a universal serial bus (USB) interface configured by a USB host controller, a USB port, and the like. Further, the network communication unit 33 may be a wired interface or a wireless interface. The network communication unit 33 functions as a network communication means of the base station device 30. The network communication unit 33 communicates with another device according to the control of the control unit 34.

The control unit 34 is a controller which controls each unit of the base station device 30. The control unit 34 is realized by, for example, a processor such as a CPU and MPU. For example, the control unit 34 is realized when the processor executes various programs stored in the storage device inside the base station device 30 by using RAM or the like as a work area. Incidentally, the control unit 34 may be realized by an integrated circuit such as an ASIC or FPGA. Any one of the CPU, MPU, ASIC, and FPGA can be regarded as a controller.

As illustrated in FIG. 8, the control unit 34 includes a selection unit 341, a calculation unit 342, a determination unit 343, the setting unit 344, a notification unit 345, and the wireless communication control unit 346. Each of the blocks (the selection unit 341 to the wireless communication control unit 346) configuring the control unit 34 is a functional block indicating the function of the control unit 34. These functional blocks may be software blocks or may be hardware blocks. For example, each of the above-described functional blocks may be one software module realized by software (including a microprogram) or one circuit block on a semiconductor chip (die). Of course, each functional block may be one processor or one integrated circuit. A method of configuring the functional block is arbitrary. Incidentally, the control unit 34 may be configured in a functional unit different from the above-described functional blocks.

The operations of the selection unit 341, the calculation unit 342, the determination unit 343, and the notification unit 345 configuring the control unit 34 may be the same as the operations of the blocks of the selection unit 441, the calculation unit 442, the determination unit 443, and a notification unit 445 configuring the control unit 44 of the communication control device 40. In this case, the description of "base station device 30" appearing in the following description may be replaced with "communication control device 40". Similarly, the descriptions of "control unit 34", "selection unit 341", "calculation unit 342", "determination unit 343", and "notification unit 345" appearing in the following description can be appropriately replaced with "control unit 44", "selection unit 441", "calculation unit 442", "determination unit 443", and "notification unit 445". Further, the control unit 34 does not necessarily have to include all of the selection unit 341, the calculation unit 342, and the determination unit 343. The control unit 34 includes some or all blocks of the selection unit 341, the calculation unit 342, and the determination unit 343 between the control unit 24 of the terminal device 20 and the control unit 44 of the communication control device 40 in a distributed manner.

The operation of each block configuring the control unit 34 will be described later.

<2-4. Configuration of Communication Control Device>

The communication control device 40 is a device which controls the wireless communication of the base station device 30. The communication control device 40 may control the wireless communication of the terminal device 20 via the base station device 30 or directly. The communication control device 40 is a type of information processing device.

Figure 9:
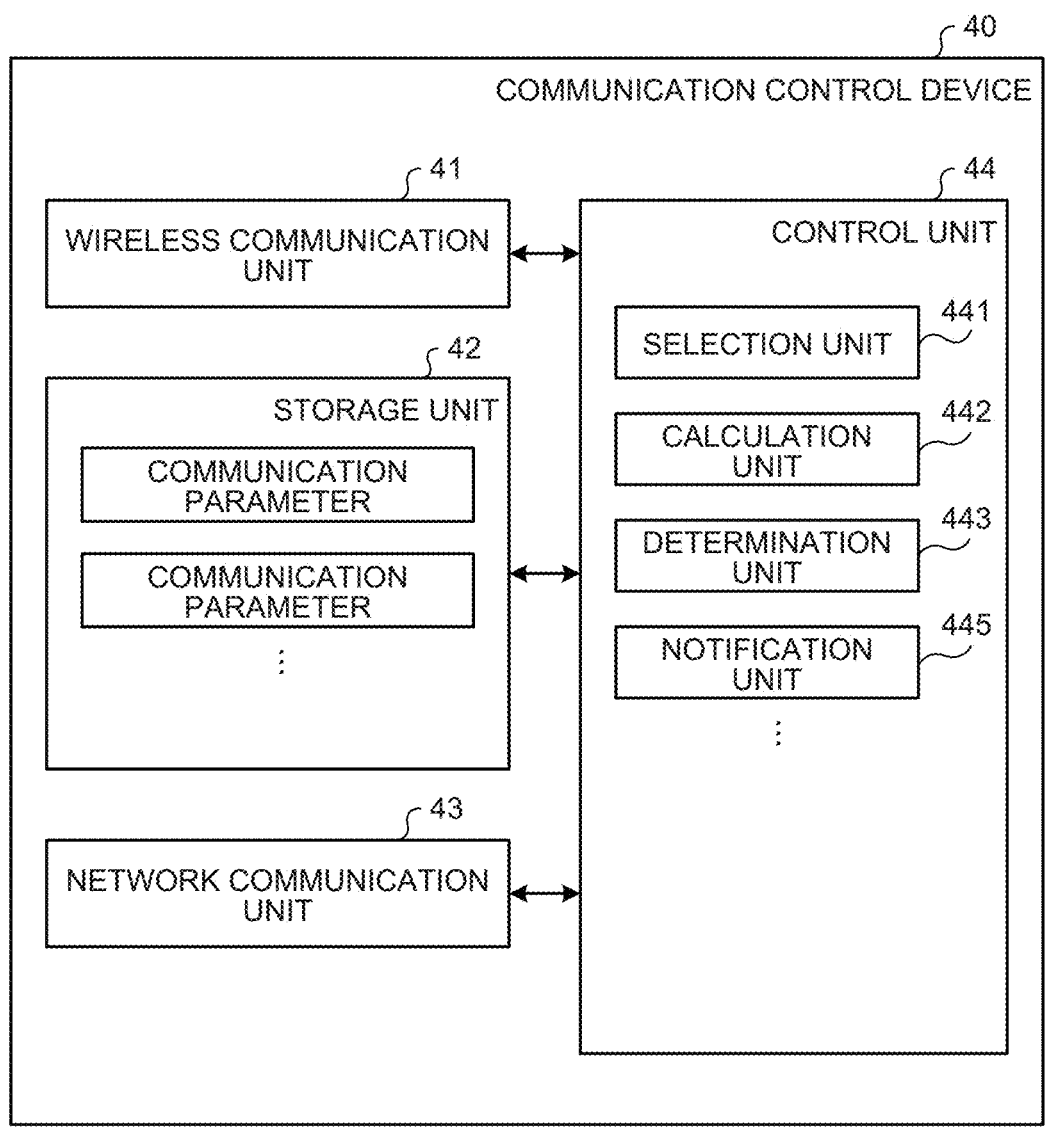
FIG. 9 is a diagram illustrating a configuration example of a communication control device according to the embodiment of the present disclosure.

FIG. 9 is a diagram illustrating a configuration example of the communication control device 40 according to the embodiment of the present disclosure. The communication control device 40 includes a wireless communication unit 41, a storage unit 42, the network communication unit 43, and the control unit 44. Incidentally, the configuration illustrated in FIG. 9 is a functional configuration, and a hardware configuration may be different therefrom. Further, the functions of the communication control device 40 may be distributed and implemented in a plurality of physically separated configurations. For example, the communication control device 40 may be configured by a plurality of server devices.

The wireless communication unit 41 is a wireless communication interface which wirelessly communicates with other communication devices (for example, the terminal device 20, the base station device 30, the proxy device 50, and another communication control device 40). The wireless communication unit 41 operates according to the control of the control unit 44. The wireless communication unit 41 supports one or more wireless access methods. For example, the wireless communication unit 41 supports both NR and LTE. The wireless communication unit 41 may support other wireless access methods such as W-CDMA and cdma2000. The configuration of the wireless communication unit 41 is similar to that of the wireless communication unit 31 of the base station device 30.

The storage unit 42 is a storage device, such as a DRAM, an SRAM, a flash memory, and a hard disk, which can read and write data. The storage unit 42 functions as a storage means of the communication control device 40. The storage unit 32 stores the operation parameters of each of the plurality of base station devices 30 configuring the communication system 2. Incidentally, the storage unit 42 may store the possessed resource information of each of the plurality of base station devices 30 configuring the communication system 2. As described above, the possessed resource information is information regarding possession of the wireless resource of the base station device 30.

The network communication unit 43 is a communication interface for communicating with other devices (for example, the base station device 30, the proxy device 50, and another communication control device 40). The network communication unit 43 may be a network interface or a device connection interface. For example, the network communication unit 33 may be a LAN interface such as a NIC. Further, the network communication unit 63 may be a USB interface configured by a USB host controller, a USB port, and the like. Further, the network communication unit 43 may be a wired interface or a wireless interface. The network communication unit 43 functions as a communication means of the communication control device 40. The network communication unit 43 communicates with the terminal device 20, the base station device 30, and the proxy device 50 according to the control of the control unit 44.

The control unit 44 is a controller which controls each unit of the communication control device 40. The control unit 44 is realized by, for example, a processor such as a CPU and MPU. For example, the control unit 44 is realized when the processor executes various programs stored in the storage device inside the communication control device 40 by using RAM or the like as a work area. Incidentally, the control unit 44 may be realized by an integrated circuit such as an ASIC or FPGA. Any one of the CPU, MPU, ASIC, and FPGA can be regarded as a controller.

As illustrated in FIG. 9, the control unit 44 includes the selection unit 441, the calculation unit 442, the determination unit 443, and the notification unit 445. Each block of the selection unit 441, the calculation unit 442, the determination unit 443, and the notification unit 445 configuring the control unit 44 is a functional block indicating the function of the control unit 44. These functional blocks may be software blocks or may be hardware blocks. For example, each of the above-described functional blocks may be one software module realized by software (including a microprogram) or one circuit block on a semiconductor chip (die). Of course, each functional block may be one processor or one integrated circuit. A method of configuring the functional block is arbitrary. Incidentally, the control unit 44 may be configured in a functional unit different from the above-described functional blocks.

The operation of each block configuring the control unit 44 will be described later.

<2-5. Configuration of Proxy Device>

Figure 10:
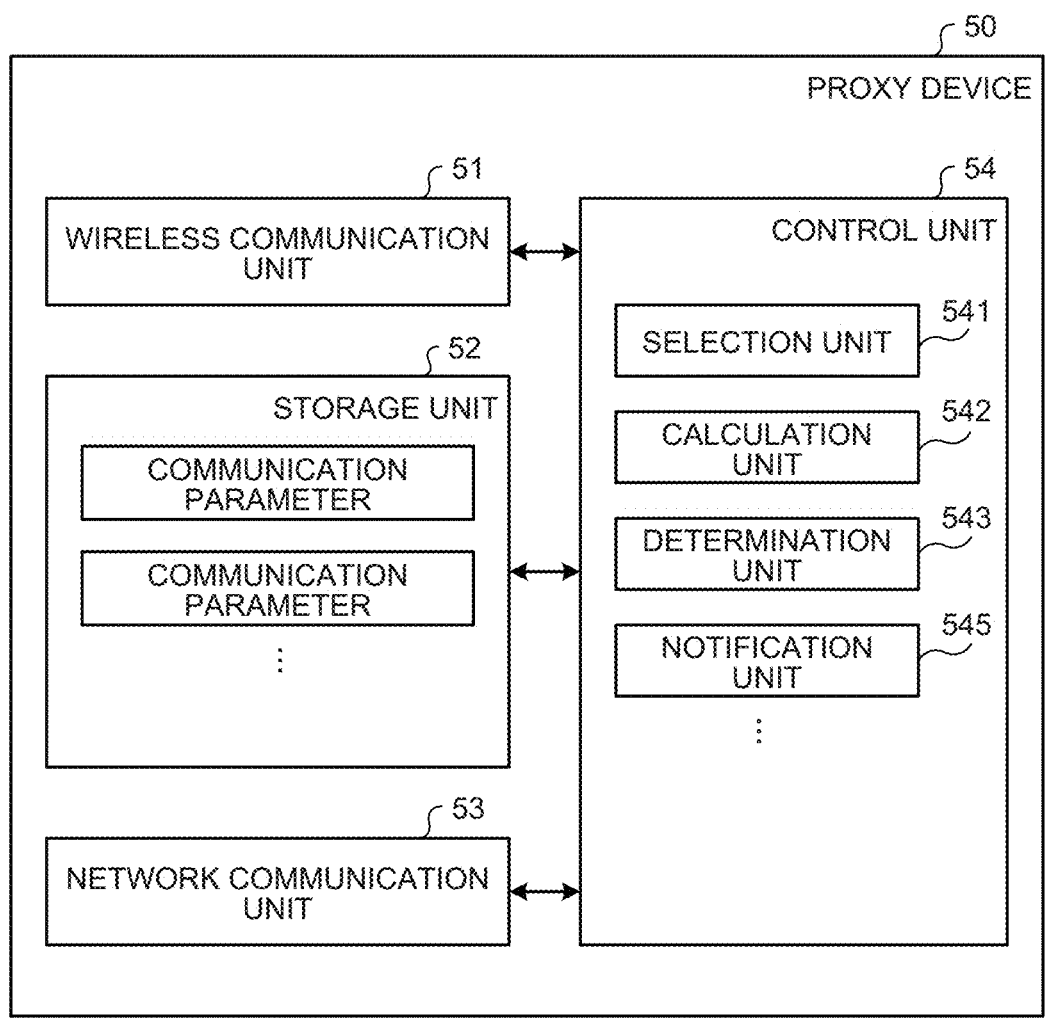
FIG. 10 is a diagram illustrating a configuration example of a proxy device according to the embodiment of the present disclosure.

Next, the configuration of the proxy device 50 will be described. FIG. 10 is a diagram illustrating a configuration example of the proxy device 50 according to the embodiment of the present disclosure. The proxy device 50 is a communication device which communicates with the base station device 30 and the communication control device 40. The proxy device 50 is a type of information processing device.

The proxy device 50 includes a wireless communication unit 51, a storage unit 52, a network communication unit 53, and a control unit 54. Incidentally, the configuration illustrated in FIG. 10 is a functional configuration, and a hardware configuration may be different therefrom. Further, the functions of the proxy device 50 may be distributed and implemented in a plurality of physically separated configurations.

The wireless communication unit 51 is a wireless communication interface which wirelessly communicates with other communication devices (for example, the terminal device 20, the base station device 30, the communication control device 40, and another proxy device 50). The wireless communication unit 51 operates according to the control of the control unit 54. The wireless communication unit 51 supports one or more wireless access methods. For example, the wireless communication unit 51 supports both NR and LTE. The wireless communication unit 51 may support other wireless access methods such as W-CDMA and cdma2000. The configuration of the wireless communication unit 51 is similar to that of the wireless communication unit 31 of the base station device 30.

The storage unit 52 is a storage device, such as a DRAM, an SRAM, a flash memory, and a hard disk, which can read and write data. The storage unit 52 functions as a storage means of the proxy device 50. The storage unit 52 stores desired transmission power information, operation parameters, possessed resource information, and the like of each subordinate base station device 30.

The network communication unit 53 is a communication interface for communicating with other devices (for example, the base station device 30, the communication control device 40, and another proxy device 50). For example, the network communication unit 53 is a LAN interface such as a NIC. The network communication unit 53 may be a USB interface configured by a USB host controller, a USB port, and the like. Further, the network communication unit 53 may be a wired interface or a wireless interface. The network communication unit 53 functions as a network communication means of the proxy device 50. The network communication unit 53 communicates with another device according to the control of the control unit 54.

The control unit 54 is a controller which controls each unit of the proxy device 50. The control unit 54 is realized by, for example, a processor such as a CPU and MPU. For example, the control unit 54 is realized when the processor executes various programs stored in the storage device inside the proxy device 50 by using RAM or the like as a work area. Incidentally, the control unit 54 may be realized by an integrated circuit such as an ASIC or FPGA. Any one of the CPU, MPU, ASIC, and FPGA can be regarded as a controller.

As illustrated in FIG. 10, the control unit 54 includes a selection unit 541, a calculation unit 542, a determination unit 543, and a notification unit 545. Each of the blocks (the selection unit 541 to the notification unit 545) configuring the control unit 54 is a functional block indicating the function of the control unit 54. These functional blocks may be software blocks or may be hardware blocks. For example, each of the above-described functional blocks may be one software module realized by software (including a microprogram) or one circuit block on a semiconductor chip (die). Of course, each functional block may be one processor or one integrated circuit. A method of configuring the functional block is arbitrary. Incidentally, the control unit 54 may be configured in a functional unit different from the above-described functional blocks.

The operations of the blocks of the selection unit 541, the calculation unit 542, the determination unit 543, and the notification unit 545 configuring the control unit 54 may be the same as the operations of the blocks of the selection unit 441, the calculation unit 442, the determination unit 443, and the notification unit 445 configuring the control unit 44 of the communication control device 40. In this case, the description of "proxy device 50" appearing in the following description may be appropriately replaced with "communication control device 40". Similarly, the descriptions of "control unit 54", "selection unit 541", "calculation unit 542", "determination unit 543", and "notification unit 545" appearing in the following description can be appropriately replaced with "control unit 44", "selection unit 441", "calculation unit 442", "determination unit 443", and "notification unit 445".

The operation of each block configuring the control unit 54 will be described later.

3. Interference Model

Figure 11:
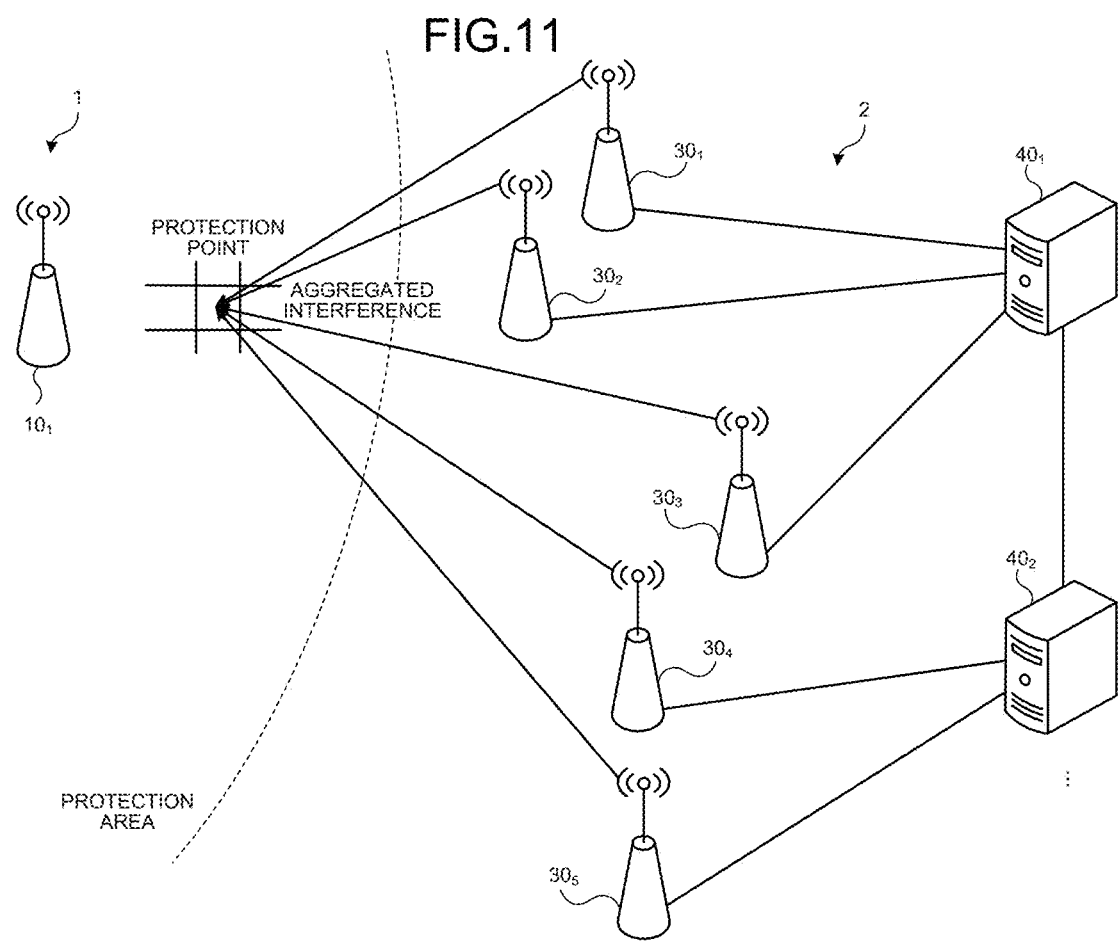
FIG. 11 is an explanatory diagram illustrating an example of an interference model assumed in the embodiment of the present disclosure.

Next, an interference model assumed in this embodiment will be described. FIG. 11 is an explanatory diagram illustrating an example of the interference model assumed in the embodiment of the present disclosure. Incidentally, the description of the base station device 30 appearing in the following description can be replaced with a word indicating another communication device having a wireless communication function.

The interference model illustrated in FIG. 11 is applied, for example, to a case where the primary system has a service area. In the example of FIG. 11, the communication system 1 (primary system) is a wireless communication system having a service area. This service area is, for example, a protection area of the communication system 1. A plurality of interference calculation reference points (hereinafter referred to as protection points) are set in the protection area. The protection point is set, for example, by the operator of the communication system 1, a public institution that manages radio waves, or the like (hereinafter referred to as an administrator). For example, the administrator may divide the protection area in a grid pattern and use the center of a predetermined grid as the protection point. A method of determining the protection point is arbitrary. The interference margin of each protection point is set by the administrator or the like. FIG. 11 illustrates the interference applied by the plurality of base station devices 30 configuring the communication system 2 (secondary system) to the protection point. The communication control device 40 of the communication system 2 controls the transmission power of the plurality of base station devices 30 such that the aggregated interference at each protection point does not exceed the set interference margin.

Figure 12:
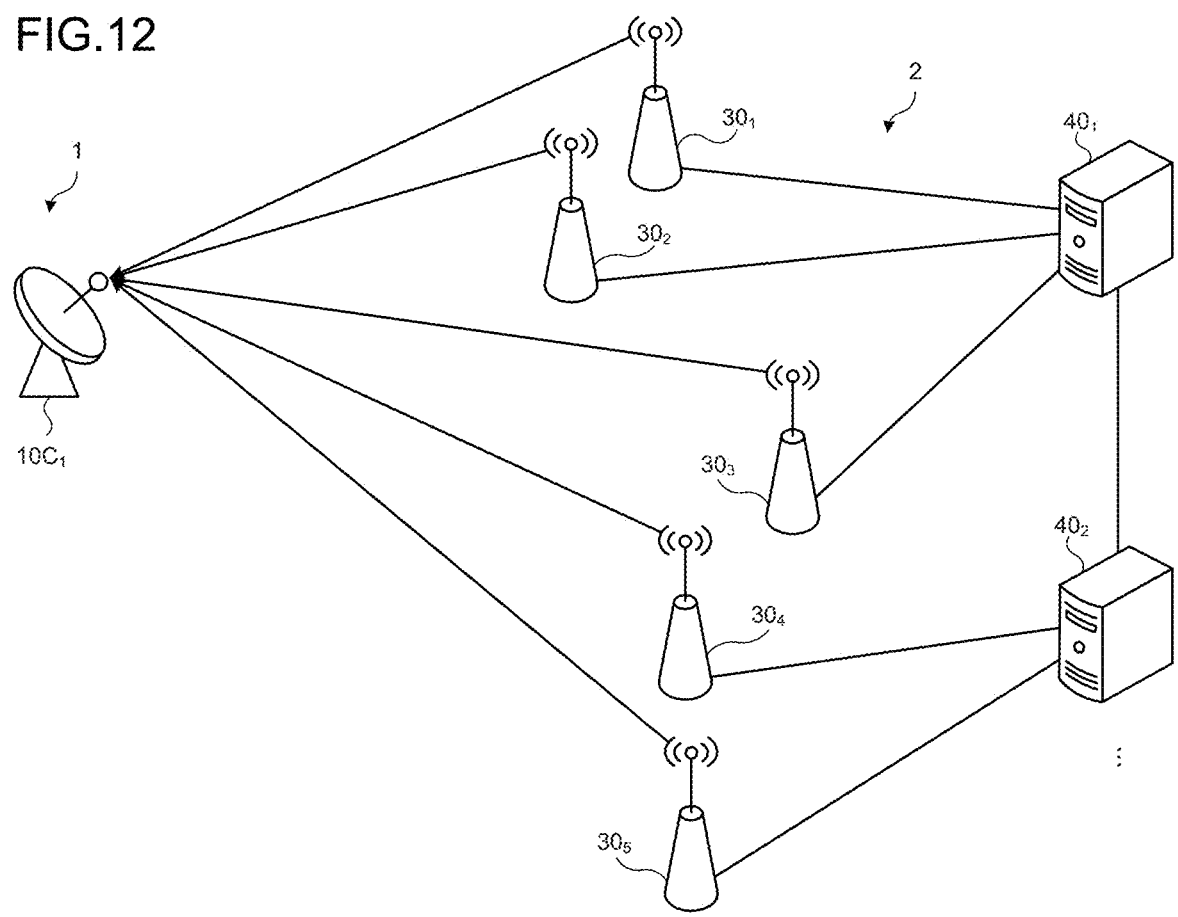
FIG. 12 is an explanatory diagram illustrating another example of the interference model assumed in the embodiment of the present disclosure.

FIG. 12 is an explanatory diagram illustrating another example of the interference model assumed in the embodiment of the present disclosure. The interference model illustrated in FIG. 12 is applied, for example, in a case where the primary system performs only reception. In the example of FIG. 12, the communication system 1 (primary system) has the terrestrial fixed communication device $10C_1$ as the communication device 10. The terrestrial fixed communication terminal $10C_1$ is, for example, a receiving antenna of a satellite ground station. The communication control device 40 of the communication system 2 uses the position of the receiving antenna as the protection point and controls the transmission power of the plurality of base station devices 30 such that the aggregated interference at that point does not exceed the interference margin.

4. Primary System Protection Method

Next, a primer system protection method will be described. As described above, the primary system protection method can be classified into the following two types, for example.

(1) Interference Margin Simultaneous Distribution Type
(2) Interference Margin Sequential Distribution Type Incidentally, examples of an interference margin simultaneous distribution type primer system protection method include, for example, the method (for example, the calculation method of the maximum acceptable EIRP) disclosed in Non Patent Literature 3. Further, examples of an interference margin sequential distribution type primer system protection method include, for example, the sequential allocation process (IAP: Iterative Allocation Process) disclosed in Non Patent Literature 6.

Hereinafter, the "interference margin simultaneous distribution type" primer system protection method and the "interference margin sequential distribution type" primer system protection method will be described. Incidentally, the description of the base station device 30 appearing in the following description can be replaced with a word indicating another communication device having a wireless communication function.

<4-1. Interference Margin Simultaneous Distribution Type>

Figure 13:
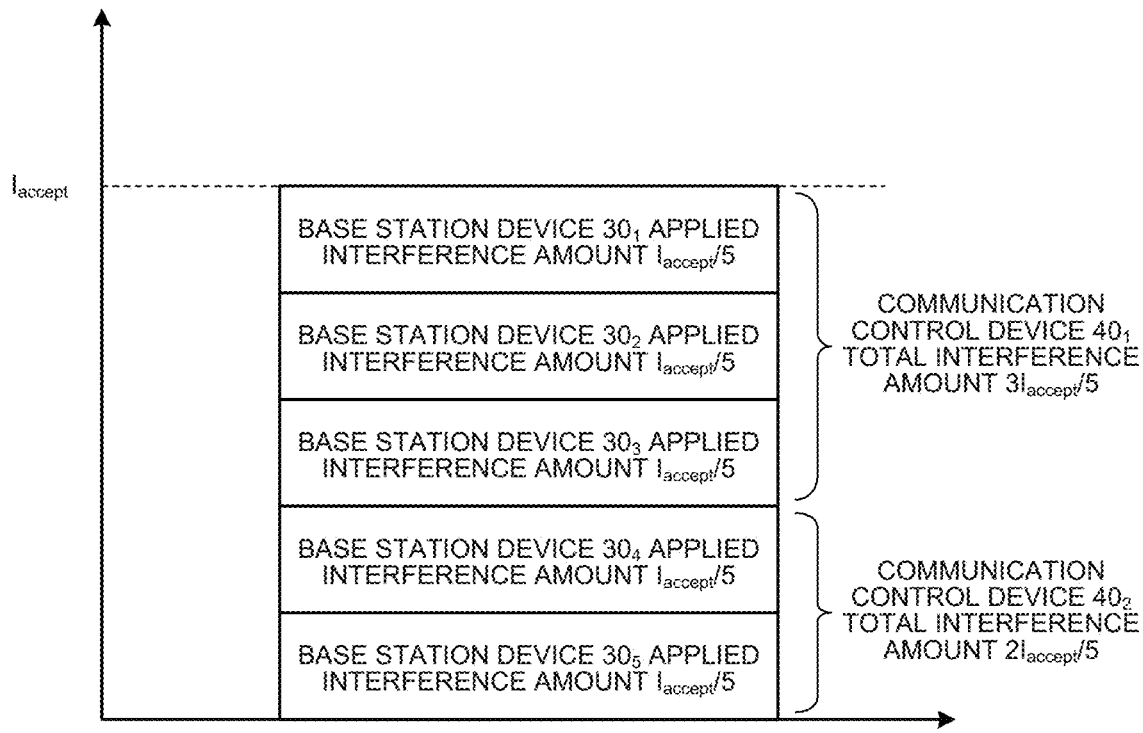
FIG. 13 is an explanatory diagram for explaining an interference margin simultaneous distribution type primer system protection method.

First, the interference margin simultaneous distribution type primer system protection method will be described. FIG. 13 is an explanatory diagram for explaining the interference margin simultaneous distribution type primer system protection method. As described above, in the interference margin simultaneous distribution type, the communication control device 40 calculates the maximum acceptable transmission power of the secondary system by using "a value uniquely obtained by the positional relationship between the protection reference point of the primary system and the secondary system" as a reference value. In the example of FIG. 13, an acceptable interference threshold of the primary system is $I_{accept}$. This threshold may be an actual threshold or may be a value set by considering a certain margin (for example, a protection ratio) from the actual threshold in consideration of calculation error and interference fluctuation.

In the interference margin simultaneous distribution type primer system protection method, the interference control means determining the transmission power (EIRP, Conducted Power+Antenna gain and the like) of the wireless device so as not to exceed the acceptable interference threshold. At this time, when there are many base station devices 30, and each of them does not exceed the acceptable interference threshold, the interference power received in the communication system 1 (primary system) may exceed the acceptable interference threshold. In this regard, the interference margin (acceptable interference amount) is "distributed" on the basis of the number of the base station devices 30 registered in the communication control device 40.

For example, in the example of FIG. 13, the total number of the base station devices 30 is five. Therefore, the acceptable interference amount of $I_{accept}/5$ is distributed to each base station device 30. Since the base station device 30 cannot recognize this distribution amount by itself, the base station device 30 recognizes the distribution amount through the communication control device or acquires the transmission power determined on the basis of this distribution amount. Since the communication control device cannot recognize the number of the wireless devices managed by another communication control device, by exchanging information with each other, the total number can be recognized, and the acceptable interference amount can be distributed. For example, the acceptable interference amount of $3I_{accept}/5$ is allocated in the communication control device $40_1$.

Figure 14:
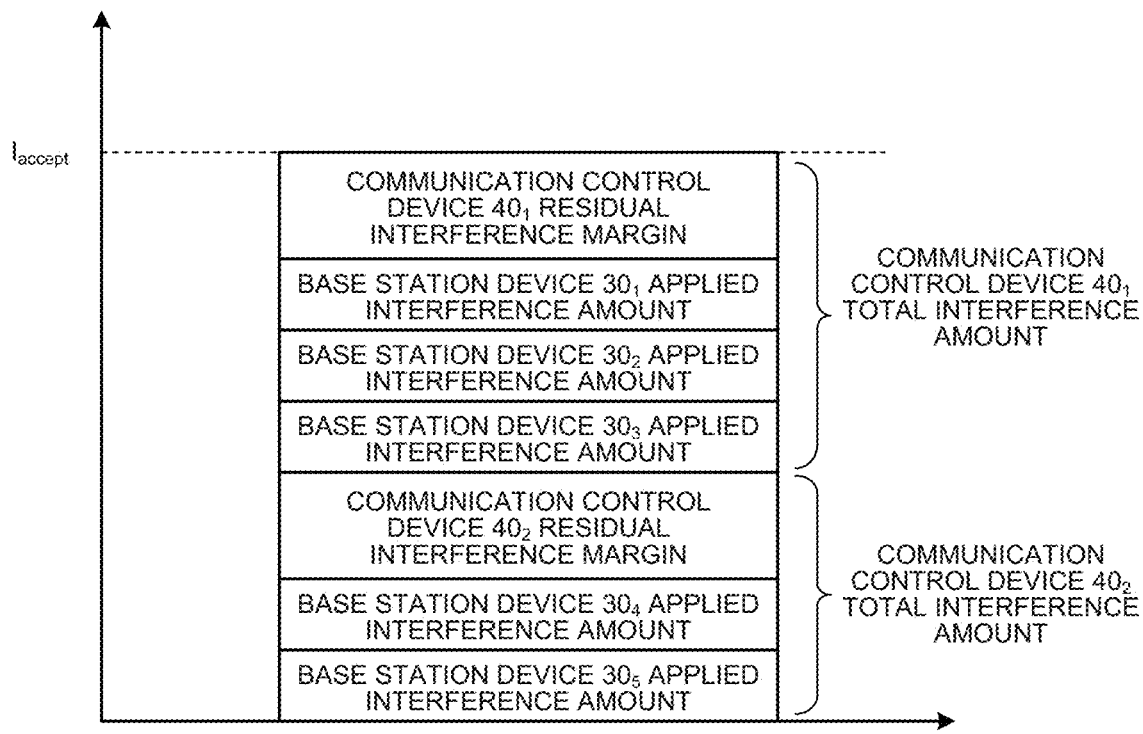
FIG. 14 is a diagram illustrating an aspect in which a residual interference margin is generated.

Incidentally, in this method, the interference margin not used by the base station device 30 can be a residual interference margin. FIG. 14 is a diagram illustrating an aspect in which the residual interference margin is generated. FIG. 14 illustrates the total interference amount set for each of two communication control devices 40 (communication control devices $40_1$ and $40_2$). Further, FIG. 14 illustrates the interference amounts (applied interference amounts) which are applied to a predetermined protection point of the communication system 1 by the plurality of base station devices 30 (base station devices $30_1$ to $30_5$) under the control of the two communication control devices 40. The interference amount obtained by subtracting the interference amounts of the base station devices 30 from the total interference amount of each of the two communication control devices 40 is the residual interference margin. In the following description, an excess interference amount is referred to as the residual interference margin. The residual interference margin can be referred to as a residual interference amount.

<4-2. Interference Margin Sequential Distribution Type>

Figure 15:
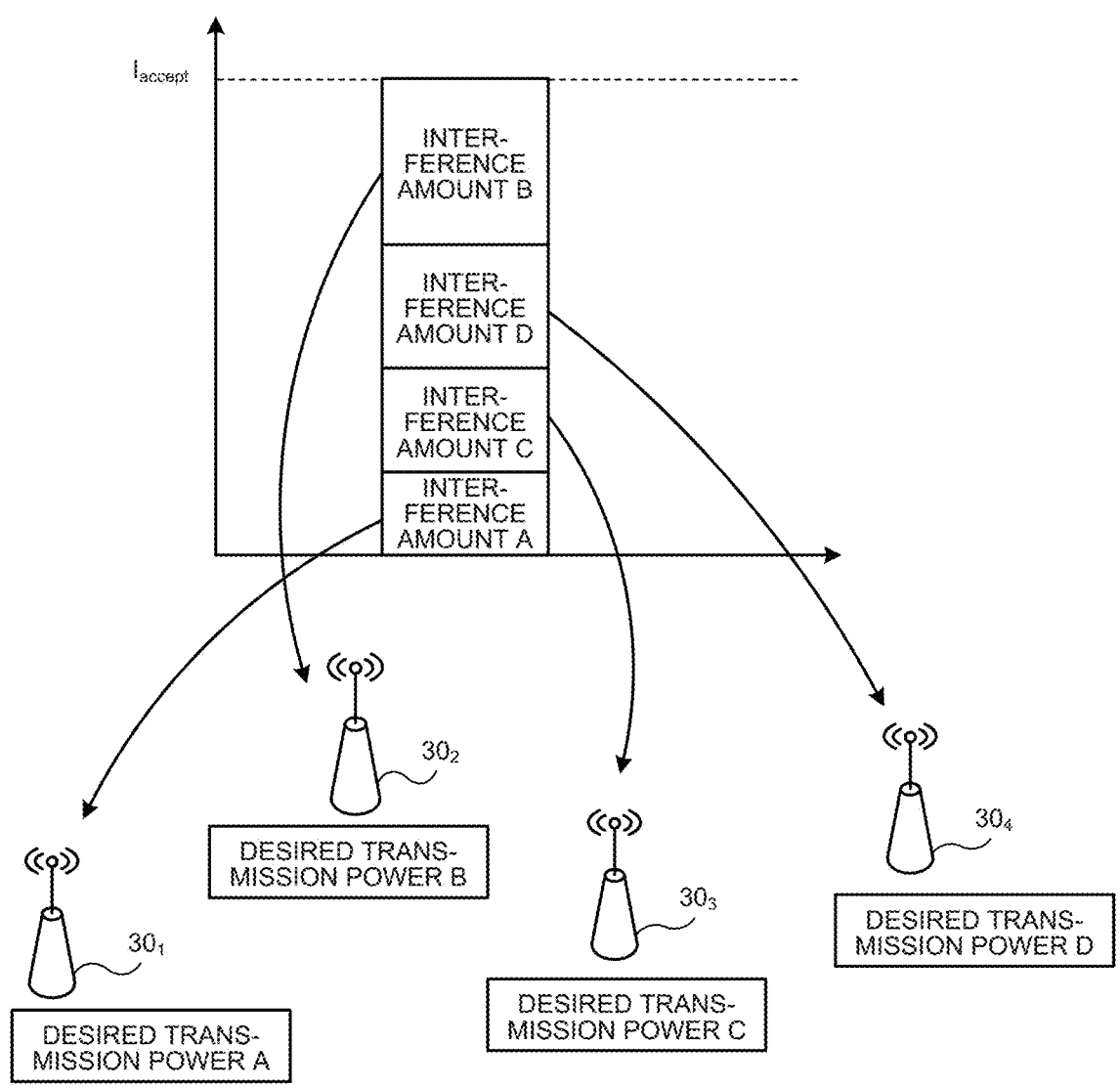
FIG. 15 is an explanatory diagram for explaining an interference margin sequential distribution type primer system protection method.

Next, an interference margin sequential distribution type primer system protection method will be described. As described above, in the interference margin sequential distribution type, the communication control device 40 calculates the maximum acceptable transmission power of the secondary system by using a "desired transmission power of the secondary system" as a reference value. FIG. 15 is an explanatory diagram for explaining the interference margin sequential distribution type primer system protection method. In the interference margin sequential distribution type, for example, each of the plurality of base station devices 30 stores desired transmission power information in the storage unit 22. The desired transmission power information is information on the transmission power which the base station device 30 requests to the communication control device 40 as the information on the transmission power required for transmitting radio waves. In the example of FIG. 15, the base station devices $30_1$ to $30_4$ hold the desired transmission power information A to D, respectively. The communication control device 40 allocates interference amounts A to D to the base station devices $30_1$ to $30_4$ on the basis of the desired transmission power information A to D, respectively.

5. Explanation of Various Procedures

Next, various procedures that can occur between the entities of the communication system 2 will be described. Incidentally, the description of the base station device 30 appearing in the following description can be replaced with a word indicating another communication device having a wireless communication function.

<5-1. Registration Procedure>

A registration procedure is a procedure for registering the device parameters related to the base station device 30 in the communication control device 40. Typically, the base station device 30 or one or more communication systems including the plurality of base station devices 30 notify the communication control device 40 of a registration request including the device parameters, and the registration procedure starts. The registration request may be transmitted by a communication system (for example, a proxy system such as the proxy device 50) on behalf of (representing) one or more base station devices 30.

In the following description, it is assumed that the communication system on behalf of (representing) the plurality of base station devices 30 is the proxy device 50, but the word of the proxy device 50 appearing in the following description can be replaced with the word, such as a proxy system, which indicates a communication system on behalf of (representing) other communication devices.

(Details of Required Parameters)

The device parameter refers to, for example, the information described below.

Information specific to the communication device
Position information
Antenna information
Wireless interface information
Legal information
Installer information At the time of implementation, information other than these may be treated as a device parameter.

The information specific to the communication device includes information that can identify the base station device 30, information regarding the hardware of the base station device 30, and the like. For example, a serial number, a product model number, and the like may be included.

The information that can identify the base station device 30 refers to communication device user information, communication device serial number, and the like. For example, a user ID, a call sign, or the like may be assumed as the communication device user information. The user ID may be independently generated by a communication device user or may be issued in advance by the communication control device 40.

Information regarding the hardware of the base station device 30 may include, for example, transmission power class information, manufacturer information, and the like. In the transmission power class information, for example, two types of classes of Category A and Category B are defined in FCC C.F.R Part 96, and any information may be included. Further, some classes of eNodeB and gNodeB are defined in 3GPP TS 36.104 and TS 38.104, and these can also be used.

The information regarding the software of the base station device 30 may include, for example, version information and a build number of an execution program in which the processing necessary for interaction with the communication control device 40 is described. Further, version information and a build number of a software for operating as the base station device 30 or the like may also be included.

Information regarding positions is typically information that can identify the geographic position of the base station device 30. For example, the information is coordinate information acquired by a positioning function represented by Global Positioning System (GPS), Beidou, Quasi-Zenith Satellite System (QZSS), Galileo, and Assisted Global Positioning System (A-GPS). Typically, information regarding a latitude, a longitude, an altitude, and a positioning error may be included. Alternatively, for example, the information may be position information registered in an information management device managed by National Regulatory Authority (NRA) or the consignment organization thereof. Alternatively, for example, the information may be coordinates having an X-axis, a Y-axis, and a Z-axis with a specific geographic position as the origin. Further, an identifier indicating outdoor/indoor may be given together with such coordinate information.

The information regarding positions may be information indicating an area in which the base station device 30 is positioned. For example, information, such as a zip code and an address, determined by the government may be used. Further, for example, an area may be indicated by a set of three or more geographic coordinates. Such information indicating areas may be provided together with the above coordinate information.

In the information regarding positions, the information indicating the floor of a building may be added in a case where the base station device 30 is positioned indoors. For example, the number of floors, an identifier indicating ground/underground, and the like may be added. Further, for example, information, such as a room number and a room name in the building, which indicates a further closed space indoors may be added.

It is desirable that the positioning function is typically provided by the base station device 30. However, depending on the performance of the positioning function and an installation position, it is not always possible to acquire position information that satisfies the required accuracy. Therefore, the positioning function may be used by an installer. In such a case, it is desirable that the position information measured by the installer is written to the base station device 30.

The antenna information is typically information indicating the performance, configuration, and the like of the antenna included in the base station device 30. Typically, for example, information such as antenna installation height, tilt angle (Downtilt), horizontal azimuth, boresight, antenna peak gain, and antenna model may be included.

The antenna information may also include information regarding the beam that may be formed. For example, information such as beam width, beam pattern, and analog/digital beamforming capabilities may be included.

The antenna information may include information regarding the performance and configuration of Multiple Input Multiple Output (MIMO) communication. For example, information such as the number of antenna elements and the maximum number of spatial streams may be included.

Further, codebook information to be used, weight matrix information (unitary matrix, Zero-Forcing (ZF) matrix, Minimum Mean Square Error (MMSE) matrix obtained by Singular Value Decomposition (SVD), Eigen Value Decomposition (EVD), Block Diagonalization (BD), or the like), or the like may also be included. Further, in a case where Maximum Likelihood Detection (MLD) or the like that requires non-linear calculation is provided, information indicating that may be included.

The antenna information may include Zenith of Direction, Departure (ZoD). The ZoD is a type of radio wave arrival angle. The ZoD may be estimated by another base station device 30 from the radio waves radiated from the antenna of the base station device 30. In this case, the base station device 30 may be a terminal device which operates as a base station or an access point, a device which performs D2D communication, a moving relay base station, or the like. The ZoD can be estimated by radio wave arrival direction estimation technology such as Multiple Signal Classification (MUSIC) or Estimation of Signal Propagation via Rotation Invariance Techniques (ESPRIT). The ZoD can be used as measurement information by the communication control device 40.

The wireless interface information is typically information indicating the wireless interface technology included in the base station device 30. For example, identifier information indicating technologies used in GSM (registered trademark), CDMA2000, UMTS, E-UTRA, 5G New Radio (5G NR) or further next-generation cellular systems, LTE-based derivative technologies such as MulteFire and LTE-Unlicensed (LTE-U), Metropolitan Area Network (MAN) such as WiMAX and WiMAX2+, and standard technologies such as IEEE 802.11 wireless LAN is included. Further, the version number or release number of the technical specification which defines these may also be added. It does not necessarily have to be a standard technology and may include information indicating proprietary wireless technology.

The wireless interface information may also include information on the frequency band supported by the base station device 30. For example, it may be expressed by one or more of combinations of upper and lower frequencies, one or more of combinations of center frequency and bandwidth, one or more 3GPP Operating Band numbers, or the like.

The information on the frequency band supported by the base station device 30 may also include capability information of carrier aggregation (CA) and channel bonding. For example, band information that can be combined may be included. Further, carrier aggregation may include information regarding the bandwidth which is desired to use as a primary component carrier (PCC) or a secondary component carrier (SCC). Further, the number of CCs that can be aggregated at the same time may be also included.

As the information on the frequency band supported by the base station device 30, information indicating the radio wave use priority such as PAL and GAA may be included.

The wireless interface information may also include information on the modulation method supported by the base station device 30. For example, as a typical example, information indicating a primary modulation method such as Frequency Shift Keying (FSK), n-value Phase Shift Keying (PSK) (n is 2, 4, 8, or the like) and n-value Quadrature Amplitude Modulation (QAM) (n is 4, 16, 64, 256, or the like) and information indicating a secondary modulation method such as Orthogonal Frequency Division Multiplexing (OFDM), DFT spread OFDM (DFT-s-OFDM), and Filter Bank Multi Carrier (FBMC) may be included.

The wireless interface information may also include information regarding an error correction code. For example, capabilities such as Turbo code, Low Density Parity Check (LDPC) code, and Polar code or code rate information to be applied may be included.

The information on the modulation method or the information regarding the error correction code may be also expressed by the Modulation and Coding Scheme (MCS) index as another aspect.

The wireless interface information may include information indicating a function specific to each wireless technology supported by the base station device 30. For example, typical examples include Transmission Mode (TM) information defined by LTE. In addition to this, those having two or more modes for a specific function may be included in the wireless interface information as in the above TM. Further, in the technical specifications, in a case where the base station device 30 supports a function which is not essential in the specifications even when two or more modes do not exist, information indicating this may be included.

The wireless interface information may also include information on the wireless access method (RAT: radio access technology) supported by the base station device 30. For example, information indicating Orthogonal Multiple Access (OMA) such as Time Division Multiple Access (TDMA), Frequency Division Multiple Access (FDMA), and Orthogonal Frequency Division Multiple Access (OFDMA), Non Orthogonal Multiple Access (NOMA) such as Power Division Multiple Access (PDMA, a method realized by a combination of Superposition Coding (SPC) and Successive Interference Canceller (SIC) is a typical example), Code Division Multiple Access (CDMA), Sparse Code Multiple Access (SCMA), Interleaver Division Multiple Access (IDMA), Spatial Division Multiple Access (SDMA), Opportunistic Access such as Carrier Sense Multiple Access/Collision Avoidance (CSMA/CA) and (Carrier Sense Multiple Access/Collision Detection (CSMA/CD), or the like may be included.

The wireless interface information may also include information regarding the duplex mode supported by the base station device 30. For example, Frequency Division Duplex (FDD), Time Division Duplex (TDD), or Full Duplex (FD) may be included as a typical example. In a case where TDD is included as wireless interface information, information on TDD Frame Configuration used/supported by the base station device 30 may be added. Further, the information regarding the duplex mode may be included for each frequency band indicated by the above frequency band information.

The wireless interface information may also include information regarding the transmission diversity method supported by the base station device 30. For example, space-time coding (STC) may be included.

The wireless interface information may also include guard band information. For example, information regarding the guard band size determined by a standard may be included. Alternatively, for example, information regarding the guard band size desired by the base station device 30 may be included.

Typically, the legal information is information regarding regulations which are set by the radio wave administrative agency of each country/region or an equivalent organization and with which the base station device 30 necessarily complies, authentication information acquired by the base station device 30, or the like. Typically, the information regarding the above regulation may include, for example, information on the upper limit of out-of-band emission and information on the blocking characteristics of a receiver. Typically, the above-described authentication information may include, for example, type approval information (FCC ID, technical standard conformity certification or the like) and legal and regulatory information (such as FCC rule number and ETSI Harmonized Standard number) which is the basis for acquiring authentication.

The information on numerical values in the legal information may be substituted with the information specified in the wireless interface technology standard. For example, the upper limit of the out-of-band emission may be derived and used by using an adjacent channel leakage ratio (ACLR) instead of the upper limit information of out-of-band emission. Further, ACLR itself may be used as necessary. Further, adjacent channel selectivity (ACS) may be used instead of the blocking characteristic. Further, these may be used together, or an adjacent channel interference ratio (ACIR) may be used.

The installer information may include information that can identify the person (installer) who installed the base station device 30, specific information associated with the installer, and the like. For example, Non Patent Literature 2 discloses a Certified Professional Installer Registration ID (CPIR-ID) and a CPI name as information that can identify the installer. Further, as the specific information associated with the installer, for example, a contact address (Mailing/Contact address), an e-mail address, a telephone number, a Public Key Identifier (PKI), and the like are disclosed. The invention is not limited thereto, and other information regarding the installer may be included as necessary.

[Supplement of Required Parameters]

In the registration procedure, depending on the embodiment, it is assumed that the device parameters regarding not only the base station device 30 but also the terminal device 20 are required to be registered in the communication control device 40. In such a case, the term "communication device" in the explanation described above (details of required parameters) may be replaced with the term "terminal device" or a term equivalent thereto for application. Further, the parameters specific to the "terminal device" not described in the above (details of required parameters) may be also treated as required parameters in the registration procedure. For example, User Equipment (UE) Category defined by 3GPP or the like may be included.

[Details of Registration Processing]

Figure 16:
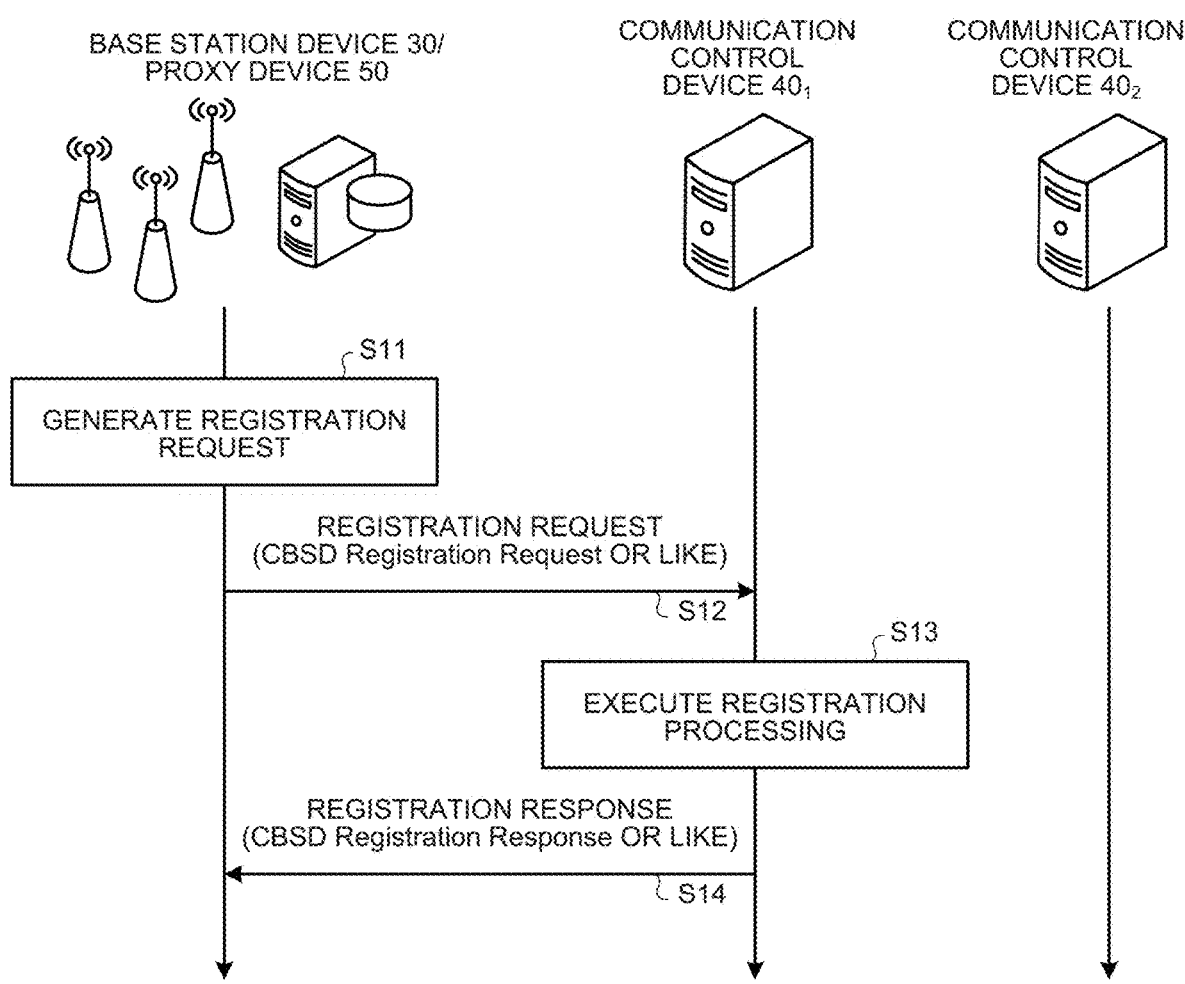
FIG. 16 is a sequence diagram for explaining a registration procedure.

FIG. 16 is a sequence diagram for explaining the registration procedure. The base station device 30 or one or more communication systems including the plurality of base station devices 30 generate a registration request message by using the above device parameters (step S11) and notify the communication control device 40 (step S12). The proxy device 50 may generate and/or notify the message.

Here, in a case where the device parameter includes the installer information, processing of preventing tampering and the like may be performed on the registration request by using this information. Further, encryption may be performed on a part or all of the information included in the registration request. Specifically, for example, a process may be executed in which a public key peculiar to the installer is shared in advance between the installer and the communication control device 40, and the installer encrypts the information by using the private key. Examples of an encryption target include security-sensitive information such as position information.

As for the position information, as disclosed in Non Patent Literature 2, for example, the installer may directly write in the communication control device 40.

After receiving the registration request, the communication control device 40 executes the registration processing of the base station device 30 (step S13), and returns a registration response according to the processing result (step S14). When there is no shortage or abnormality of the information required for registration, the communication control device 40 records the information in the storage unit 42 and notifies the normal completion. Otherwise, the communication control device 40 notifies the registration failure. In a case where the registration is completed normally, the communication control device 40 may assign an ID to each communication device and notify the ID information in an enclosed state at the time of response. In the case of the registration failure, typically, the base station device 30, one or more communication systems including the plurality of base station devices 30, or operators (such as mobile network operators and individuals) or installers thereof perform correction or the like on the registration request and try the registration procedure until the normal completion.

Incidentally, the registration procedure may be executed a plurality of times. Specifically, for example, the registration procedure may be re-executed in a case where the position information is changed beyond a predetermined standard due to movement/accuracy improvement. The predetermined standard is typically set by a legal system. For example, in 47 C.F.R Part 15, Mode II personal/portable white space device is obliged to access the database again in a case where the position information changes 100 meters or more.

<5-2. Available Spectrum Query Procedure>

An available spectrum query procedure is a procedure in which the base station device 30 or the proxy device 50 inquires the communication control device 40 for information regarding available frequencies. Typically, the base station device 30 or the proxy device 50 starts the procedure by notifying the communication control device 40 of a query request including information that can identify the relevant base station device (or the base station device 30 under the relevant proxy device 50).

(1) Example 1

Here, the available frequency information is typically information indicating the frequencies that can be used safely for secondary use without causing fatal interference to the primary system at the position of the relevant base station device 30 (or the base station device 30 under the relevant proxy device 50). For example, in a case where the base station device 30 is installed in a secondary use prohibition area such as an exclusion zone in order to protect the primary system using a frequency channel called F1, the frequency channel called F1 is not notified as an available channel to the base station device 30.

(2) Example 2

For example, even outside the secondary use prohibition area, in a case where it is determined that fatal interference is applied to the primary system, the relevant frequency channel may not be notified as an available channel.

(3) Example 3

In the available frequency information, there may be a frequency channel which is not notified as available even under conditions other than the primary system protection requirement of Example 2. Specifically, for example, in order to avoid possible interference between the base station devices 30 in advance, another base station device 30 existing in the vicinity of the relevant base station device 30 (or the base station device 30 under the relevant proxy device 50) may not notify the frequency channel in use as an available channel.

(4) Example 4

Even in these cases (Examples 2 and 3), it is possible to notify the same frequency as the primary system or the nearby base station device 30 as an available channel. In such cases, the maximum acceptable transmission power information is typically included in the available frequency information. The maximum acceptable transmission power is typically expressed as equivalent isotropic radiated power (EIRP). The maximum acceptable transmission power is not necessarily limited thereto and may be provided, for example, in a combination of antenna power (conducted power) and antenna gain. Feeder loss may also be included. Further, in the antenna gain, an acceptable peak gain may be set for each spatial direction.

[Details of Required Parameters]

As the information that can identify the base station device 30, for example, the information specific to the communication device registered at the time of the registration procedure, the ID information described in the above (details of registration processing), or the like may be assumed.

The query request may also include query requirement information. The query requirement information may include, for example, information indicating a frequency band which is desired to know whether or not the frequency band is available. Also, for example, the transmission power information may be included. For example, the base station device 30 or the proxy device 50 may include the transmission power information in a case where it is desired to know only information on the frequency at which a desired transmission power can be used. The query requirement information does not necessarily need to be included.

The query request may also include a measurement report. The measurement report includes the results of the measurement performed by the base station device 30 and/or the terminal device 20. For example, the measurement report may include processed information as well as raw data. For example, standardized metrics represented by Reference Signal Received Power (RSRP), Reference Signal Strength Indicator (RSSI), and Reference Signal Received Quality (RSRQ) may be used.

[Details of Available Frequency Evaluation Processing]

Figure 17:
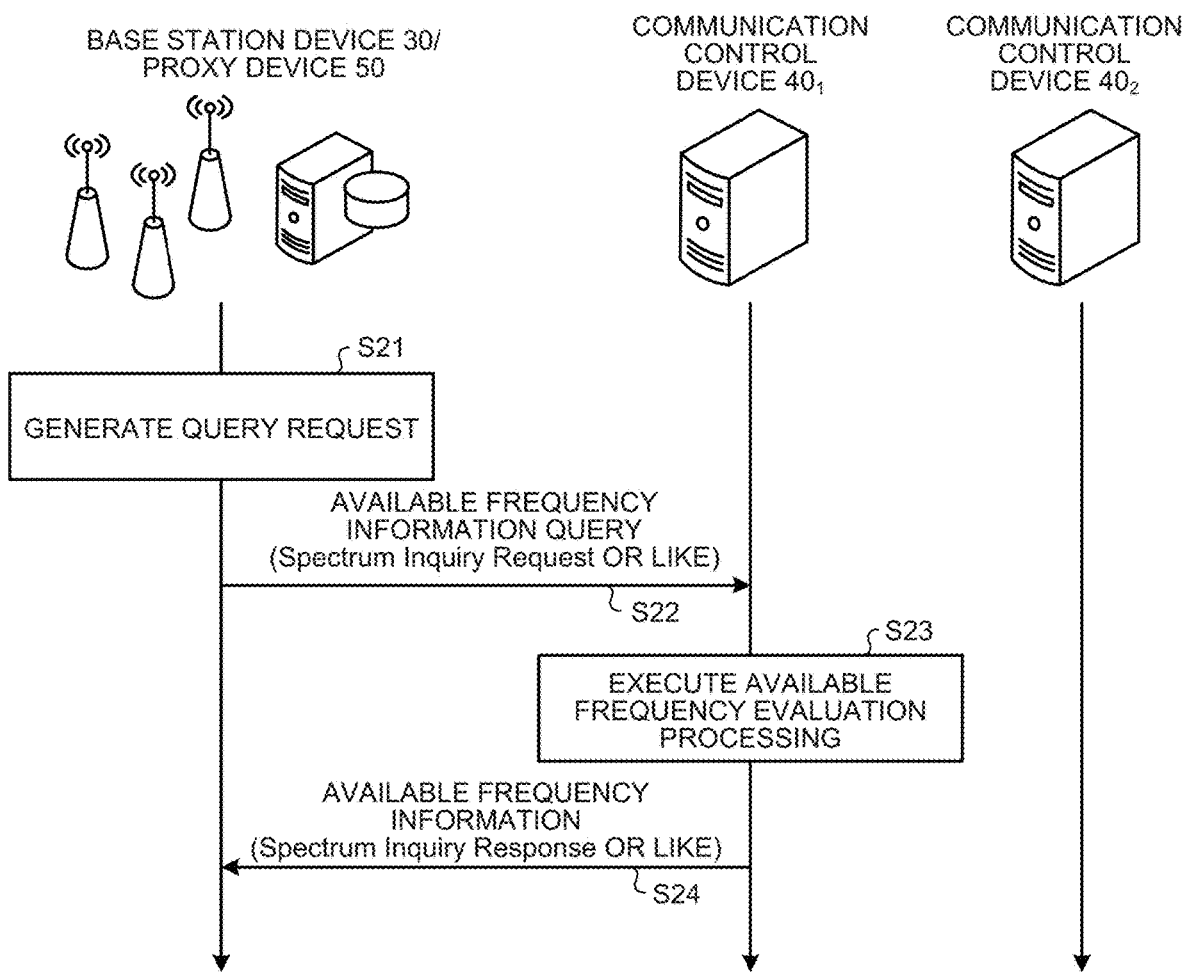
FIG. 17 is a sequence diagram for explaining an available spectrum query procedure.

FIG. 17 is a sequence diagram for explaining an available spectrum query procedure. The base station device 30 or the proxy device 50 generates a query request including information that can identify the relevant base station device 30 (or the base station device 30 under the relevant proxy device 50) (step S21) and notifies the communication control device 40 (step S22).

After receiving the query request, the communication control device 40 evaluates the available frequencies on the basis of the query requirement information (step S23). For example, as described in Examples 1 to 3 above, it is possible to evaluate the available frequencies in consideration of the existence of the primary system, the secondary use prohibition area thereof, and the nearby base station device 30.

As described in Example 4 above, the communication control device 40 may derive the maximum acceptable transmission power information. Typically, the calculation is performed by using information on the acceptable interference power in the primary system or the protection zone thereof, information on calculation reference point for the interference power level applied to the primary system, registration information for the base station device 30, and a propagation loss estimation model. Specifically, as an example, the calculation is performed by the following formula.

$$P_{MaxTx(dBm)} = I_{Th(dBm)} + PL(d)_{(dB)} \quad (1)$$

Herein, $P_{MaxTx(dBm)}$ is the maximum acceptable transmission power, $I_{Th(dBm)}$ is the acceptable interference power, d is a distance between the reference point and the base station device 30, and $PL(d)_{(dB)}$ is propagation loss at distance d. Although the antenna gain in the transmitter/receiver is not explicitly shown in this formula, the antenna gain may be included depending on a maximum acceptable transmission power expression method (EIRP, Conducted power, or the like) or a reception power reference point (an antenna input point, an antenna output point, or the like). Further, a safety margin or the like for compensating for fluctuations due to fading may be included. Further, feeder loss or the like may be considered as necessary.

Further, the above formula is described on the basis of the assumption that the single base station device 30 is an interference source. For example, in a case where it is necessary to consider aggregated interference from a plurality of base station devices 30 at the same time, a correction value may be added. Specifically, for example, the correction value may be determined on the basis of three types (Fixed/Predetermined, Flexible, and Flexible Minimized) of interference margin methods disclosed in Non Patent Literature 3.

Incidentally, although the above formula is expressed using a logarithm, at the time of implementation, the formula may be used in the state of being converted into an antilogarithm as a matter of course. Further, all the parameters in logarithmic notation described in this embodiment may be appropriately converted into base numbers and used.

(1) Method 1

Further, as described in the above section (details of required parameters), in a case where the transmission power information is included in the query requirement information, the available frequency can be evaluated by a method different from the above method. Specifically, for example, in a case where it is assumed that a desired transmission power indicated by the transmission power information is used, when the estimated applied interference amount is less than the acceptable interference power in the primary system or the protection zone thereof, it is determined that the relevant frequency channel is available, which is notified to the base station device 30 (or the proxy device 50).

(2) Method 2

Although an example has been described in which the band use condition is calculated on the basis of the above-described other system-related information, the present disclosure is not limited to such an example. For example, as in the Radio Environment Map (REM) area, in a case where an area/space in which the base station device 30 can use the shared band is predetermined, the available frequency information may be derived only on the basis of the above position-related information and the above height-related information. Further, for example, even in a case where a look-up table for associating the position and height with the available frequency information is prepared, the available frequency information may be derived only on the basis of the position-related information and the height-related information.

The evaluation of available frequencies does not necessarily need to be performed after receiving the query request. For example, after the above-described registration procedure is normally completed, the communication control device 40 may perform operation independently without the query request. In such a case, the communication control device 40 may create the REM or the look-up table exemplified in Method 2 or an information table similar to them.

In either method, the radio wave use priority such as PAL or GAA may be evaluated. For example, when the registered device parameter or the query requirement includes information regarding the radio wave use priority, whether or not the spectrum use is available may be determined on the basis of the relevant priority, and the result may be notified. Further, for example, as disclosed in Non Patent Literature 2, in a case where information (called a Cluser List in Non Patent Literature 2) regarding the base station device 30 on which a user performs high priority use (for example, PAL) in advance is registered in the communication control device 40, the evaluation may be performed on the basis of the information.

After the evaluation of the available frequency is completed, the communication control device 40 notifies the base station device 30 (or the proxy device 50) of the evaluation result (step S24). The base station device 30 may select desired communication parameters by using the evaluation result received from the communication control device 40.

<5-3. Spectrum Grant Procedure>

A spectrum grant procedure is a procedure for the base station device 30 to obtain a secondary spectrum grant from the communication control device 40. Typically, after the normal completion of the registration procedure, the base station device 30 or one or more communication systems including a plurality of base station devices 30 start the procedure by notifying the communication control device 40 of a spectrum grant request including information which can identify the relevant base station device 30. This notification may be made by the proxy device 50. Incidentally, "after the normal completion of the registration procedure" also means that it is not always necessary to perform the available spectrum query procedure.

In the present invention, it is assumed that at least following two types of spectrum grant request methods may be used.

Designation method

Flexible method

The designation method is a request method in which the base station device 30 designates at least the frequency band desired to use and the maximum transmission power as desired communication parameters and requests the communication control device 40 to permit an operation based on the desired communication parameters. It is not always necessary to be limited to these parameters, and parameters (modulation method, duplex mode, or the like) specific to the wireless interface technology may be designated. Further, information indicating radio wave use priority such as PAL and GAA may be included.

The flexible method is a request method in which the base station device 30 designates only requirements related to the communication parameters and requests the communication control device 40 to designate the communication parameters which satisfy the relevant requirements and allow the secondary use permission. The requirements related to the communication parameters may include a bandwidth, a desired maximum transmission power, or a desired minimum transmission power. It is not always necessary to be limited to these parameters, and parameters (modulation method, duplex mode, or the like) specific to the wireless interface technology may be designated. Specifically, for example, one or more of TDD Frame Configurations may be selected in advance and notified.

Either method may include a measurement report. The measurement report includes the results of the measurement performed by the terminal device 20 and/or the base station device 30. For example, the measurement report may include processed information as well as raw data. For example, standardized metrics represented by Reference Signal Received Power (RSRP), Reference Signal Strength Indicator (RSSI), and Reference Signal Received Quality (RSRQ) may be used.

[Details of Spectrum Grant Processing]

Figure 18:
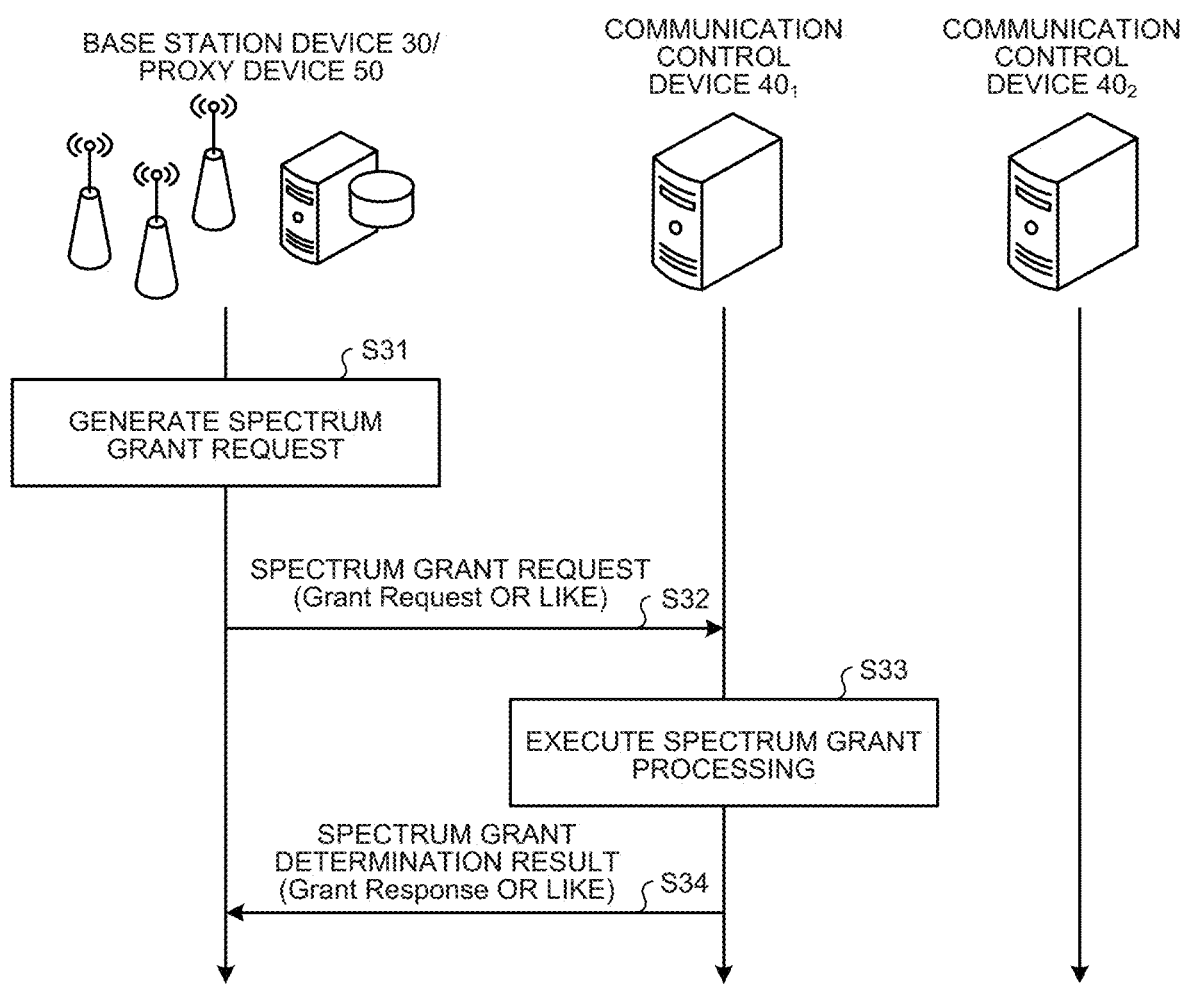
FIG. 18 is a sequence diagram for explaining a spectrum grant procedure.

FIG. 18 is a sequence diagram for explaining a spectrum grant procedure. The base station device 30 or one or more communication systems including a plurality of base station devices 30 generate the spectrum grant request including information which can identify the relevant base station device (step S31) and notify the communication control device 40 (step S32). The proxy device 50 may generate and/or notify the request. The spectrum grant request is acquired, for example, by the acquisition unit of the communication control device 40.

After acquiring the spectrum grant request, the communication control device 40 performs the spectrum grant processing on the basis of the spectrum grant request method (step S33). For example, the communication control device 40 can perform the spectrum grant processing in consideration of the existence of the primary system, the secondary use prohibition area thereof, and the nearby base station device 30 by using the method described in Examples 1 to 3 of <5-2. Available spectrum query procedure>.

In a case where the flexible method is used, the communication control device 40 may derive the maximum acceptable transmission power information by using the method described in Example 4 of <5-2. Available spectrum query procedure>. Typically, the communication control device 40 calculates the maximum acceptable transmission power by using information on the acceptable interference power in the primary system or the protection zone thereof, information on the calculation reference point for the interference power level applied to the primary system, the registration information for the base station device 30, and the propagation loss estimation model. For example, the communication control device 40 calculates the maximum acceptable transmission power by following formula (2).

$$P_{MaxTx(dBm)} = I_{Th(dBm)} + PL(d)_{(dB)} \quad (2)$$

Herein, $P_{MaxTx(dBm)}$ is the maximum acceptable transmission power, $I_{Th(dBm)}$ is the acceptable interference power, d is a distance between the reference point and the base station device 30, and $PL(d)_{(dB)}$ is propagation loss at distance d. Although the antenna gain in the transmitter/receiver is not explicitly shown in this formula, the formula may be modified and used according to a maximum acceptable transmission power expression method (EIRP, Conducted power, or the like) or a reception power reference point (an antenna input point, an antenna output point, or the like). Further, a safety margin or the like for compensating for fluctuations due to fading may be included. Further, feeder loss or the like may be considered as necessary.

Further, the above formula is described on the basis of the assumption that the single base station device 30 is an interference source. For example, in a case where it is necessary to consider aggregated interference from a plurality of base station devices 30 at the same time, a correction value may be added. Specifically, for example, the correction value may be determined on the basis of three types (Fixed/Predetermined, Flexible, and Flexible Minimized) of methods disclosed in Non Patent Literature 3.

Various models may be used as the propagation loss estimation model. In a case where a model is designated for each purpose, it is desirable to use the designated model. For example, in Non Patent Literature 6, a propagation loss model such as Extended Hata (eHATA) or Irregular Terrain Model (ITM) is adopted for each purpose. Of course, in practicing the present invention, the propagation loss model need not be limited to these.

In a case where a model is not designated for a predetermined purpose, a model may be used selectively as necessary. As a specific example, for example, selective use can be performed such that an aggressive model such as a free space loss model is used when the applied interference power to another base station device 30 is estimated, and a conservative model is used when the coverage of the base station device 30 is estimated.

In a case where the designation method is used, it is possible to perform spectrum grant processing by using the method described in Method 1 of <5-2. Available spectrum query procedure>. Specifically, for example, in a case where it is assumed that a desired transmission power indicated by the transmission power information is used, when the estimated applied interference amount is less than the acceptable interference power in the primary system or the protection zone thereof, it is determined that the use of the relevant frequency channel can be granted, which is notified to the base station device 30 (or the proxy device 50).

In either method, the radio wave use priority such as PAL or GAA may be evaluated. For example, when the registered device parameter or the query requirement includes information regarding the radio wave use priority, whether or not the spectrum use is available may be determined on the basis of the relevant priority, and the result may be notified. Further, for example, as disclosed in Non Patent Literature 2, in a case where information (called a Cluser List in Non Patent Literature 2) regarding the base station device 30 on which a user performs high priority use (for example, PAL) in advance is registered in the communication control device 40, the evaluation may be performed on the basis of the information.

The spectrum grant processing does not necessarily have to be performed when the request is received. For example, after the above-described registration procedure is normally completed, the communication control device 40 may perform operation independently without the spectrum grant request. Further, for example, spectrum grant determination processing may be performed at regular intervals. In such a case, the REM or the look-up table exemplified in Method 2 of <5-2. Available spectrum query procedure> or an information table similar to them may be created.

After the spectrum grant processing is completed, the communication control device 40 notifies the base station device 30 of the determination result (step S34).

<5-4. Spectrum Use Notification/Heartbeat>

The spectrum use notification is a procedure in which the base station device 30 or the proxy device 50 notifies the communication control device 40 of the spectrum use based on the communication parameters approved for use in the spectrum grant procedure. Typically, the base station device 30 or the proxy device 50 starts the procedure by notifying the communication control device 40 of a notification message including information that can identify the relevant base station device 30.

It is desirable that this procedure is carried out periodically until the use of frequency is rejected by the communication control device 40. When this procedure is normally completed, the base station device 30 may start or continue radio wave transmission. For example, if the grant state is Granted, the grant state transitions to Authorized due to the success of this procedure. Further, if the grant state is Authorized, the grant state transitions to Granted or Idle due to the failure of this procedure.

Here, the grant is an authorization for radio wave transmission given to the base station device 30 (for example, CBSD) by the communication control device 40 (for example, SAS). The grant can be referred to as a permission to use radio resources (frequency resources). This grant is described, for example, in Non Patent Literature 2. In Non Patent Literature 2, a signaling protocol between a database (SAS) and a base station (CBSD) for spectrum sharing of 3550-3700 MHz in the United States is standardized. In this standard, the permission of radio wave transmission given to CBSD by SAS is called "grant". The operation parameters accepted in the grant are defined by two of the maximum acceptable EIRP (Equivalent Isotropic Radiated Power) and the frequency channel. That is, in order to transmit radio waves by using a plurality of frequency channels, CBSD needs to acquire a plurality of grants from SAS.

Figure 19:
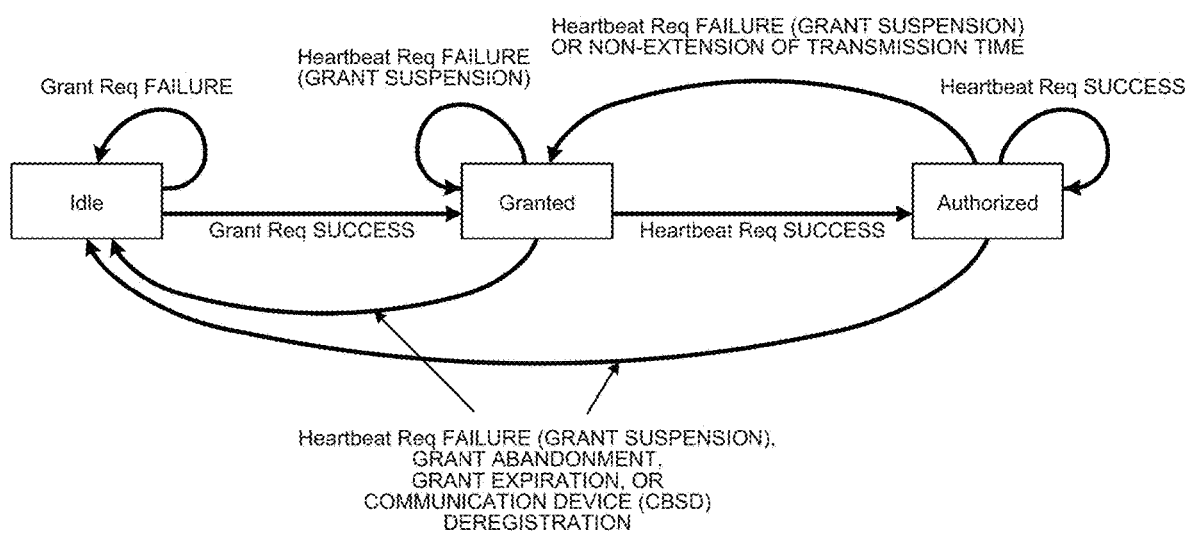
FIG. 19 is a state transition diagram illustrating a permission state of radio wave transmission.

In the grant, a state indicating the permission state of radio wave transmission is defined. FIG. 19 is a state transition diagram illustrating the permission state of radio wave transmission. In FIG. 19, the Granted state indicates a state in which the grant is possessed, but radio wave transmission is prohibited, and the Authorized state indicates a state in which radio wave transmission is permitted on the basis of the operation parameter value defined in the grant. These two states transition according to the result of the heartbeat procedure defined in the same standard.

In the following description, the spectrum use notification may be referred to as a heartbeat request or simply a heartbeat. Further, the transmission interval of the heartbeat request may be called a heartbeat interval. Incidentally, the description of the heartbeat request or the heartbeat appearing in the following description can be appropriately replaced with another description indicating "the request for starting or continuing radio wave transmission". Similarly, the heartbeat interval can be replaced with another description (for example, transmission interval) indicating the transmission interval of the spectrum use notification.

Figure 20:
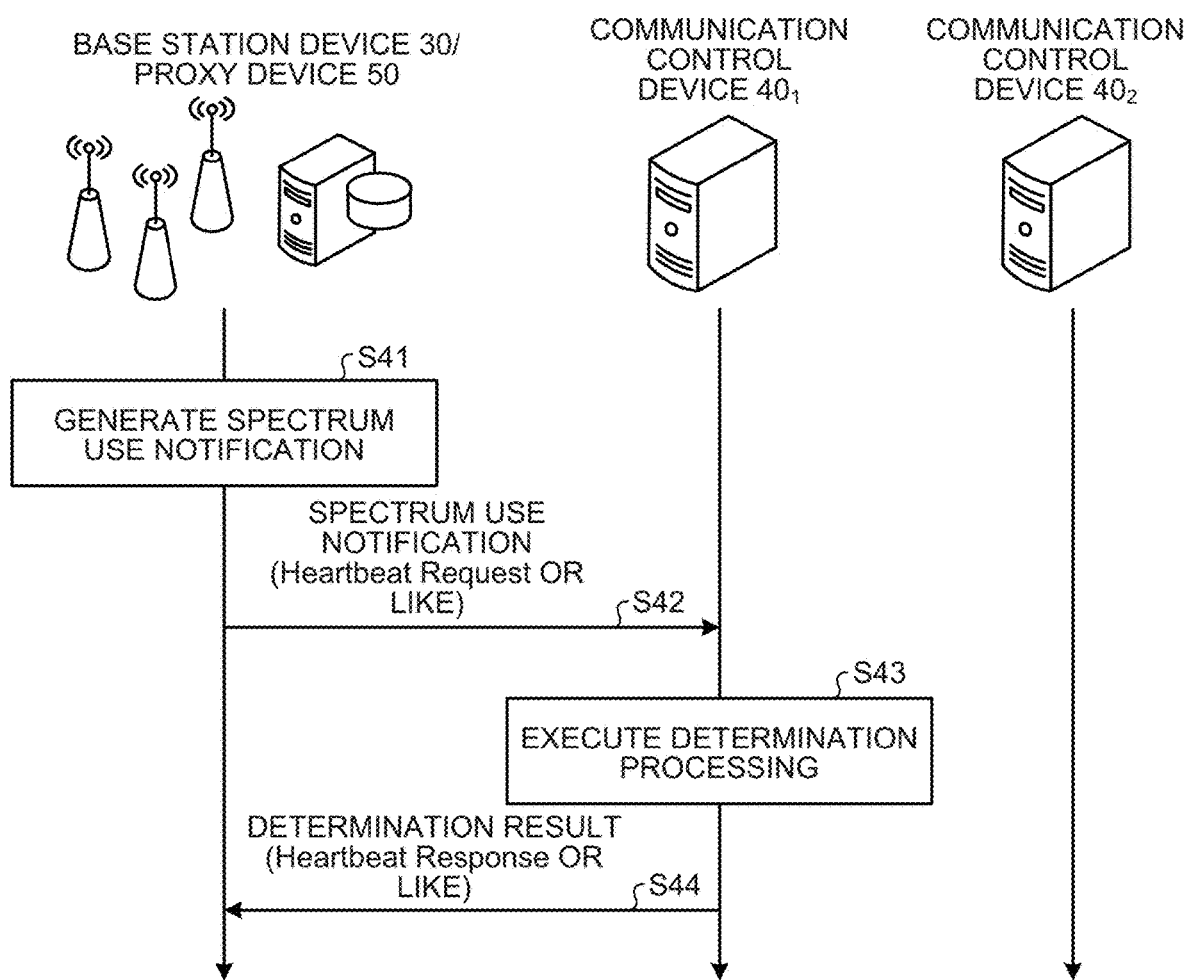
FIG. 20 is a sequence diagram for explaining a spectrum use notification procedure.

FIG. 20 is a sequence diagram for explaining a spectrum use notification procedure. The base station device 30 or one or more communication systems including a plurality of base station devices 30 generate the notification message including information which can identify the relevant base station device 30 (step S41) and notify the communication control device 40 (step S42). The proxy device 50 may generate and/or notify the message.

After receiving the spectrum use notification, the communication control device 40 may determine whether the start/continuation of radio wave transmission is permitted (step S43). Examples of a determination method include checking spectrum use information of the primary system. Specifically, the permission or refusal of the start/continuation of radio wave transmission can be determined on the basis of the change in the use frequency of the primary system, the change in the spectrum use state of the primary system (for example, a carrier-based radar) with unsteady radio wave use, and the like.

When the determination processing is completed, the communication control device 40 notifies the base station device (or the proxy device 50) of the determination result (step S44).

In this procedure, a reconfiguration command of the communication parameter may be issued from the communication control device 40 to the base station device 30 (or the proxy device 50). Typically, it may be executed in the response of the spectrum use notification. For example, recommended communication parameter information may be provided.

<5-5. Supplement to Various Procedures>

Here, various procedures do not necessarily have to be executed individually as described below. For example, by substituting a third procedure having the role of two different procedures, the above two different procedures may be realized. Specifically, for example, the registration request and the available frequency information query request may be notified integrally. Further, for example, the spectrum grant procedure and the spectrum use notification may be executed integrally. As a matter of course, the combination is not limited thereto and may be three or more. Further, the above procedures may be executed separately.

In a case where this embodiment is applied for the purpose of spectrum sharing with an incumbent system, it is desirable that the appropriate one among various procedures or equivalent procedures is selected and used on the basis of the Radio Law relating to the relevant frequency band in the country/region where the technology of this embodiment is executed. For example, in a case where the registration of the communication device is obligatory for the use of a specific frequency band in a specific country/region, it is desirable that the above registration procedure is executed.

The expression "acquiring information" or an expression equivalent thereto in this embodiment does not necessarily mean that the information is acquired according to the above procedure. For example, although it is described that the position information of the base station device 30 is used in available frequency evaluation processing, it is not always necessary to use the information acquired in the registration procedure, and in a case where position information is included in an available frequency query procedure request, the position information may be used. In other words, it means that the described parameters may be included in other procedures within the scope described in this embodiment and within the technical feasibility.

The information that may be included in the response from the communication control device 40 to the base station device 30 (or the proxy device 50) shown in the above procedure may be push-notified. As a specific example, the available frequency information, the recommended communication parameter information, the radio wave transmission continuation refusal notification, and the like may be push-notified.

<5-6. Procedures Regarding Terminal Devices>

As for the terminal device 20, basically, each procedure described in <5-1> to <5-4> can be used. However, unlike the base station device 30, the terminal device 20 has mobility. That is, the position information is dynamically updated. According to the legislation, in a case where the position information changes a certain level or more, re-registration to the communication control device 40 may be required. In this regard, in the operation mode (see Non Patent Literature 4) defined by the Office of Communication (Ofcom), the following two types of communication parameters are defined.

Specific Operational Parameters
Generic Operational Parameters

The specific operational parameters are defined as "operation parameters specific to a specific slave White Space Device (WSD)" in the Non Patent Literature. In other words, the specific operational parameters are communication parameters calculated by using the device parameter of the slave WSD corresponding to the terminal device 20. As a feature, the specific operational parameters are calculated by White Space Database (WSDB) by using the position information of the slave WSD.

From such a feature, it is assumed that the specific operational parameters are suitable for the terminal devices 20 installed with low mobility or fixedly.

The generic operational parameters are defined as "operation parameters which can be used by any slave WSD positioned within the coverage area of a predetermined master WSD (corresponding to the base station device 30)" in the Non Patent Literature. As a feature, the generic operational parameters are calculated by WSDB without using the position information of the slave WSD.

From such a feature, it is assumed that the generic operational parameters are suitable for the terminal device 20 with high mobility.

These information for the terminal device 20 may be provided by unicast/broadcast from the base station device 30. For example, a broadcast signal represented by Contact Verification Signal (CVS) defined in FCC Regulation Part 15 Subpart H may be used. Alternatively, the information may be provided by a broadcast signal specific to the wireless interface. Specifically, for example, the information may be provided by Physical Broadcast Channel (PBCH), NR-PBCH, or the like used in LTE and 5G NR.

<5-7. Procedures Occurring Between Communication Control Devices>

[Information Exchange]

Figures 21, 22:
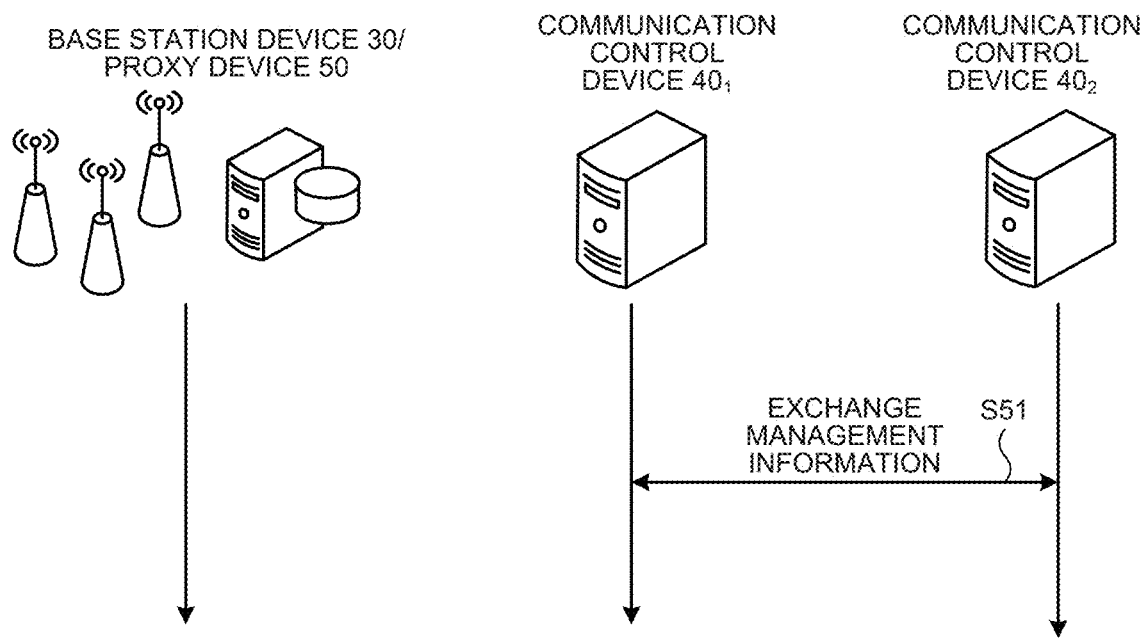
FIG. 21 is a sequence diagram for explaining an exchanging procedure of management information.
FIG. 22 is a diagram illustrating an example of a device which executes protection target selection and interference control.

The communication control device 40 can exchange management information with another communication control device 40. FIG. 21 is a sequence diagram for explaining an exchanging procedure of the management information. In the example of FIG. 21, the communication control device 40$_1$ and the communication control device 40$_2$ exchange information. Of course, the communication control device which exchanges information is not limited to two of the communication control device 40$_1$ and the communication control device 40$_2$.

In the exchanging procedure of the management information, it is desirable that at least the following information is exchanged.

Communication device registration information
Communication device communication parameter information
Area information The communication device registration information is typically the device parameter of the base station device 30 registered in the communication control device 40 in the registration procedure. Not all registered information needs to be exchanged. For example, information that may correspond to personal information does not need to be exchanged. Further, when the communication device registration information is exchanged, the encrypted/ambiguous information may be exchanged. For example, information converted into a binary value or information signed using an electronic signature mechanism may be exchanged.

The communication device communication parameter information is typically information related to the communication parameters currently used by the base station device 30. It is desirable to include at least information indicating the use frequency and the transmission power. Other communication parameters may be included.

The area information is typically information indicating a predetermined geographic area. This information may include area information of various attributes in various aspects.

For example, the protection zone information of the base station device 30 which is a high-priority secondary system such as PAL Protection Area (PPA) disclosed in Non Patent Literature 5 may be included. The area information in this case may be expressed by, for example, a set of three or more geographic position coordinates. Further, for example, in a case where a plurality of communication control devices 40 can refer to a common external database, the area information may be represented by an ID indicating the relevant information.

For example, the information indicating the coverage of the base station device 30 may be included. The area information in this case may also be expressed by, for example, a set of three or more geographic position coordinates. Further, for example, assuming a circle with the geographic position of the base station device 30 as the origin, the area information may also be expressed by information indicating a radius size. Further, for example, in a case where a plurality of communication control devices 40 can refer to a common external database, the area information may be represented by an ID indicating the relevant information.

As another aspect, information regarding the area division predetermined by the government or the like may be included. Specifically, for example, it is possible to indicate a certain area by indicating an address. Further, for example, a license area and the like may be represented in the same manner.

As still another aspect, the area information does not necessarily have to express a flat area, and may express a three-dimensional space. For example, it may be expressed using a spatial coordinate system. Further, for example, information, such as the number of floors of the building, the floor, or the room number, which indicates a predetermined closed space may be used.

This information may be exchanged in various ways. The examples thereof are shown below.

ID designation method
Period designation method
Area designation method
Dump method The ID designation method is a method of using an ID assigned in advance to identify the information managed by the communication control device 40 to acquire information corresponding to the above ID. For example, it is assumed that the communication control device 40$_1$ manages the base station device 30 with ID: AAA. At this time, the communication control device 40$_2$ designates the ID: AAA with respect to the communication control device 40$_1$ and makes an information acquisition request. After receiving the request, the communication control device 40$_1$ searches for ID: AAA information and notifies the registration information and communication parameter information of the corresponding base station device 30 by a response.

In the period designation method, a specific period is designated, and information satisfying a predetermined condition during the period may be exchanged.

Examples of the predetermined conditions include whether or not information is updated. For example, in a case where the acquisition of communication device information in a specific period is designated in the request, the registration information of the base station device 30 newly registered in the period or the registration information and the communication parameter information of the base station device 30 of which the communication parameters are changed may be notified in the response.

Examples of the predetermined condition include whether or not the communication control device 40 is in progress of recording. For example, in a case where the acquisition of communication device information in a specific period is designated in the request, the registration information and the communication parameter information of the base station device 30 recorded by the communication control device 40 in the relevant period may be notified in the response. Further, the latest information during the relevant period may be notified. Alternatively, the update history for each information may be notified.

In the area designation method, a specific area is designated, and information belonging to the relevant area is exchanged. For example, in a case where the acquisition of communication device information in a specific area is designated in the request, the registration information and the communication parameter information of the base station device 30 installed in the relevant area may be notified in the response.

The dump method is a method of providing all the information recorded by the communication control device 40. It is desirable that at least the information and area information regarding the base station device 30 are provided by the dump method.

All the explanations about the information exchange between the communication control devices 40 so far are based on a pull method. That is, it is a form in which the information corresponding to the parameter designated in the request is responded, and the exchange may be realized by an HTTP GET method, as an example. However, the invention does not have to be limited to the pull method, and information may be actively provided to another communication control device 40 by a push method. The push method may be realized by an HTTP POST method as an example.

[Command/Request Procedure]

The communication control devices 40 may execute commands and/or requests to each other. Specifically, the reconfiguration of the communication parameter of the base station device 30 can be mentioned as an example. For example, in a case where it is determined that the base station device $30_1$ managed by the communication control device $40_1$ receives a large amount of interference from the base station device $30_4$ managed by the communication control device $40_2$, the communication control device $40_1$ may request the communication control device $40_2$ to change the communication parameters of the base station device $30_4$.

Another example is the reconfiguration of area information. For example, in a case where it is seen that the calculation of the coverage information and the protection zone information regarding the base station device $30_4$ managed by the communication control device $40_2$ is inadequate, the communication control device $40_1$ may request the communication control device $40_2$ to reconfigure the relevant area information. In addition to this, a request for reconfiguration of area information may be made for various reasons.

6. Protection Target Selection

Next, protection target selection will be described.

<6-1. Operation Subject of Protection Target Selection>

FIG. 22 is a diagram illustrating an example of a device which executes the protection target selection and the interference control. This protection target selection and interference control are performed by the communication control device 40. That is, the communication control device 40 controls the communication parameters of the communication devices of the secondary system such as the terminal device 20 and the base station device 30. Alternatively, this protection target selection and interference control selection are executed by the communication device of the secondary system. Alternatively, the device which executes the protection target selection and the device which executes the interference control may be separate.

Figure 23:
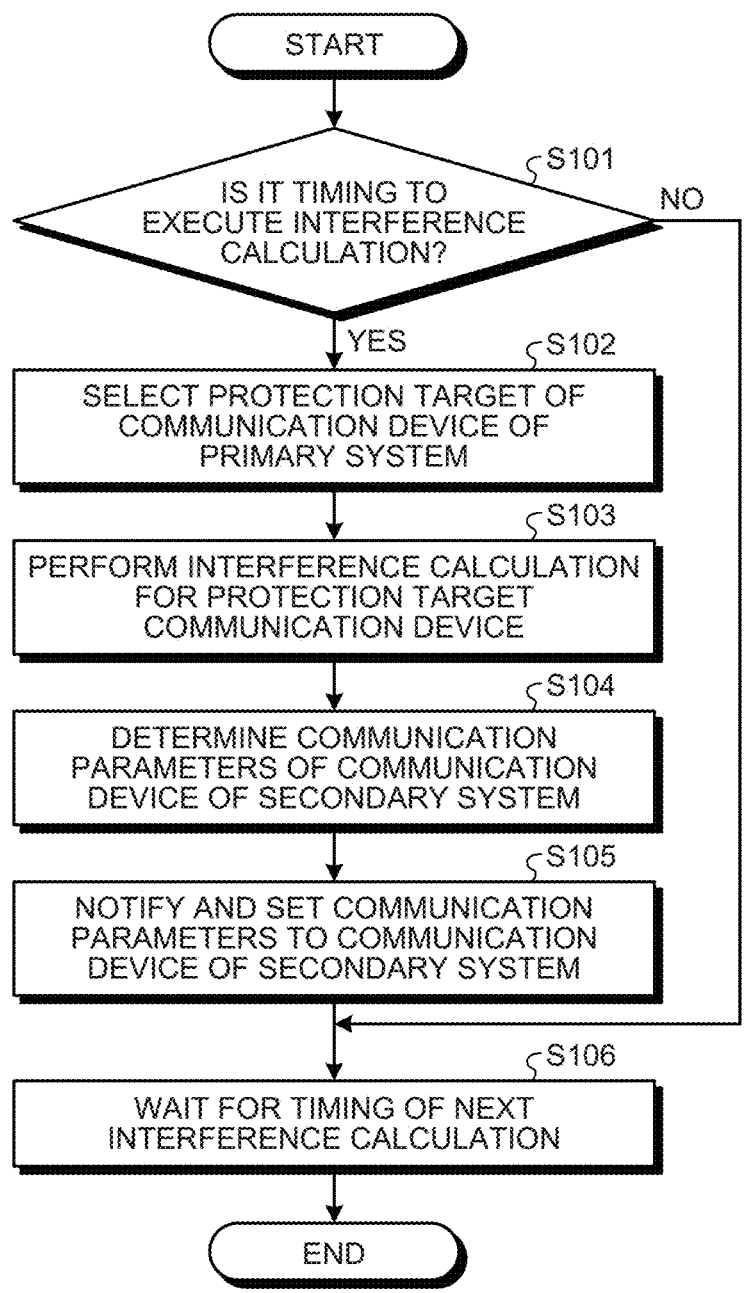
FIG. 23 is a diagram illustrating an example of a communication parameter setting flow of a communication device of a secondary system.

FIG. 23 is a diagram illustrating an example of a communication parameter setting flow of the communication device of the secondary system. In the example of FIG. 23, an example is described in which the same device executes the protection target selection and interference control (the cases corresponding to Examples 1 and 2 in FIG. 22). For example, each step of the flow illustrated in FIG. 23 is executed by the communication control device 40 or the communication device (the terminal device 20 and the base station device 30) of the secondary system. Here, Example 1 illustrated in FIG. 22 is described as an example, and the description is given with the operation subjects of the flow unified to the communication control device 40.

As illustrated in FIG. 23, when it is timing to execute the interference calculation (step S101 Yes), the selection unit 441 of the communication control device 40 selects the protection target of the communication device 10 of the primary system (step S102). Subsequently, the calculation unit 442 of the communication control device 40 performs the interference calculation with respect to the communication device of the protection target selected in step S102 (step S103). Incidentally, in a case where it is not the timing to execute the interference calculation (step S101 No), the process proceeds to step S106.

Then, the determination unit 443 of the communication control device 40 determines the communication parameters of the communication devices of the secondary system such as the terminal device 20 and the base station device 30 (step S104). Subsequently, the notification unit 445 of the communication control device 40 notifies the communication device of the secondary system such as the terminal device 20 and the base station device 30 of the communication parameter, and sets the relevant communication parameter in the communication device of the secondary system (step S105). Thereafter, the selection unit 441 of the communication control device 40 waits for the timing of the next interference calculation (step S106).

Figure 24:
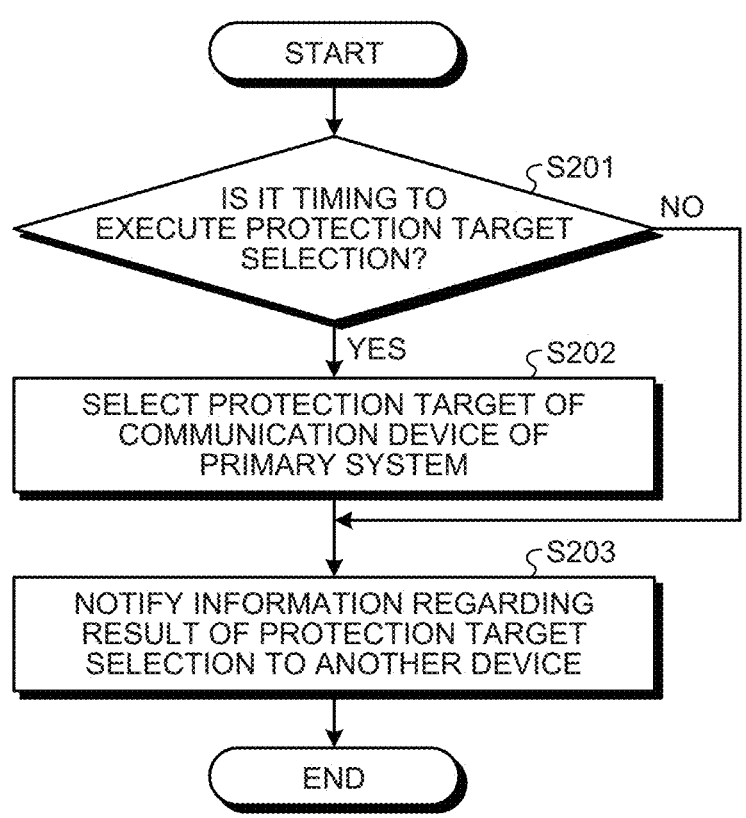
FIG. 24 is a diagram illustrating an example of a protection target selection flow of a communication device of a primary system.

FIG. 24 is a diagram illustrating an example of a protection target selection flow of the communication device 10 of the primary system. In the example of FIG. 24, an example is described in which different devices execute the protection target selection and interference control (the cases corresponding to Examples 3 and 4 in FIG. 22). Here, Example 3 illustrated in FIG. 22 is described as an example, and the description is given with the operation subject of the flow as the communication control device 40.

As illustrated in FIG. 24, when it is timing to execute the protection target selection (step S201 Yes), the selection unit 441 of the communication control device 40 selects the protection target of the communication device 10 of the primary system (step S202). Then, the notification unit 445 of the communication control device 40 notifies another device, in this example, the communication device of the secondary system such as the terminal device 20 and the base station device 30 of the information regarding the result of the protection target selection in step S202 (step S203), and the process ends.

Figure 25:
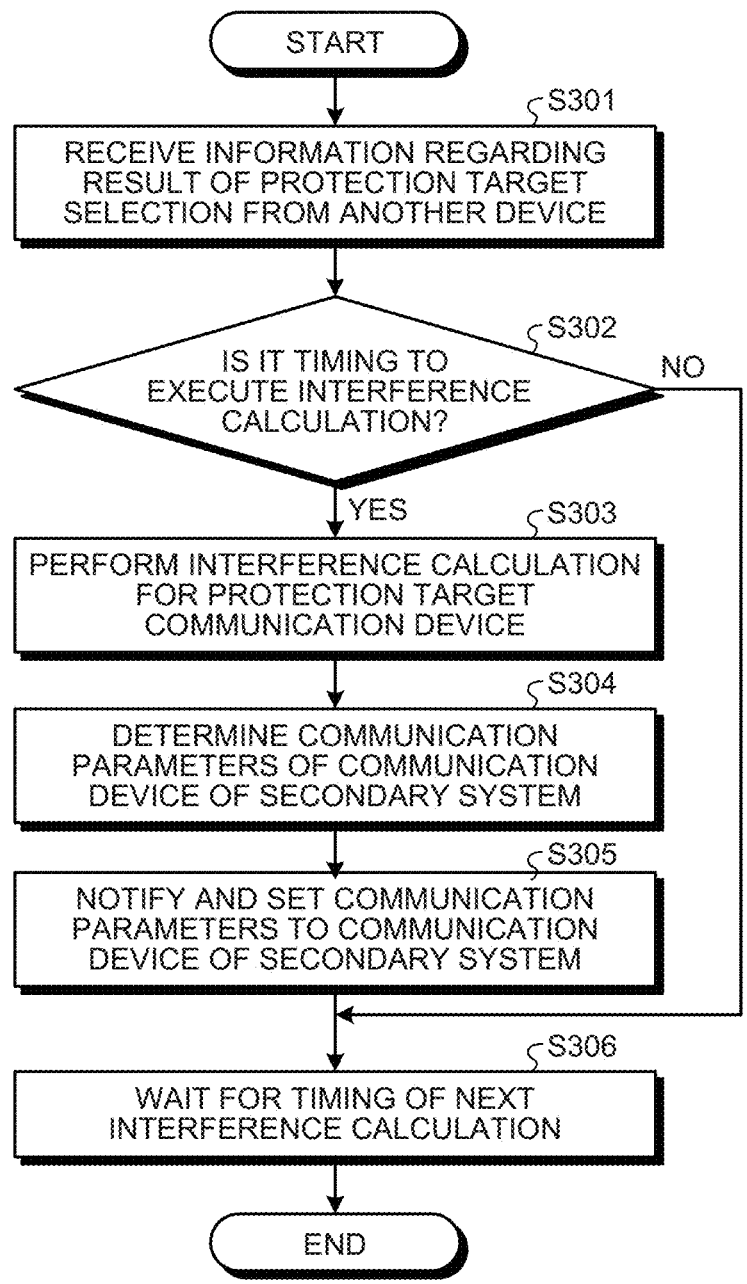
FIG. 25 is a diagram illustrating another example of the communication parameter setting flow of the communication device of the secondary system.

FIG. 25 is a diagram illustrating another example of the communication parameter setting flow of the communication device of the secondary system. In the example of FIG. 25, an example is described in which different devices execute the protection target selection and interference control (the cases corresponding to Examples 3 and 4 in FIG. 22). Here, Example 4 illustrated in FIG. 22 is described as an example, and the description is given with the operation subject of the flow as the base station device 30.

As illustrated in FIG. 25, the base station device 30 receives information regarding the result of protection target selection from another device (the terminal device 20 and the communication control device 40) (step S301). At this time, when it is timing to execute the interference calculation (step S302 Yes), the calculation unit 342 of the base station device 30 performs the interference calculation on the communication device of the protection target received in step S301 (step S303). Incidentally, in a case where it is not the timing to execute the interference calculation (step S302 No), the process proceeds to step S306.

Subsequently, the determination unit 343 of the base station device 30 determines the communication parameters of the communication devices of the secondary system such as the terminal device 20 and the base station device 30 (step S304). Subsequently, the setting unit 344 of the base station device 30 sets the communication parameters in the storage unit 32, and the notification unit 345 of the base station device 30 notifies another base station device 30, subordinate terminal devices 20, and the like of the communication parameters (step S305). Thereafter, the base station device 30 waits for the timing of the next interference calculation (step S306).

Incidentally, in FIGS. 23 to 25, the protection target selection, the interference control, and the communication parameter setting may be executed in a case where a predetermined timing condition is satisfied. Further, the predetermined timing condition may be changed depending on whether or not the primary system includes an aerial communication device. In a case where the protection target selection and the interference control are performed by different devices, the device which executes the protection target selection notifies another device of the result of the selection or the information regarding the selection result. For example, the other device is a device which executes the interference control or the setting of the communication parameters of the communication device of the secondary system.

<6-2. Selection of Interference Protection Target for Aerial Communication Device>

In this embodiment, when the secondary system selects the communication device 10 of the primary system to be protected, the selection unit 441 of the communication control device 40 or the like switches a selection criterion depending on whether or not the target primary system includes the aerial communication device 10A.

Figure 26:
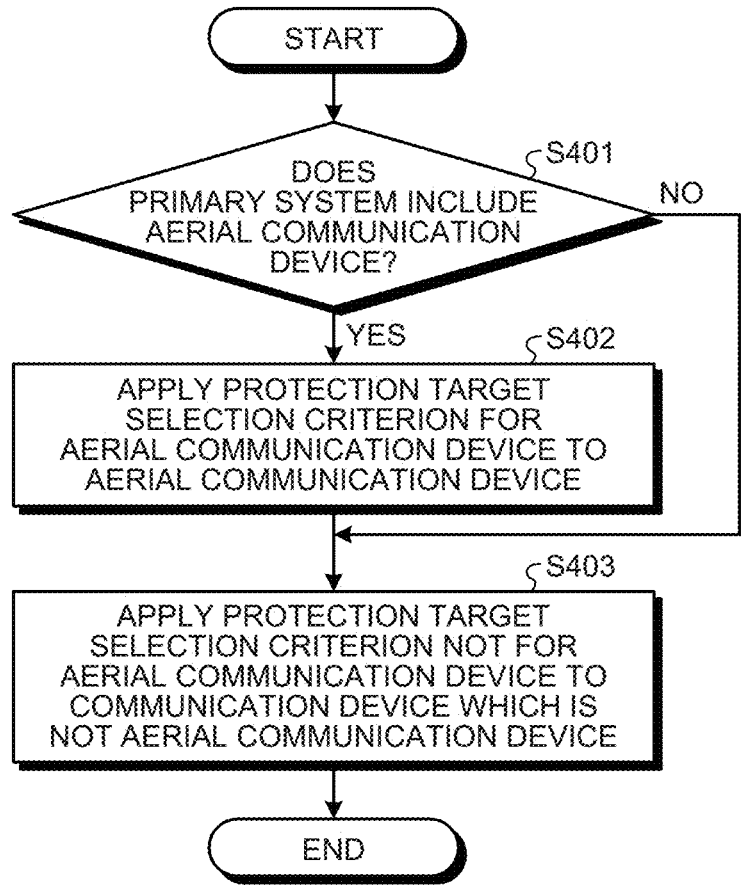
FIG. 26 is a diagram illustrating an example of the protection target selection flow for explaining a selection criterion.

FIG. 26 is a diagram illustrating an example of the protection target selection flow for explaining the selection criterion. Here, as an example, the operation subject of the flow is described as the communication control device 40. As illustrated in FIG. 26, in a case where the target primary system includes the aerial communication device 10A (step S401 Yes), the selection unit 441 of the communication control device 40 applies the protection target selection criterion for the aerial communication device 10A to the aerial communication device 10A (step S402).

Further, in a case where the primary system does not include the aerial communication device 10A (step S401 No) or in the case of a communication device other than the aerial communication device 10A among the primary system including the aerial communication device 10A, the following processing is performed. That is, the selection unit 441 of the communication control device 40 applies a protection target selection criterion which is not for the aerial communication device 10A (step S403).

In this embodiment, the protection target range used for selecting the aerial communication device 10A is set to the air above the terminal device 20, the base station device 30, or the like with reference to the position of the communication device of the secondary system system such as the terminal device 20 or the base station device 30. The "air above" described here is not limited to the air directly above the communication device of the secondary system system, for example, the air in the normal direction of the horizontal plane where the communication device of the secondary system system is positioned. For example, a predetermined range of horizontal plane including the position on the horizontal plane where the communication device of the secondary system system exists and the air above the predetermined range of horizontal plane in the normal direction may be included. Further, the invention is not limited to the normal direction from the horizontal plane, and a space where a boundary is made by a line having an acute angle with the horizontal plane is also included in the air.

In this embodiment, as an example of the protection target selection criterion for the aerial communication device 10A, the position (an elevation angle (an elevation angle from the ground surface or the secondary communication device), an altitude (a distance from the ground surface or the secondary system communication device), and the like) of the aerial communication device 10A is used. Further, the target frequency channel and surrounding terrain are also included in the protection target selection criterion. In such setting of the protection target selection criterion, the protection target selection is executed by the selection unit 441 of the communication control device 40 or the communication device of the secondary system such as the terminal device 20 and the base station device 30.

When setting the range of protection target based on the elevation angle, it is desirable to consider the surrounding environment of the communication device 10 of the primary system and the communication device of the secondary system such as the terminal device 20 and the base station device 30. As the surrounding environment, for example, whether or not the link between communication devices is Line-of-Sight (LOS) or Non Line-of-Sight (NLOS) and the terrain is Indoor, Urban, Sub-urban, Rural, Open Sky, or the like are included in the protection target selection criterion. As a result of including these, the angle of elevation is set.

Some examples are described in which the situation of the surrounding environment is reflected in the elevation angle setting. Here, as the definition of the elevation angle, an apex direction, for example, the normal direction of the horizontal plane installed by the base station device 30 is set to zero degrees, a horizontal direction is set to 90 degrees, and a ground direction is set to 180 degrees. In the case of this definition, the protection target range is widened as the elevation angle increases. Incidentally, the definition of elevation angle (0 degrees, 90 degrees, 180 degrees, or the like) can be defined in other ways, and thus attention is required in that the size of the elevation angle and the size of the protection target space may change according to the definition.

As an example, in the case of considering LOS and NLOS, when the elevation angle setting for LOS is $\theta_{LOS}$ and the elevation angle setting for NLOS is $\theta_{NLOS}$, it is desirable that $\theta_{NLOS} \leq \theta_{LOS}$. One reason for this is that radio waves are more likely to skip in the LOS environment, so a protection target space is set wider so as to increase the possibility of appropriate interference protection. In the case of LOS, the elevation angle value may be set by adding a predetermined real value $\theta'$ to the NLOS value ($\theta_{LOS} = +\theta'$, $\theta' \geq 0$), multiplying the NLOS value by a predetermined real value $\alpha$ ($\theta_{LOS} = \alpha * \theta'$, $\alpha \geq 1$), or the like.

When considering the terrain, it is desirable that the elevation angle is set as a larger value as the terrain becomes Indoor, Urban, Sub-urban, Rural, and Open Sky. That is, it is desirable that $\theta_{Indoor} \leq \theta_{Urban} \leq \theta_{Sub-urban} \leq \theta_{Rural} \leq \theta_{OpenSky}$. This is also because radio waves are more likely to skip in the terrain where the sky is open, so a protection target space is set wider so as to increase the possibility of appropriate interference protection. Further, as in the setting of the LOS and NLOS values described above, the elevation angle may be set by adding or multiplying a predetermined real number with respect to a predetermined (criterion) elevation angle.

The target frequency for spectrum sharing between the primary system and the secondary system may be included in the protection target selection criterion when the elevation angle range is set. For example, when there is a relationship of frequencies $f_1 \leq f_2$, it is desirable to set $\theta_{f_1} \geq \theta_{f_2}$.

In setting the elevation angle, an upper limit or a lower limit of the elevation angle value may be set. Accordingly, it becomes simple to roughly exclude the aerial communication device 10A outside the protection target range (protection target space).

As for the aerial communication device 10A outside this elevation angle, the object can be roughly sifted so as not to be included in the protection target. Regarding the setting of the upper limit by tangent to the ground surface, it is desirable to consider the height of the communication device of the secondary system such as the terminal device 20 and the base station device 30.

Regarding the upper limit and the lower limit, the setting method or the setting value may change depending on the surrounding environment. For example, as in the previous LOS/NLOS and terrain, an appropriate range can be set by setting a magnitude relationship for the upper limit and the lower limit. Further, it is desirable that the upper limit is equal to or smaller than the elevation angle of the tangent to the ground surface.

Figure 27:
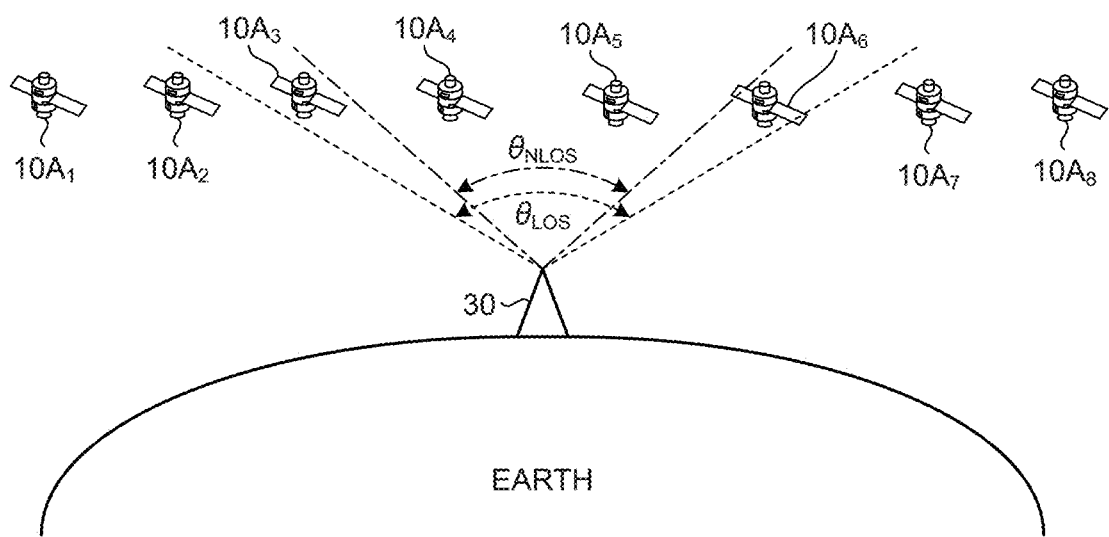
FIG. 27 is a diagram illustrating an example of setting a protection target range based on an elevation angle.

FIG. 27 is a diagram illustrating an example of setting the protection target range based on the elevation angle. In the example of FIG. 27, the elevation angle $\theta_{LOS}$ is indicated by a broken line, while the elevation angle $\theta_{NLOS}$ is indicated by a dashed line. These elevation angle $\theta_{LOS}$ and elevation angle $\theta_{NLOS}$ can be set according to the flow illustrated in FIG. 28, for example.

Figure 28:
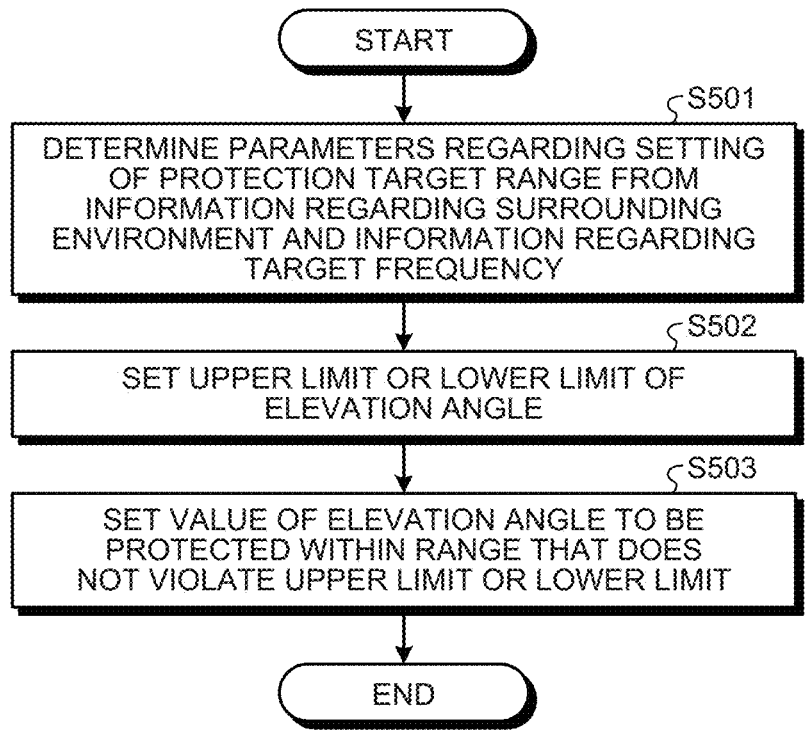
FIG. 28 is a diagram illustrating an example of a setting flow of the protection target range based on the elevation angle.

FIG. 28 is a diagram illustrating an example of a setting flow of the protection target range based on the elevation angle. Here, as an example, the operation subject of the flow is described as the communication control device 40. As illustrated in FIG. 28, the selection unit 441 of the communication control device 40 determines the parameter regarding the setting of the protection target range from the information regarding the surrounding environment and the information regarding the target frequency (step S501).

Subsequently, the selection unit 441 of the communication control device 40 sets the upper limit or the lower limit of the elevation angle according to the parameter determined in step S501 (step S502). Then, the selection unit 441 of the communication control device 40 sets the value of the elevation angle for the protection target within a range that does not violate the upper limit or the lower limit set in step S502 (step S503).

In a case where the elevation angle $\theta_{LOS}$ or the elevation angle $\theta_{NLOS}$ illustrated in FIG. 27 is obtained as a result of this step S503, the following protection target selection result is obtained. For example, in a case where the protection target is selected based on the position of the aerial communication device 10A and the elevation angle $\theta_{LOS}$, the four aerial communication devices 10A of the aerial communication devices $10A_3$ to $10A_6$ among the aerial communication devices $10A_1$ to $10A_8$ are selected as the protection target. On the other hand, for example, in a case where the protection target is selected based on the position of the aerial communication device 10A and the elevation angle $\theta_{NLOS}$, the aerial communication devices $10A_3$ and $10A_6$ are not selected, and two aerial communication devices 10A of the aerial communication devices $10A_4$ and $10A_8$ are selected as the protection target.

Figure 29:
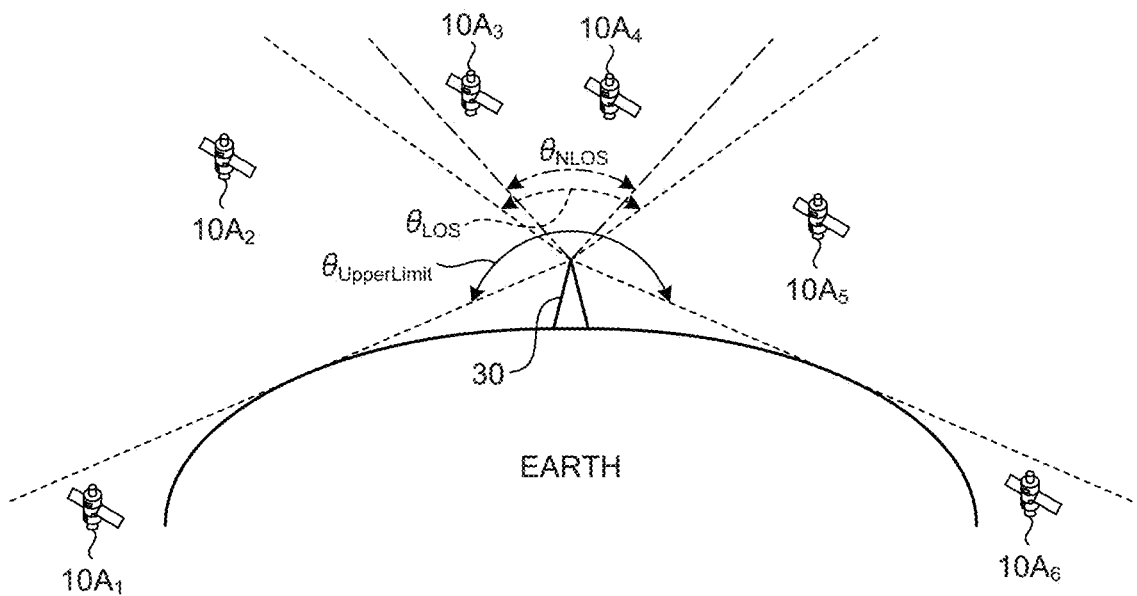
FIG. 29 is a diagram illustrating an example of setting the protection target range based on the elevation angle.

FIG. 29 is a diagram illustrating an example of setting the protection target range based on the elevation angle. In the example of FIG. 29, an example is described in which an upper limit $\theta_{UpperLimit}$ is set at the elevation angle of the tangent to the ground surface. As illustrated by a two-dot chain line in FIG. 29, before the protection target is selected by using the elevation angle $\theta_{LOS}$ or the elevation angle $\theta_{NLOS}$ by setting the upper limit $\theta_{UpperLimit}$, two aerial communication devices 10A of the aerial communication devices $10A_1$ and $10A_6$ among the aerial communication devices $10A_1$ to $10A_6$ can be excluded from the protection target. Therefore, the efficiency of selecting the protection target is improved.

The range based on the elevation angle is set in the form of including the above determination. For example, when viewed from the communication device of the secondary system such as the terminal device 20 or the base station device 30, the same elevation angle range over a horizontal 360 degree may be used as the protection target space. That is, in the example of FIG. 29, it is a three-dimensional conical range. Further, the elevation angle may be further adjusted according to the horizontal direction. For example, the elevation angle may be adjusted according to a direction in which there is a tall building around or a direction in which there is not tall building (decrease the elevation angle in the direction in which there is a building around and increase the elevation angle in the direction in which there is not building). The horizontal adjustment may be executed according to a predetermined horizontal angle, for example, every one degree or every ten degrees.

After the protection target space is set, the selection unit 441 of the communication control device 40 selects the aerial communication device 10A to be protected among the aerial communication devices of the primary system such as the base station device 30 on the basis of the range. The aerial communication device 10A selected in this way may be a single unit or plural units.

In this embodiment, for example, the selection unit 441 of the communication control device 40 may change the determination on whether or not the selection is possible depending on whether or not the position (or flight path) of the target aerial communication device 10A can be acquired.

Figure 30:
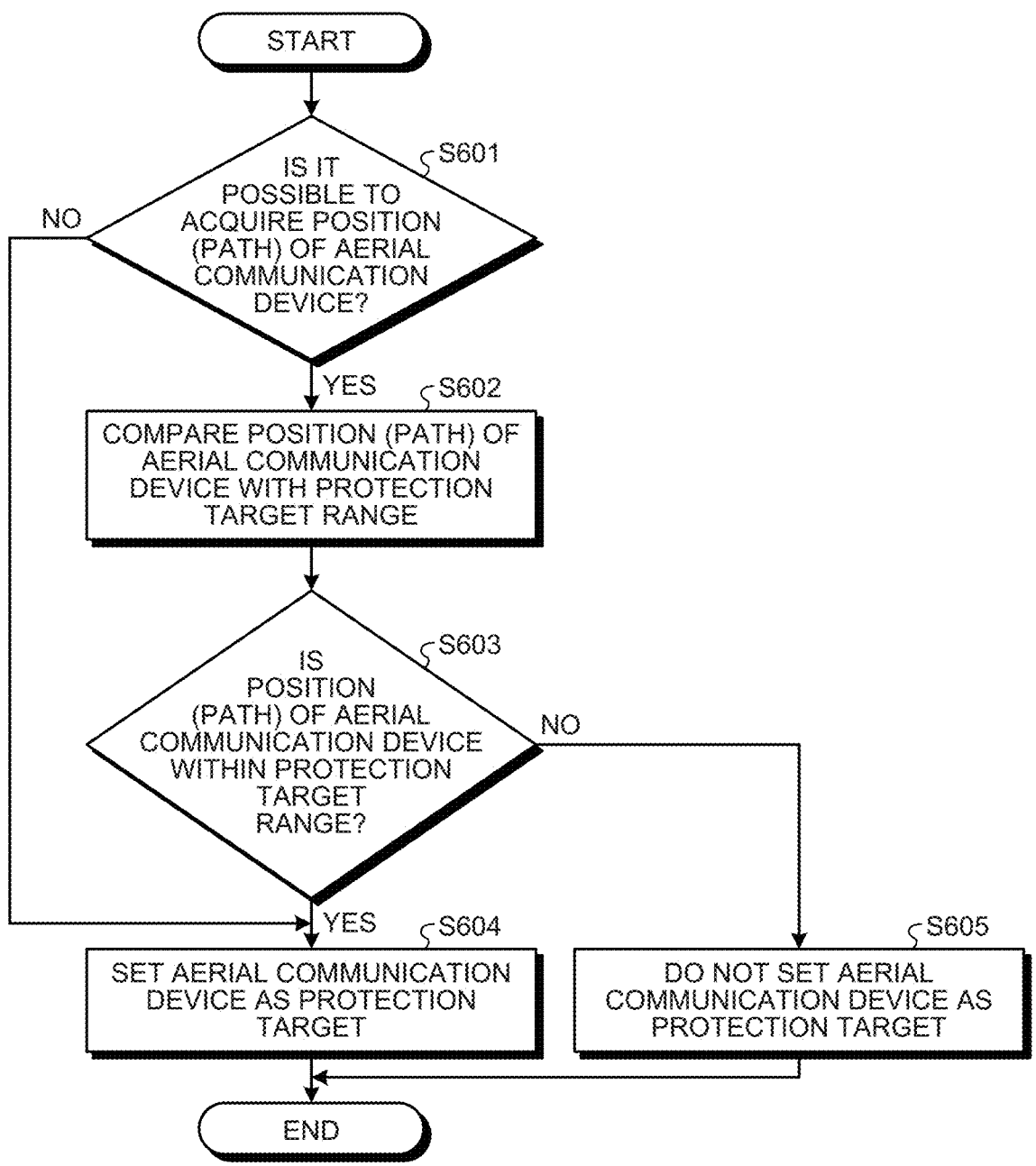
FIG. 30 is a diagram illustrating an example of the protection target selection flow for explaining a comparison between a protection target space and a position of an aerial communication device.

FIG. 30 is a diagram illustrating an example of the protection target selection flow in which a comparison of the protection target space and the position of the aerial communication device is added. Here, as an example, the operation subject of the flow is described as the communication control device 40.

As illustrated in FIG. 30, in a case where the position of the aerial communication device 10A cannot be acquired (step S601 No), the selection unit 441 of the communication control device 40 includes the aerial communication device 10A in the protection target (step S604). This is because the information is insufficient to determine whether or not to protect by comparing with the protection target space.

On the other hand, in a case where the position of the aerial communication device 10A can be acquired (step S601 Yes), the selection unit 441 of the communication control device 40 compares the acquired position and the protection target space set above (step S603).

Here, as a result of the comparison in step S603, in a case where the position is included in the set protection target space (a conical range or a range equivalent to the conical shape) (step S603 Yes), the selection unit 441 of the communication control device 40 includes the aerial communication device 10A in the protection target (step S604). On the other hand, in a case where the position is not included in the protection target space (step S603 No), the selection unit 441 of the communication control device 40 does not include the aerial communication device 10A in the protection target (step S605).

Incidentally, in the flow of FIG. 30, "position" is replaced with "flight path" in step S601 of the flow, and in step S601, it is possible to determine whether or not the flight path of the aerial communication device 10A is known, and the degree of reliability of the flight path information is above a predetermined threshold. In a case where such a determination is performed, when the flight path is known, and the degree of reliability of the flight path information is equal to or higher than the predetermined threshold, the process proceeds to the branch of step S601 Yes. Further, in a case where the flight path of the aerial communication device 10A is unknown, or the degree of reliability of the flight path information is less than the predetermined threshold, the process proceeds to the branch of step S601 No. Examples of such cases where the position and path cannot be acquired include a case where it is not possible to predict where to fly as in a drone. Further, a case is included in which the position and path are not disclosed as in a communication device for military use.

In this embodiment, the selection unit 441 of the communication control device 40 may include the altitude (or the distance between the secondary communication device and the aerial communication device 10A) of the aerial communication device 10A as the variation of the flow illustrated in FIG. 30 in the protection target selection criterion. For example, the selection unit 441 of the communication control device 40 includes aerial communication devices lower (closer) than the altitude (distance) of a predetermined value as the protection target candidate and sets aerial communication devices further entering the protection target space based on the elevation angle among the candidates as the protection target. Accordingly, it is possible to reduce the amount of calculation for interference control in the subsequent stage.

Figure 31:
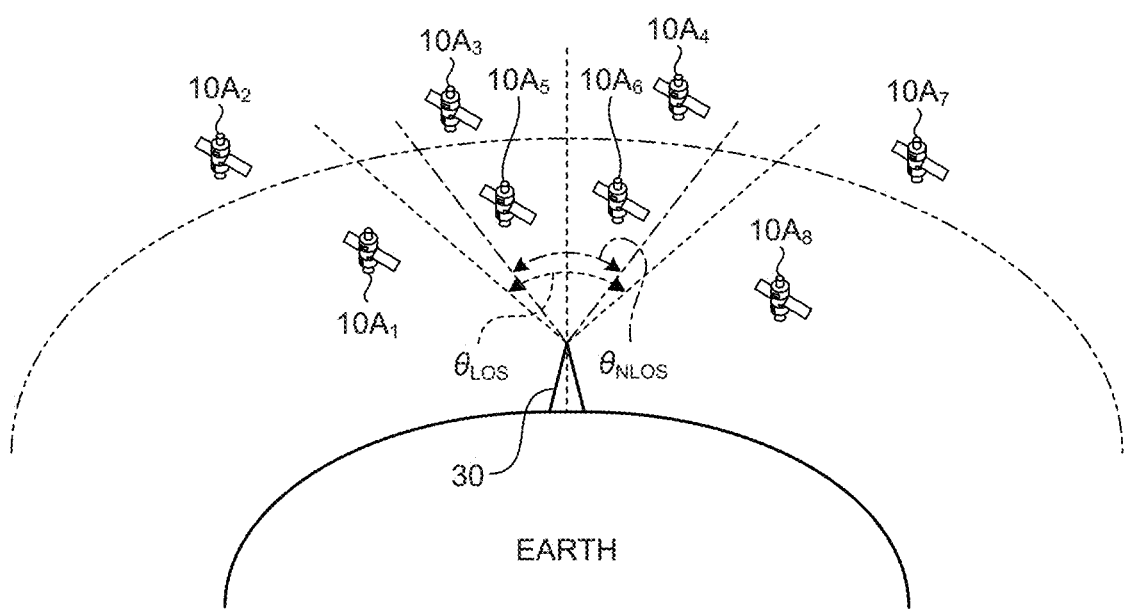
FIG. 31 is a diagram illustrating an example of setting the protection target range based on the elevation angle and an altitude.

FIG. 31 is a diagram illustrating an example of setting the protection target range based on the elevation angle and the altitude. In the example of FIG. 31, along with the elevation angle $\theta_{LOS}$ and elevation angle $\theta_{NLOS}$, the boundary of the protection target range based on the altitude is indicated by a two-dot chain line. As illustrated in FIG. 31, in a case where the protection target is selected using either the elevation angle $\theta_{LOS}$ or the elevation angle $\theta_{NLOS}$ only, the four aerial communication devices 10A of the aerial communication devices $10A_3$ to $10A_6$ among aerial communication devices $10A_1$ to $10A_8$ are selected as the protection target. On the other hand, in a case where the boundary of the protection target range based on the altitude is further used for the selection of the protection target as indicated by a two-dot chain line in FIG. 31, the aerial communication devices $10A_3$ and $10A_4$ existing outside the boundary of the protection target range based on the altitude can be excluded from the protection target.

Figure 32:
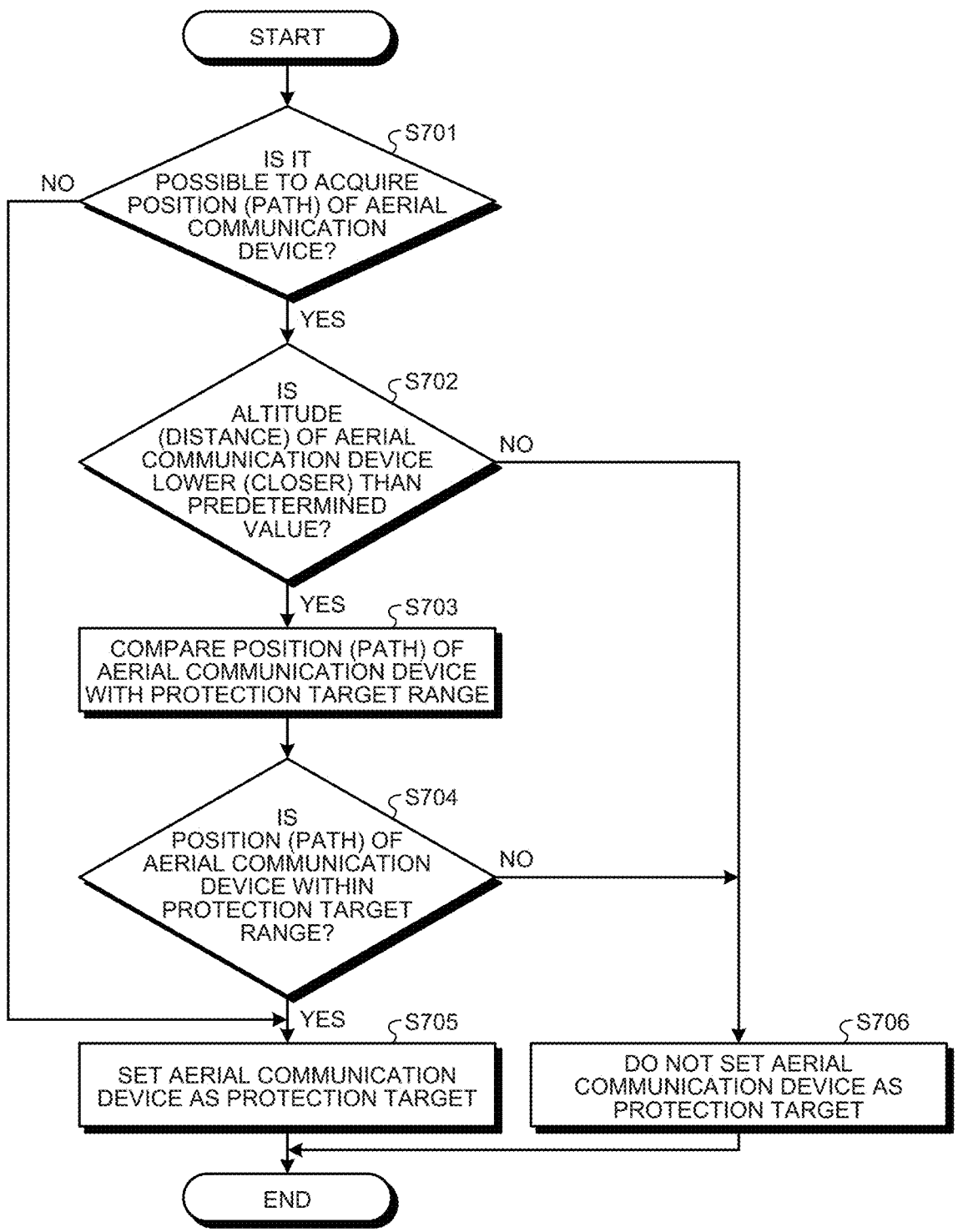
FIG. 32 is a diagram illustrating an example of the protection target selection flow using the protection target range of the altitude.

FIG. 32 is a diagram illustrating an example of the protection target selection flow using the protection target range of the altitude. Here, as an example, the operation subject of the flow is described as the communication control device 40.

As illustrated in FIG. 32, in a case where the position of the aerial communication device 10A cannot be acquired (step S701 No), the selection unit 441 of the communication control device 40 includes the aerial communication device 10A in the protection target (step S705). This is because the information is insufficient to determine whether or not to protect by comparing with the protection target space.

On the other hand, in a case where the position of the aerial communication device 10A can be acquired (step S701 Yes), the selection unit 441 of the communication control device 40 determines whether or not the altitude of the aerial communication device 10A is lower than a predetermined value, in other words, the aerial communication device 10A is close (step S702).

At this time, in a case where the altitude of the aerial communication device 10A is lower than the predetermined value (step S702 Yes), the selection unit 441 of the communication control device 40 compares the acquired position with the protection target space set above (step S703).

Here, as a result of the comparison in step S703, in a case where the position is included in the set protection target space (a conical range or a range equivalent to the conical shape) (step S704 Yes), the selection unit 441 of the communication control device 40 includes the aerial communication device 10A in the protection target (step S705). Further, in a case where the altitude of the aerial communication device 10A is equal to or higher than the predetermined value, or a case where the position is not included in the protection target space (step S702 No or 704 No), the selection unit 441 of the communication control device 40 does not include the aerial communication device 10A in the protection target (step S706).

As an example, a conical space or a space equivalent to the conical shape is set as the protection target space, but the protection target space is not limited thereto. For example, as still another variation, a space which extends from the ground in the apex direction and in which the cross-sectional area obtained by cutting at a higher altitude is larger when a cross-sectional area obtained by cutting the space at a certain altitude is compared with a cross-sectional area obtained by cutting at another altitude may be set as the protection target space. In this case, the space becomes different from the pure conical shape, and thus there may be a case which is not limited by the setting of the protection target space based on the elevation angle. However, in this embodiment, the protection target space can be set on the basis of the increase rate of the cross-sectional area to the altitude instead of the elevation angle. Assuming that the cross-sectional area increases in proportion to the altitude, the rate of increase per unit altitude is β (β≥1), and the value of β is adjusted instead of the elevation angle. The magnitude of the elevation angle θ can be replaced with the magnitude of the increase rate β.

Figure 33:
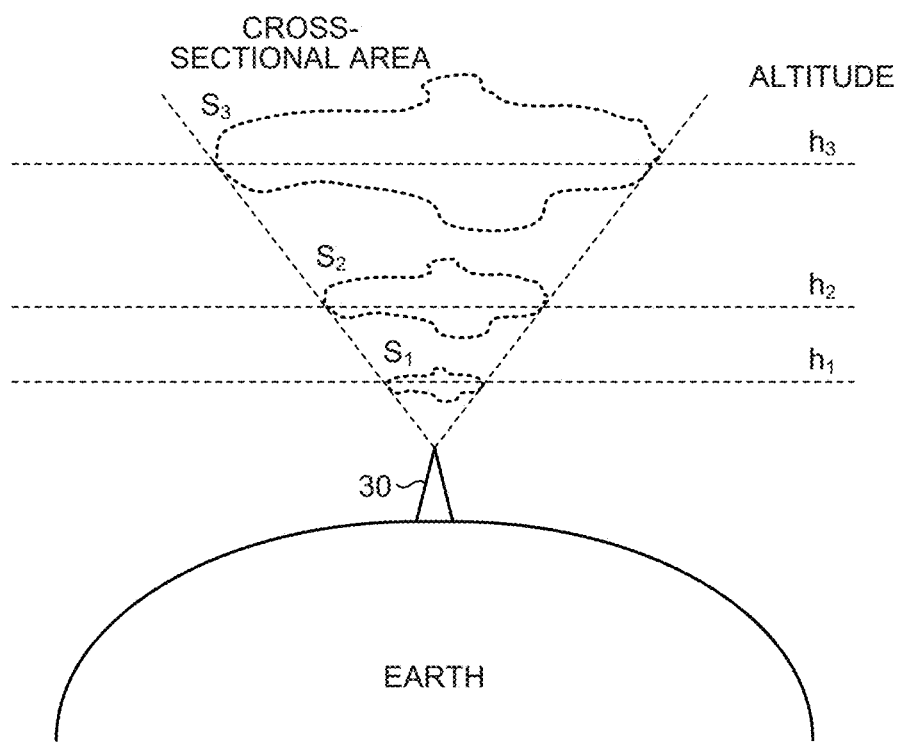
FIG. 33 is a diagram illustrating an example of the protection target space of the aerial communication device set by an increase rate of a cross-sectional area with respect to the altitude.

FIG. 33 is a diagram illustrating an example of the protection target space of the aerial communication device set by the increase rate of the cross-sectional area (β≥1) with respect to the altitude. As illustrated in FIG. 33, three cross-sectional areas $S_1$, $S_2$, and $S_3$ are illustrated for three different heights of altitudes $h_1$, $h_2$, and $h_3$ ($h_1<h_2<h_3$). It is desirable to have a relationship of $S_1 \leq S_2 \leq S_3$ as the relationship of these three cross-sectional areas and a relationship such as $S_2=(h_2-h_1)*\beta*S_1$, $S_3=(h_3-h_1)*\beta*S_1$.

As another embodiment regarding the protection target space, a protection target space may be adopted in which the cross-sectional area decreases as the altitude increases (β≤1). This means that the number of primary system communication devices to be protected is reduced as the altitude increases (the distance from the secondary system communication device on the ground increases). From the viewpoint of elevation angle, this case means that the elevation angle is a function of the altitude of the communication device 10 of the primary system, and the elevation angle to consider decreases as the altitude increases.

Figure 34:
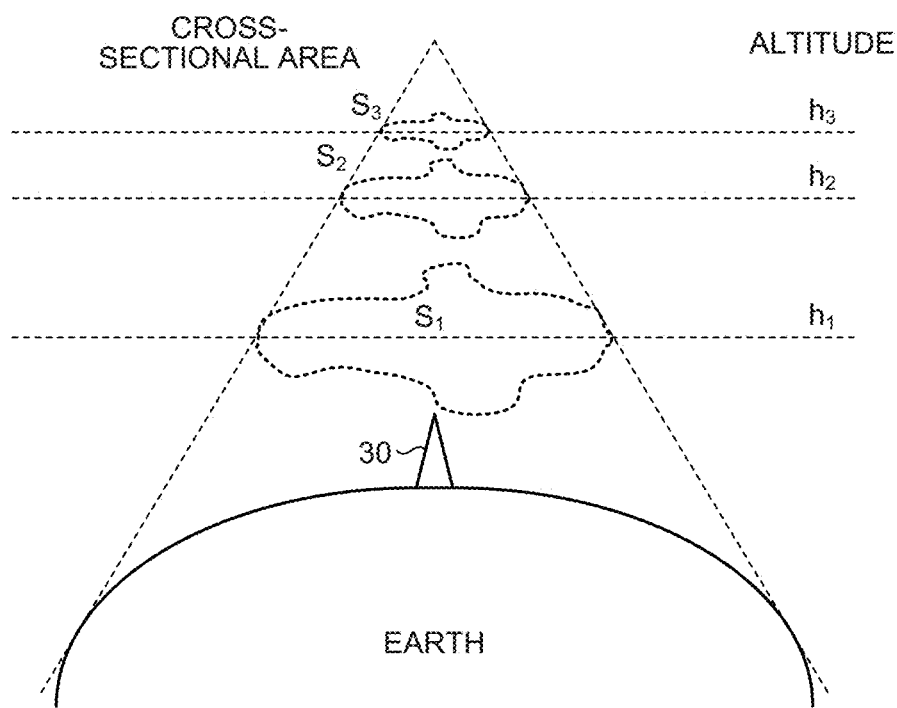
FIG. 34 is a diagram illustrating another example of the protection target space of the aerial communication device set by the increase rate of the cross-sectional area with respect to the altitude.

FIG. 34 is a diagram illustrating another example of the protection target space of the aerial communication device set by the increase rate of the cross-sectional area (β≤1) with respect to the altitude. As illustrated in FIG. 34, three cross-sectional areas $S_1$, $S_2$, and $S_3$ are illustrated for three different heights of the altitudes $h_1$, $h_2$, and $h_3$ ($h_1>h_2>h_3$). The relationship between these three cross-sectional areas is $S_1 \leq S_2 \leq S_3$, but the cross sections do not have to be similar.

As still another embodiment, a space may be adopted in which the cross-sectional area of the protection target space is constant (β=1) regardless of altitude. From the viewpoint of elevation angle, this case also means that the elevation angle is a function of the altitude of the communication device 10 of the primary system, and the elevation angle to consider decreases as the altitude increases.

Figure 35:
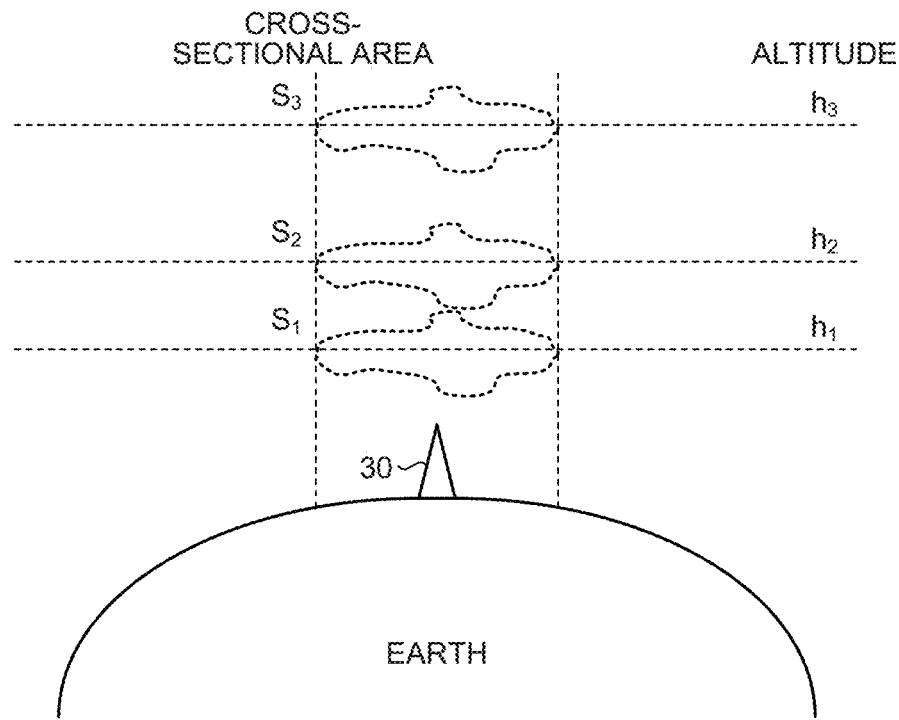
FIG. 35 is a diagram illustrating still another example of the protection target space of the aerial communication device set by the increase rate of the cross-sectional area with respect to the altitude.

FIG. 35 is a diagram illustrating still another example of the protection target space of the aerial communication device set by the increase rate of the cross-sectional area (β=1) with respect to the altitude. As illustrated in FIG. 35, three cross-sectional areas $S_1$, $S_2$, and $S_3$ are illustrated for the same altitudes $h_1$, $h_2$, and $h_3$ ($h_1=h_2=h_3$). The relationship between these three cross-sectional areas is $S_1=S_2=S_3$, but the cross sections do not have to be similar.

When the example of the protection target space illustrated in FIG. 34 is compared with the example of the protection target space illustrated in FIG. 35, the example of the protection target space illustrated in FIG. 34 has a smaller elevation angle with respect to the altitude.

In this embodiment, the selection unit 441 of the communication control device 40 can further include the flight path of the aerial communication device 10A in the protection target selection criterion when determining whether or not to be included in the protection target space. Here, examples of the information of the flight path of the aerial communication device include the speed, direction, orbit, and the like of the aerial communication device 10A.

Figure 36:
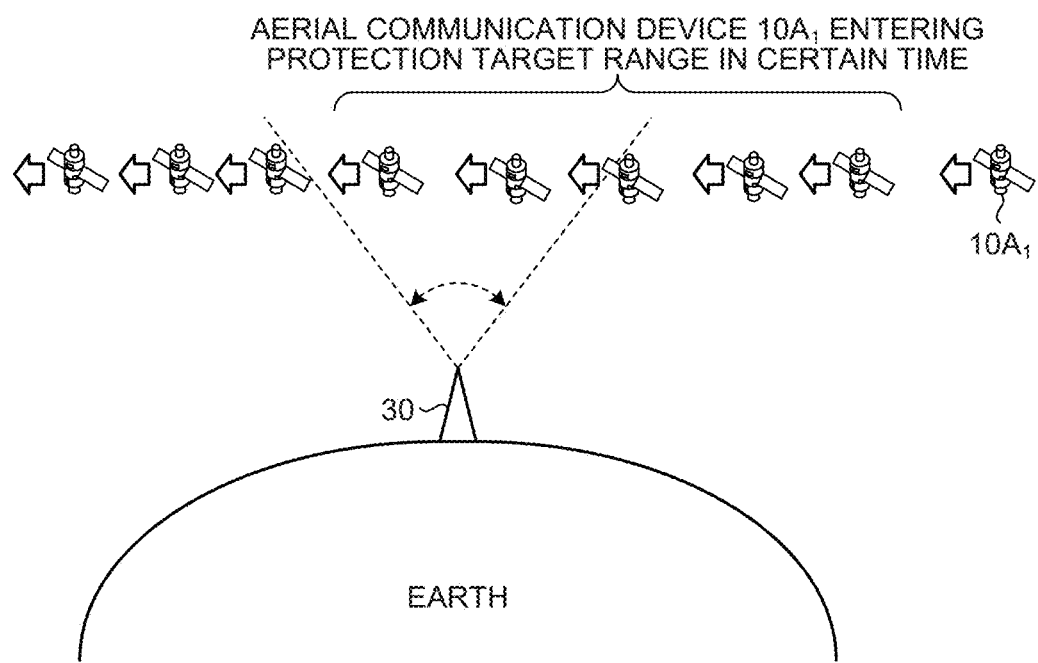
FIG. 36 is a diagram illustrating an example of a flight path of the aerial communication device.

FIG. 36 is a diagram illustrating an example of the flight path of the aerial communication device 10A. As illustrated in FIG. 36, the selection unit 441 of the communication control device 40 may include the aerial communication device 10A which is in the protection target space at a certain time as the protection target. It can be said that this is a measure to more reliably protect the aerial communication device 10A (for example, geostationary orbit satellite communication device, Geostationary earth orbit (GEO), and Geosynchronous orbit (GSO)) appearing to be stationary when viewed from the ground as the aerial communication device 10A. Further, in a case where there is an aerial communication device appearing to be moving when viewed from the ground, it can be said that this is a measure to more reliably protect the aerial communication device 10A appearing to be moving. Examples of such an aerial communication device 10A correspond to a low earth orbiting satellite communication device, a Low earth orbit (LEO), a medium earth orbiting satellite communication device, a Middle earth orbit (MEO), an aircraft (Air plane, Air craft, and Air vehicle), a drone.

Herein, for example, the start point and end point of the time series data of the coordinates included in the flight path to be compared with the protection target space correspond to each time interval of a case where the aerial communication device to be protected is selected at a certain timing and is selected at a timing of the next selection.

Figure 37:
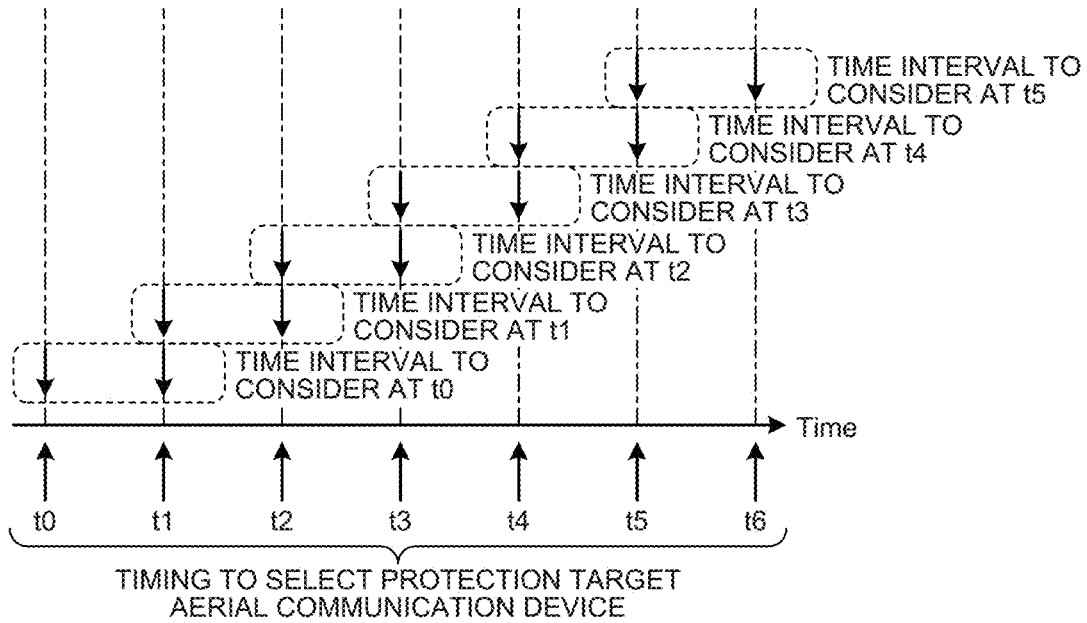
FIG. 37 is a diagram illustrating an example of a correspondence between a time interval of a timing of the protection target selection and a start point and an end point of time series data of the flight path.

FIG. 37 is a diagram illustrating an example of a correspondence between the time interval of the timing of the protection target selection and the start point and the end point of time series data of the flight path. In the example of FIG. 37, an example is shown in which the time interval of the timing of the protection target selection matches the time interval of the start point and the end point of the time series data of the flight path to be compared with the protection target space. For example, at the timing of the protection target selection at time t0, the time series data of the flight path from time t0 to time t1 is compared with the protection target space.

Figure 38:
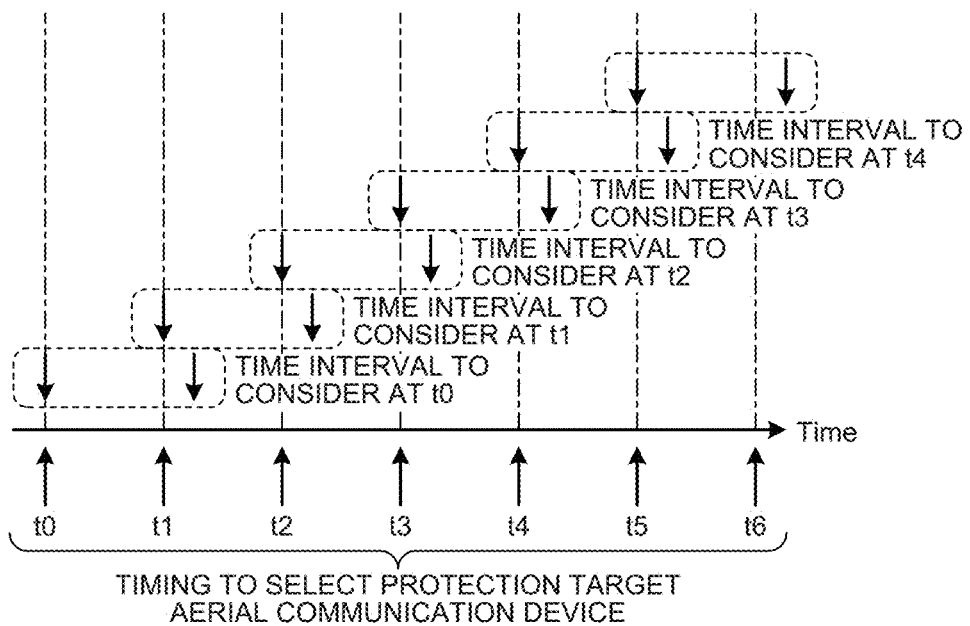
FIG. 38 is a diagram illustrating an example of the correspondence between the time interval of the timing of the protection target selection and the start point and the end point of the time series data of the flight path.
Figure 39:
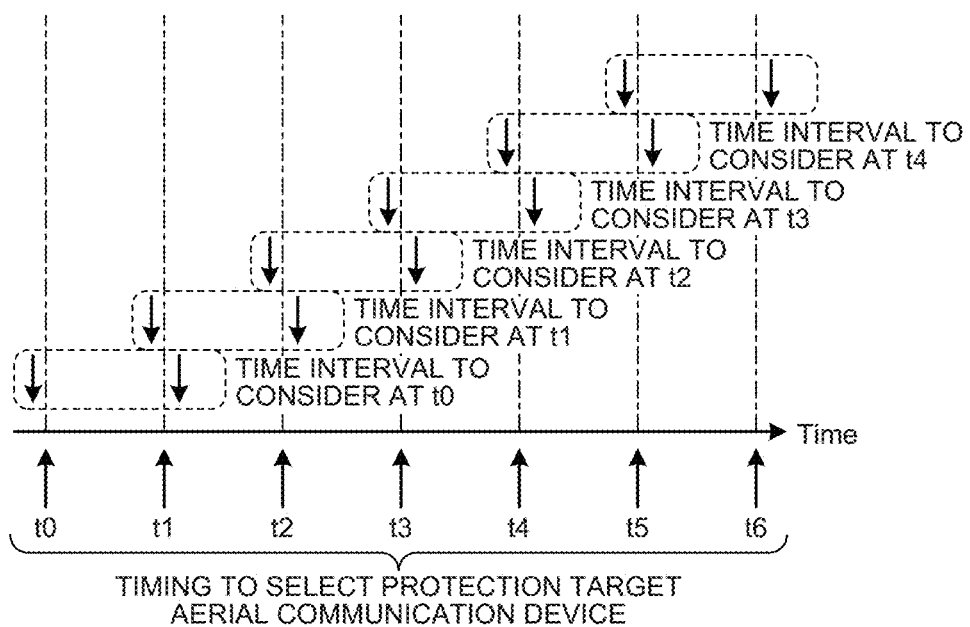
FIG. 39 is a diagram illustrating an example of the correspondence between the time interval of the timing of the protection target selection and the start point and the end point of the time series data of the flight path.

In addition, the selection unit 441 of the communication control device 40 can set the interval between the start point and the end point of the time series data of the flight path to be longer than the time interval of the timing of the protection target selection. FIGS. 38 and 39 are diagrams illustrating an example of the correspondence between the time interval of the timing of the protection target selection and the start point and the end point of the time series data of the flight path. In the example of FIG. 38, an example is described in which the end point of the time series data of the flight path to be compared with the protection target space is set after the latter selection timing of two protection target selection timings. Further, in the example of FIG. 39, an example is described in which the start point of the time series data of the flight path to be compared with the protection target space is set before the former selection timing of the two protection target selection timings, and the end point of the time series data of the flight path is set after the latter selection timing of the two protection target selection timings. This is also a measure to reliably protect the moving aerial communication device 10A.

On the contrary, in order to reduce the number of the communication devices 10 of the primary system to be protected and reduce the complexity of the interference calculation, at least one of the start point or the end point of the above time can be set narrower than the interval of the protection target selection timing. In this case, it is not always desirable from the viewpoint of proper protection of the primary system, but in some cases, reducing the complexity of the interference calculation is prioritized.

<6-3. Interference Calculation>

In this embodiment, the calculation unit 442 of the communication control device 40 calculates the amount of the interference applied from the communication device of the secondary system such as the terminal device 20 and the base station device 30 to the communication device 10 of the primary system on the basis of the result of the protection target selection selected by the selection unit 441.

Figure 40:
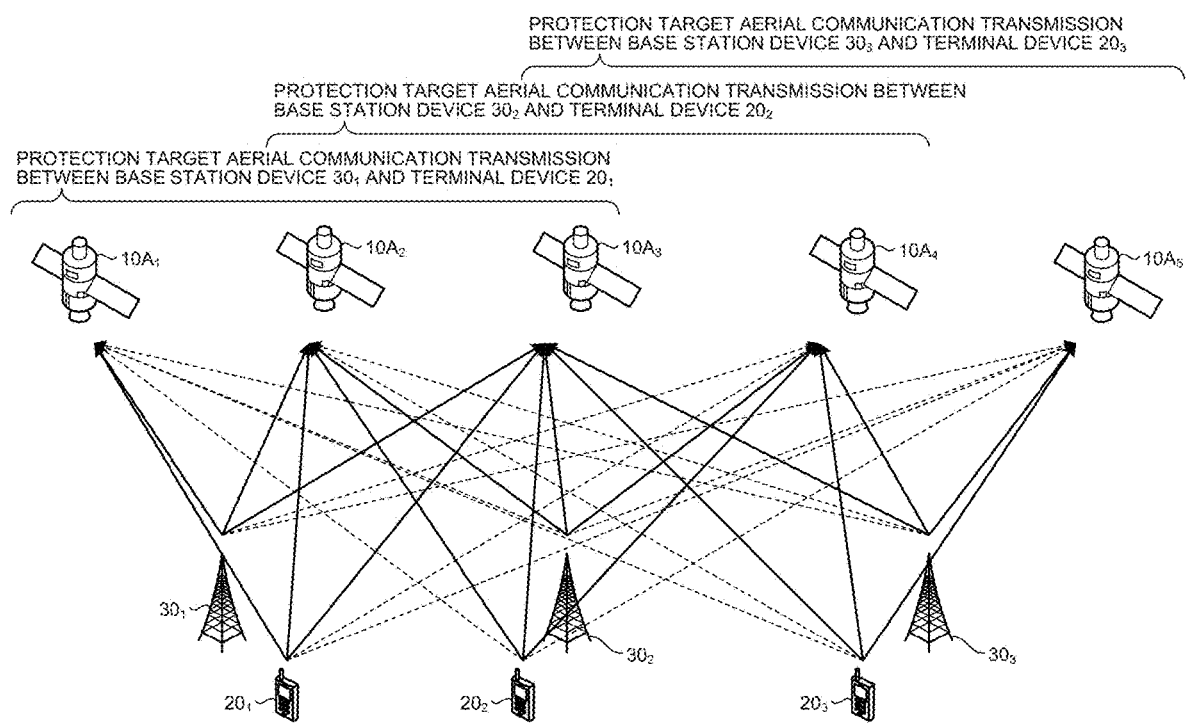
FIG. 40 is a diagram illustrating a model example of calculation of an amount of interference applied from a secondary system to a primary system.

FIG. 40 is a diagram illustrating a model example of calculation of the amount of the interference applied from the secondary system to the primary system. The solid line illustrated in FIG. 40 indicates the interference applied to a protection target communication device selected as a result of the protection target selection. For example, the result of the protection target selection of the base station device $30_1$ and the terminal device $20_1$ is the aerial communication devices $10A_1$, $10A_2$, and $10A_3$. Further, the result of the protection target selection of the base station device $30_2$ and the terminal device $20_2$ is the aerial communication devices $10A_2$, $10A_3$, and $10A_4$. Further, the result of the protection target selection of the base station device $30_3$ and the terminal device $20_3$ is the aerial communication devices $10A_3$, $10A_4$, and $10A_5$. As illustrated in FIG. 40, the selection result of the protection target communication device may differ depending on the communication device of the secondary system such as the terminal device 20 and the base station device 30. That is, in a case where there is a relationship between the terminal device 20 and the base station device 30, in the terminal devices 20 connected to the same base station device 30, the same communication device as the communication device included in the protection target of the base station device 30 may be considered as the protection target.

Figure 41:
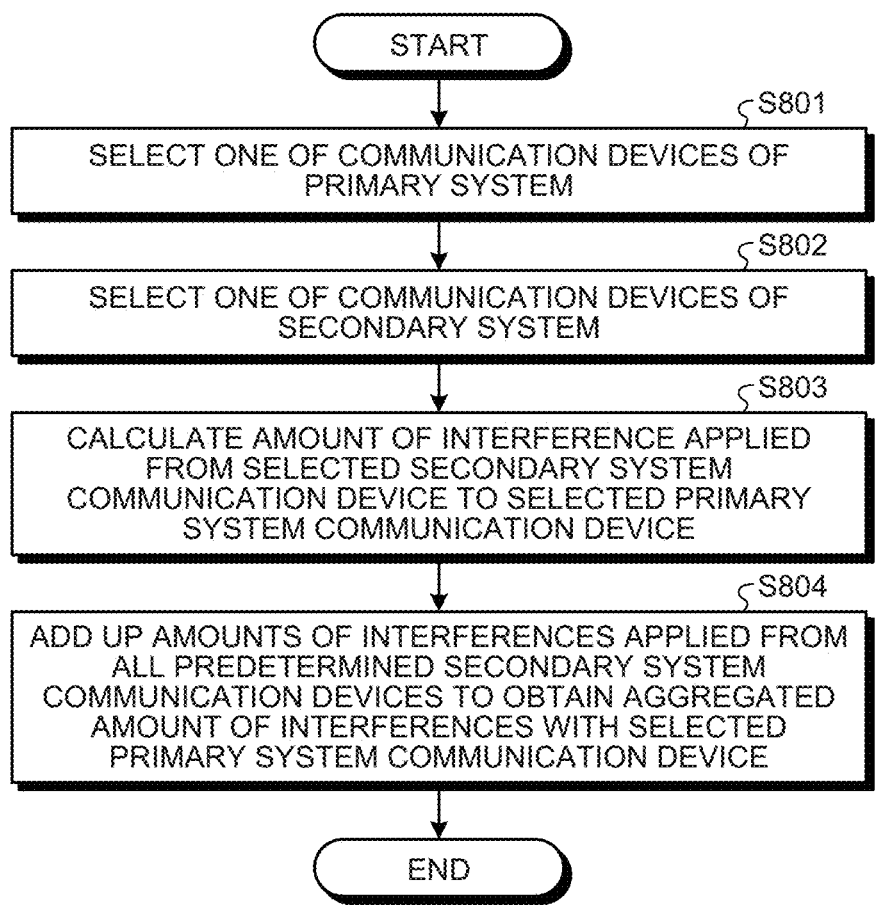
FIG. 41 is a diagram illustrating an example of a calculation flow of an aggregated interference amount.

FIG. 41 is a diagram illustrating an example of a calculation flow of an aggregated interference amount. Here, as an example, the operation subject of the flow is described as the communication control device 40. As illustrated in FIG. 41, the calculation unit 442 of the communication control device 40 selects one of the communication devices 10 of the primary system (step S801).

Subsequently, the calculation unit 442 of the communication control device 40 selects one of the communication devices of the secondary system such as the terminal device 20 and the base station device 30 (step S802). Then, the calculation unit 442 of the communication control device 40 calculates the amount of the interference applied from the secondary system communication device selected in step S802 to the communication device 10 of the primary system selected in step S801 (step S803).

Thereafter, the calculation unit 442 of the communication control device 40 calculates the aggregated amount of the interferences with the communication device 10 of the primary system selected in step S801 by adding up the amounts of the interferences applied from all the predetermined secondary system communication devices (step S804).

Figure 42:
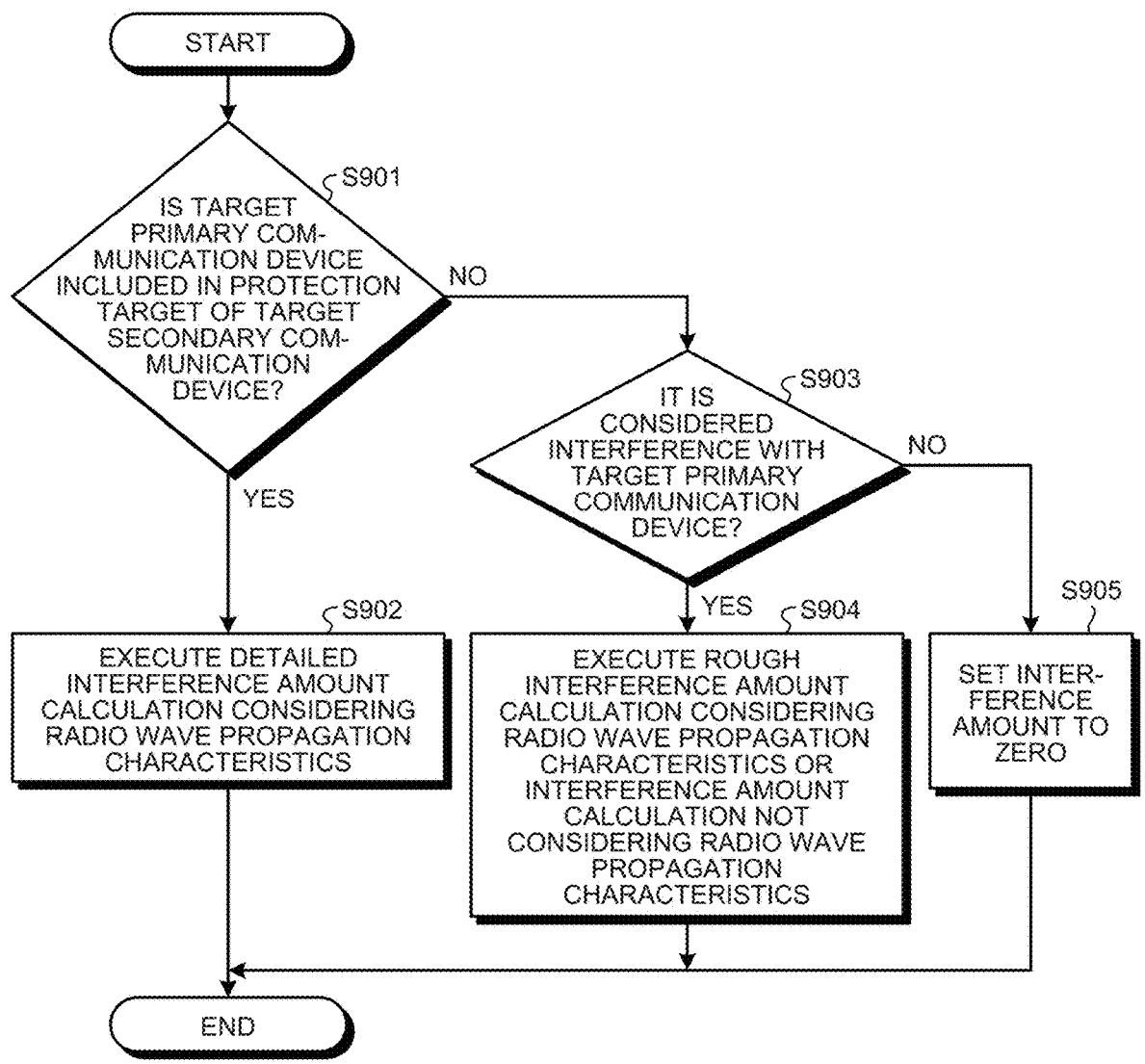
FIG. 42 is a diagram illustrating an example of a calculation flow of the applied interference amount based on a protection target selection result.

FIG. 42 is a diagram illustrating an example of a calculation flow of the applied interference amount based on the protection target selection result. Here, as an example, the operation subject of the flow is described as the communication control device 40. As illustrated in FIG. 42, in a case where the target primary communication device 10 is included in the protection target space of the target secondary communication device (step S901 Yes), the calculation unit 442 of the communication control device 40 executes the following processing.

That is, the calculation unit 442 of the communication control device 40 executes the detailed interference amount calculation considering the radio wave propagation characteristics (step S902). In other words, the interference amount calculation having more calculation amounts, for example, calculation parameters than in step S904 described later is executed.

On the other hand, in a case where the target primary communication device 10 is not included in the protection target space of the target secondary communication device (step S901 No), the calculation unit 442 determines whether or not to calculate the interference of the target primary system with the communication device 10 (step S903).

Herein, examples of the condition of step S903 include the altitude of the communication device 10 of the primary system. For example, in a case where the altitude is lower than a predetermined altitude, the interference is calculated. In this case, it is desirable that the predetermined altitude is larger (higher) than the altitude that defines a protection target area (space). Further, another example of the condition of step S903 is a distance between the communication device 10 of the primary system and the communication device of the secondary system such as the terminal device 20 and the base station device 30. For example, in a case where the distance is less than a predetermined value, the interference is calculated. Further, still another example of the condition of step S903 is an angular relationship between the communication device 10 of the primary system and the communication device of the secondary system such as the terminal device 20 and the base station device 30. For example, in a case where the angle is within a range of a predetermined angle from the half-value angle of the antenna directivity of the communication device of the secondary system or the communication device 10 of the primary system, the interference is calculated. Further, in a case where the angle is within a predetermined angle range, the interference is calculated. In this case, it is desirable that the predetermined angle is larger (wider) than the elevation angle that defines the protection target space. Further, another example of the condition of step S903 is the position of the communication device 10 of the primary system or the communication device of the secondary system. For example, in a case where the position is within a predetermined country/region, the interference is calculated.

Then, in a case where the interference of the target primary system with the communication device 10 is calculated (step S903 Yes), the calculation unit 442 of the communication control device 40 executes the following processing.

That is, the calculation unit 442 of the communication control device 40 executes the rough interference amount calculation considering the radio wave propagation characteristics or the interference amount calculation not considering the radio wave propagation characteristics (step S904). In other words, the interference amount calculation having less calculation amounts, for example, calculation parameters than in step S902 described later is executed.

In a case where the interference of the target primary system with the communication device 10 is not calculated (step S903 No), the calculation unit 442 of the communication control device 40 sets the interference amount to zero (step S905).

As described above, in the example of FIG. 42, different interference calculations are executed for each branch of step S901 and further for each branch of step S903.

Figure 43:
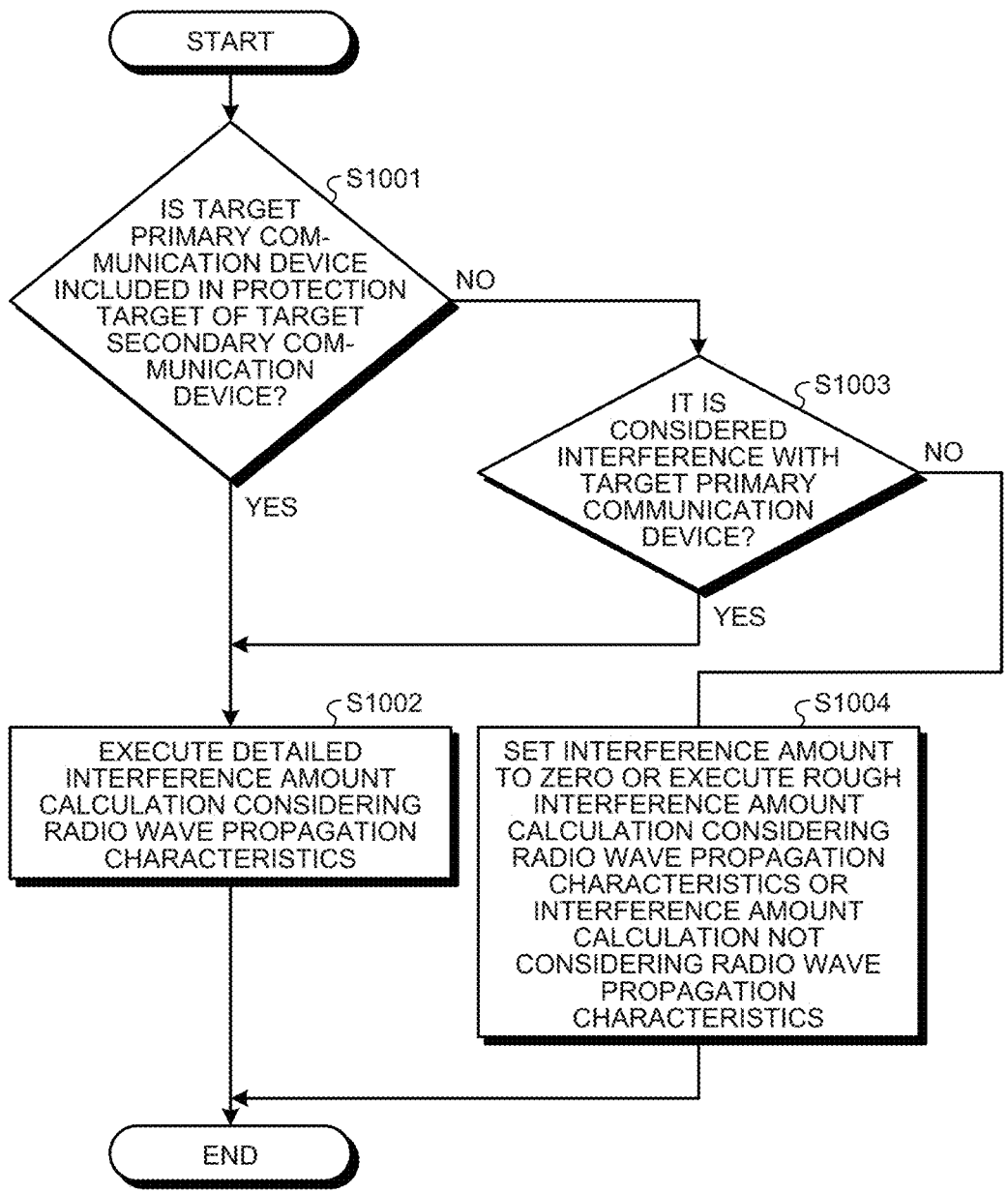
FIG. 43 is a diagram illustrating an example of the calculation flow of the applied interference amount based on the protection target selection result.

FIG. 43 is a diagram illustrating an example of the calculation flow of the applied interference amount based on the protection target selection result. Here, as an example, the operation subject of the flow is described as the communication control device 40. As illustrated in FIG. 43, in a case where the target primary communication device 10 is included in the protection target space of the target secondary communication device (step S1001 Yes), the calculation unit 442 of the communication control device 40 executes the following processing.

That is, the calculation unit 442 of the communication control device 40 executes the detailed interference amount calculation considering the radio wave propagation characteristics (step S1002). In other words, the interference amount calculation having more calculation amounts, for example, calculation parameters than in step S1004 described later is executed.

On the other hand, in a case where the target primary communication device 10 is not included in the protection target space of the target secondary communication device (step S1001 No), the calculation unit 442 determines whether or not to calculate the interference of the target primary system with the communication device 10 (step S1003).

Then, in a case where the interference of the target primary system with the communication device 10 is calculated (step S1003 Yes), the calculation unit 442 of the communication control device 40 executes the detailed interference amount calculation considering the radio wave propagation characteristics (step S1002).

In a case where the interference of the target primary system with the communication device 10 is not calculated (step S1003 No), the calculation unit 442 of the communication control device 40 executes the following processing. That is, the calculation unit 442 of the communication control device 40 executes the rough interference amount calculation considering the radio wave propagation characteristics or the interference amount calculation not considering the radio wave propagation characteristics (step S1004). In other words, the interference amount calculation having less calculation amounts, for example, calculation parameters than in step S1002 described later is executed.

In a case where the interference of the target primary system with the communication device 10 is not calculated (step S903 No), the calculation unit 442 of the communication control device 40 sets the interference amount to zero (step S905).

In this way, in the example of FIG. 43, in a case where a positive result is obtained in either the branch of step S901 or the branch of step S903, a detailed calculation is executed.

Figure 44:
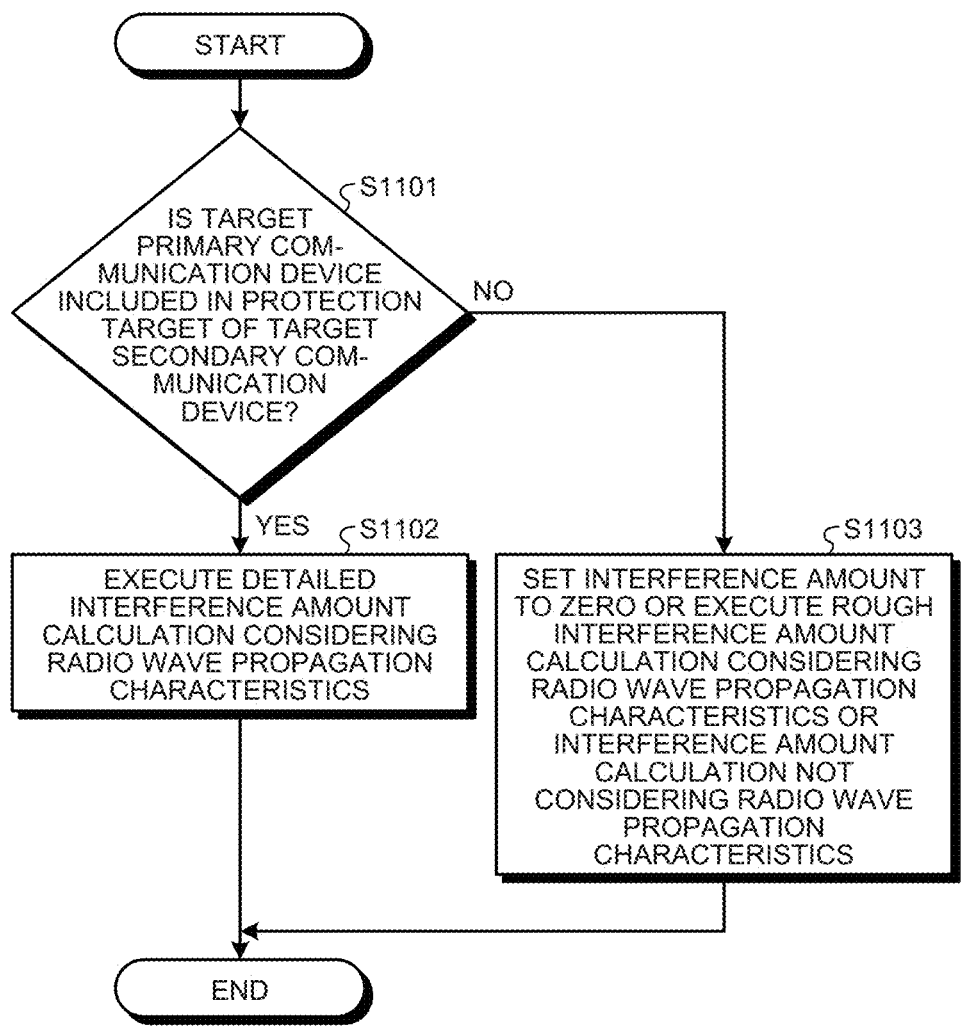
FIG. 44 is a diagram illustrating an example of the calculation flow of the applied interference amount based on the protection target selection result.

FIG. 44 is a diagram illustrating an example of the calculation flow of the applied interference amount based on the protection target selection result. Here, as an example, the operation subject of the flow is described as the communication control device 40. As illustrated in FIG. 44, in a case where the target primary communication device 10 is included in the protection target space of the target secondary communication device (step S1101 Yes), the calculation unit 442 of the communication control device 40 executes the following processing.

That is, the calculation unit 442 of the communication control device 40 executes the detailed interference amount calculation considering the radio wave propagation characteristics (step S1102). In other words, the interference amount calculation having more calculation amounts, for example, calculation parameters than in step S1103 described later is executed.

On the other hand, in a case where the target primary communication device 10 is not included in the protection target space of the target secondary communication device (step S1101 No), the calculation unit 442 executes the following processing. That is, the calculation unit 442 of the communication control device 40 executes the rough interference amount calculation considering the radio wave propagation characteristics or the interference amount calculation not considering the radio wave propagation characteristic (step S1103). In other words, the interference amount calculation having less calculation amounts, for example, calculation parameters than in step S1102 described later is executed.

In this way, in the example of FIG. 44, one of a detailed calculation and a rough calculation is selected in the branch in step S901.

The aggregated amount of the interference of a certain primary system with the communication device p is calculated by following formula (3) (expressed as a true value or a linear value).

$$I_{Agg,p} = \sum_{s \in S_p} I_{p,s} \quad (3)$$

Here, $I_{p,s}$ indicates the amount of the interference applied from the communication device s of the secondary system such as the terminal device 20 and the base station device 30 to the communication device p of the primary system. Further, $S_p$ indicates a set of secondary system communication devices to consider when calculating the interference applied to the communication device p of the primary system.

When expressed in decibels, the aggregated interference amount is calculated by the following formula (4) (variables have the same meaning as above except units).

$$I_{dBm,Agg,p} = 10\log_{10}\left(\sum_{s \in S_p} 10^{\frac{I_{dBm,p,s}}{10}}\right) \quad (4)$$

For $I_{p,s}$ the calculation differs depending on a relationship between the communication device of the primary system and the secondary system communication device. For example, in a case where the communication device 10 of the primary system is included in the protection target of the communication device of the secondary system, the interference amount calculation considering the radio wave propagation characteristics, the characteristics of the communication device, or the like in detail is executed. This interference amount calculation corresponds to the interference amount calculation performed in step S902, step S1002, and step S1102 illustrated in FIGS. 42 to 44. This is calculated, for example, by the following formula (5) (expressed as a true value or a linear value).

$$I_{p,s} = L_{p,s}(\text{env},f,x_p,y_p,z_p,x_s,y_s,z_s)A_p(x_p,y_p,z_p,x_s,y_s,z_s)A_s(x_p,y_p,z_p,x_s,y_s,z_s)P_{Tx,s} \quad (5)$$

Here, $L_{p,s}(\ )$ indicates a radio wave propagation characteristic model (for example, Path Loss, Path Gain, or the like) between the communication device of the secondary system and the communication device of the primary system. Further, f indicates the target frequency. Further, x, y, and z indicate the position information (for example, a longitude, a latitude, an altitude, or the like) of the communication device. Further, env indicates variables/indexes indicating the surrounding environment, topography, air/ ground, and the like. Further, A( ) indicates the antenna characteristics (for example, directivity, gain, or the like) of the communication device. Further, $P_{T,s}$ indicates the transmission power of the communication device of the secondary system.

When expressed in decibels, the aggregated interference amount is calculated by the following formula (6) (variables have the same meaning as above except units).

$$I_{dBm,p,s} = L_{dB,p,s}(env, f, x_p, y_p, z_p, x_s, y_s, z_s) + A_{dB,p}(x_p, y_p, z_p, x_s, y_s, z_s) + A_{dB,s}(x_p, y_p, z_p, x_s, y_s, z_s) + P_{dBm,Tx,s} \quad (6)$$

In a case where the communication device of the primary system is not included in the protection target, a simpler interference amount calculation may be adopted as compared with a case where the communication device is included. For example, the interference amount calculation considering the radio wave propagation characteristics and the characteristics of the communication device in detail is executed. This interference amount calculation corresponds to the interference amount calculation performed in step S904, step S1004, and step S1103 illustrated in FIGS. 42 to 44. As an example, the interference amount may be set to zero as described below. Alternatively, the communication device s of the target secondary system may be excluded from a set S.

$I_{p,s} = 0$
$I_{dBm,p,s} = -\infty$

Alternatively, the interference amount may be calculated as a fixed amount as described below.

$I_{p,s} = I_C$
$I_{dBm,p,s} = I_{dBm,C}$

Alternatively, the interference amount may be calculated by excluding the antenna characteristics from consideration as described in the following formulas (7) and (8).

$$I_{p,s} = L_{p,s}(env, f, x_p, y_p, z_p, x_s, y_s, z_s) P_{Tx,s} \quad (7)$$

$$I_{dBm,p,s} = L_{dB,p,s}(env, f, x_p, y_p, z_p, x_s, y_s, z_s) + P_{dBm,Tx,s} \quad (8)$$

Figure 45:
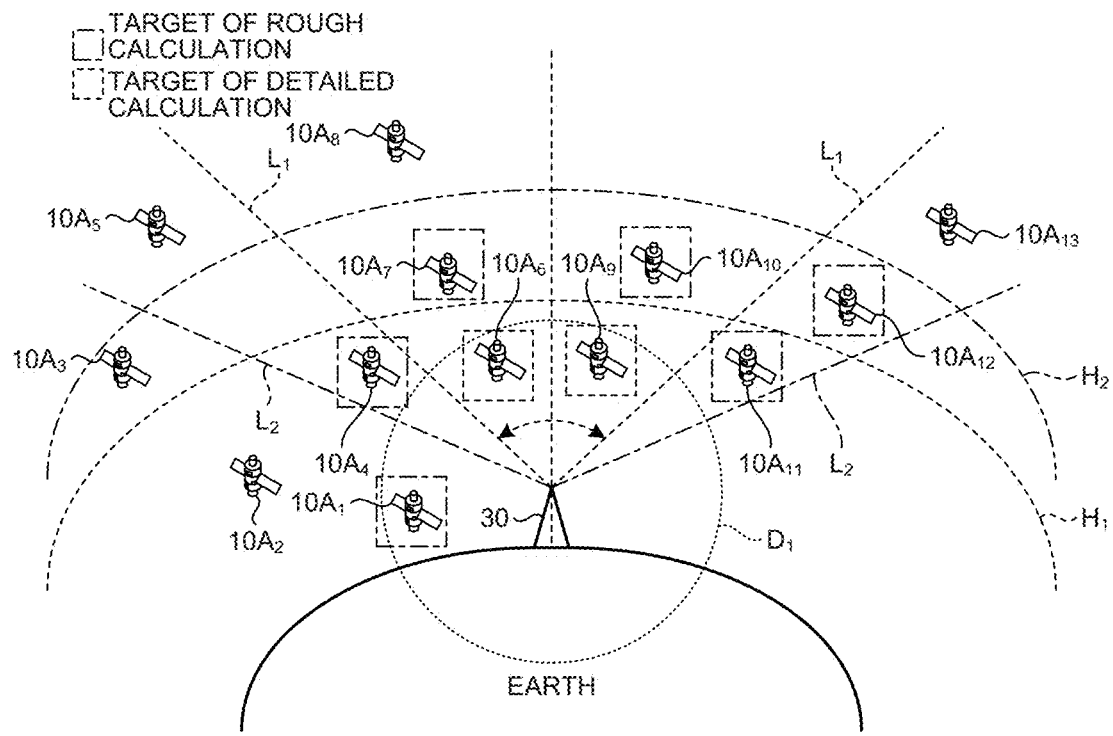
FIG. 45 is a diagram illustrating an example of the protection target selection result.

FIG. 45 is a diagram illustrating an example of the protection target selection result. FIG. 45 illustrates the results of the protection target selection of the aerial communication devices $10A_1$ to $10A_{13}$ selected in the branch of the determination of step S901 and step S903 of the flow illustrated in FIG. 42. Further, FIG. 45 illustrates a boundary line $L_1$ of the elevation angle and a boundary line $H_1$ of the altitude which form the protection target space used in the determination of step S901 of the flow. Further, FIG. 45 illustrates a boundary line $L_2$ of the elevation angle and a boundary line $H_2$ of the distance which are used to determine whether or not to execute the rough interference amount calculation in step S903 of the flow.

As illustrated in the legend of FIG. 45, in the flow illustrated in FIG. 42, among the aerial communication devices $10A_1$ to $10A_{13}$, the aerial communication devices $10A_6$ and $10A_9$ positioned inside the boundary line $L_1$ of the elevation angle and the boundary line $H_1$ of the altitude are selected as the protection target. These aerial communication devices $10A_6$ and $10A_9$ are subjected to the detailed interference amount calculation. Further, in the flow illustrated in FIG. 42, among the aerial communication devices $10A_1$ to $10A_{13}$, the aerial communication devices $10A_1$, $10A_4$, $10A_7$, $10A_{10}$, $10A_{11}$, and $10A_{12}$ positioned inside the boundary line $L_2$ of the elevation angle or the boundary line $D_1$ of the distance and outside the boundary line $L_1$ of the elevation angle and the boundary line $H_1$ of the altitude are selected as the protection target. These aerial communication devices $10A_1$, $10A_4$, $10A_7$, $10A_{10}$, $10A_{11}$, and $10A_{12}$ are subjected to the detailed interference amount calculation. The interference amounts of the aerial communication devices $10A_2$, $10A_3$, $10A_8$, and $10A_{13}$ other than these are set to zero.

Figure 46:
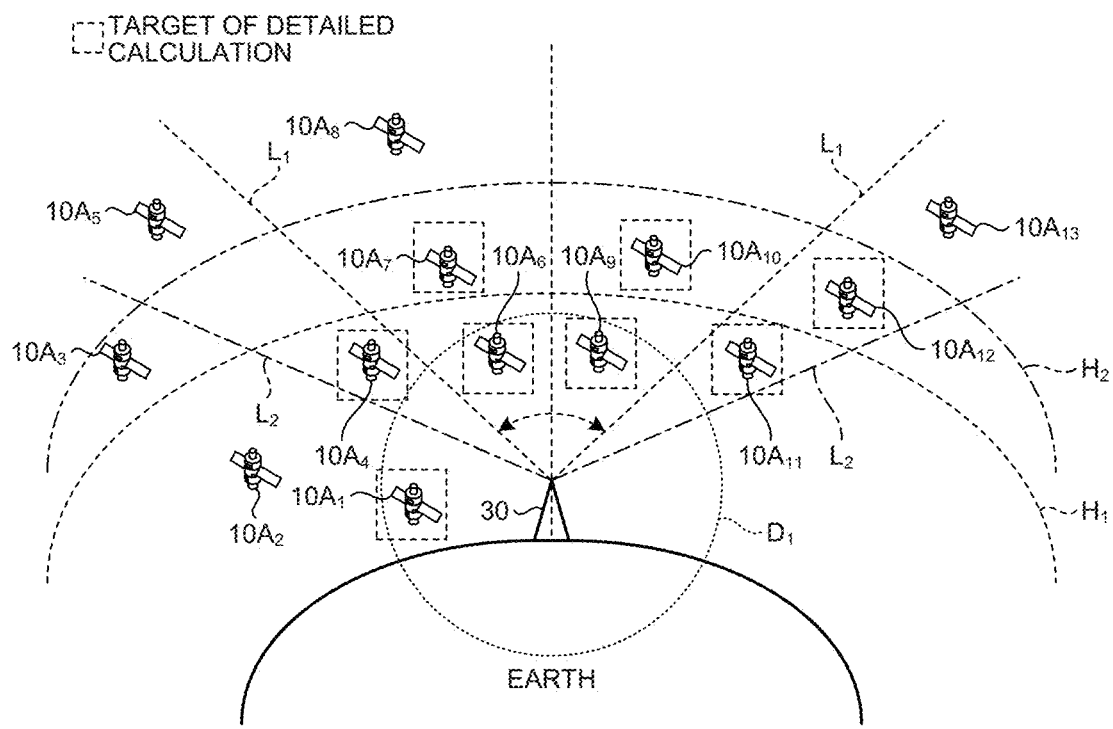
FIG. 46 is a diagram illustrating an example of the protection target selection result.

FIG. 46 is a diagram illustrating an example of the protection target selection result. FIG. 46 illustrates the results of the protection target selection of the aerial communication devices $10A_1$ to $10A_{13}$ selected in the branch of the determination of step S1001 and step S1003 of the flow illustrated in FIG. 43. Further, FIG. 46 illustrates a boundary line $L_1$ of the elevation angle and a boundary line $H_1$ of the altitude which form the protection target space used in the determination of step S1001 of the flow. Further, FIG. 46 illustrates a boundary line $L_2$ of the elevation angle and a boundary line $H_2$ of the distance which are used to determine whether or not to execute the rough interference amount calculation in step S1003 of the flow.

As illustrated in the legend of FIG. 46, in the flow illustrated in FIG. 43, among the aerial communication devices $10A_1$ to $10A_{13}$, the aerial communication devices $10A_6$, $10A_9$, $10A_1$, $10A_4$, $10A_7$, $10A_{10}$, $10A_{11}$, and $10A_{12}$ positioned inside the boundary line $L_1$ of the elevation angle and the boundary line $H_1$ of the altitude or positioned inside the boundary line $L_2$ of the elevation angle or the boundary line $D_1$ of the distance are selected as the protection target. These aerial communication devices $10A_6$, $10A_9$, $10A_1$, $10A_4$, $10A_7$, $10A_{10}$, $10A_{11}$, and $10A_{12}$ are subjected to the detailed interference amount calculation. The interference amounts of the aerial communication devices 10A other than these are set to zero.

Figure 47:
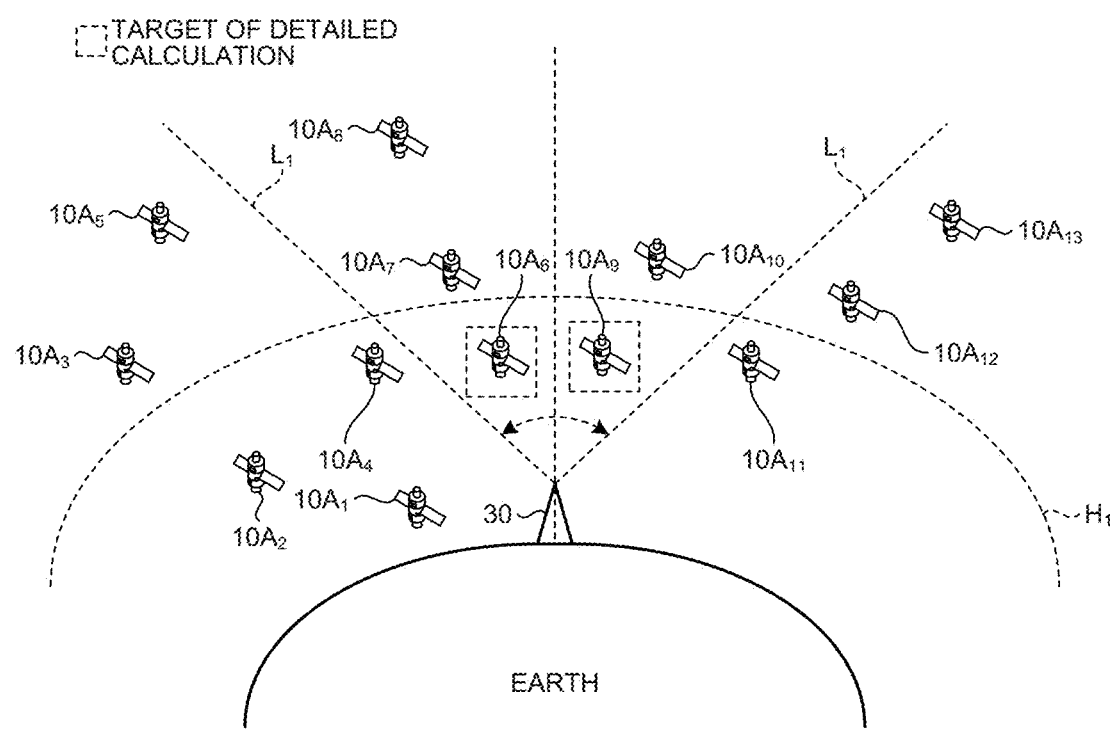
FIG. 47 is a diagram illustrating an example of the protection target selection result.

FIG. 47 is a diagram illustrating an example of the protection target selection result. FIG. 47 illustrates the results of the protection target selection of the aerial communication devices $10A_1$ to $10A_{13}$ selected in the branch of the determination of step S1101 of the flow illustrated in FIG. 44. Further, FIG. 47 illustrates a boundary line $L_1$ of the elevation angle and a boundary line $H_1$ of the altitude which form the protection target space used in the determination of step S1101 of the flow. As illustrated in the legend of FIG. 47, in the flow illustrated in FIG. 44, among the aerial communication devices $10A_1$ to $10A_{13}$, the aerial communication devices $10A_6$ and $10A_9$ positioned inside the boundary line $L_1$ of the elevation angle and the boundary line $H_1$ of the altitude are selected as the protection target. These aerial communication devices $10A_6$ and $10A_9$ are subjected to the detailed interference amount calculation. The interference amounts of the aerial communication devices 10A other than these are set to zero.

Figure 48:
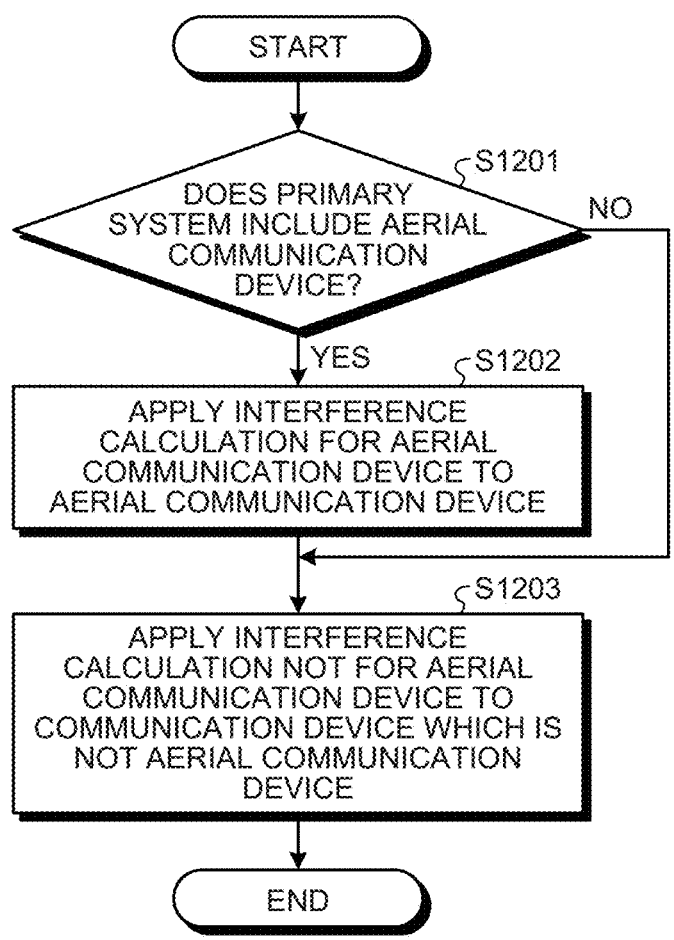
FIG. 48 is a diagram illustrating an example of a calculation flow of the applied interference amount.

FIG. 48 is a diagram illustrating an example of a calculation flow of the applied interference amount. Here, as an example, the operation subject of the flow is described as the communication control device 40. As illustrated in FIG. 48, in a case where the primary system includes the aerial communication device 10A (step S1201 Yes), the calculation unit 442 of the communication control device 40 applies the interference calculation for the aerial communication device to the aerial communication device 10A (step S1202). Thereafter, the calculation unit 442 of the communication control device 40 applies the interference calculation not for the aerial communication device to the communication device other than the aerial communication device 10A, that is, the terrestrial communication terminal 10B and the terrestrial fixed communication device 10C (step S1203). Incidentally, in a case where the primary system does not include the aerial communication device 10A (step S1201 No), the calculation unit 442 of the communication control device 40 skips the process of step S1202 and executes the process of step S1203.

<6-4. Reference Points Used for Interference Calculation>

In a case where the applied interference is calculated as described above, it is necessary to calculate the applied interference amount for each position of the communication device 10 in the primary system. Since the positions of the communication devices 10 of the primary system are basically continuous values, the calculation amount may increase enormously depending on the number of communication devices.

Therefore, in this embodiment, in order to suppress the increase in the calculation amount, the calculation unit 442 of the communication control device 40 calculates the applied interference amount by using the positions of the reference points (reference points, protection points, interference protection points, and hereafter referred to as reference points) arranged discretely instead of the position of the actual communication device. Further, when the arrangement of the reference point is set to be specific to each communication device of the secondary system such as the terminal device 20 and the base station device 30, the interference calculation can be further simplified.

Figure 49:
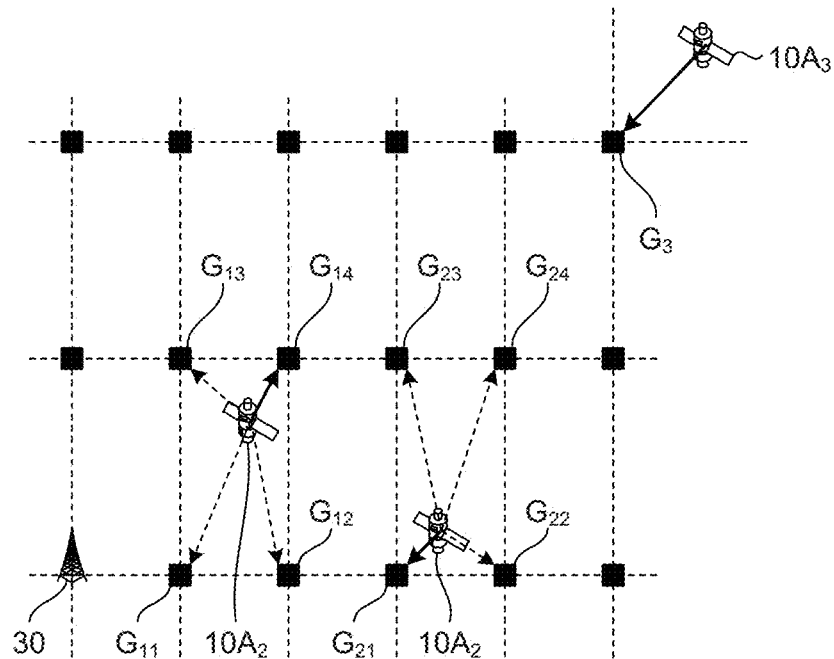
FIG. 49 is a diagram illustrating an arrangement example of reference points.

FIG. 49 is a diagram illustrating an arrangement example of the reference points. FIG. 49 schematically illustrates a top view in a case where the reference points are arranged in a grid pattern. In FIG. 49, the communication devices (the candidate sources of the interference with the primary system) 30 of the secondary system and three aerial communication devices (the communication devices which may be interfered with by the communication devices of the secondary system) $10A_1$ to $10A_3$ exist. In a case where the applied interference amount calculation is to be performed precisely, the interference amount calculation is executed using the position (a latitude, a longitude, an altitude, and the like) where the aerial communication device 10A actually exists. On the other hand, in this embodiment, the position of the aerial communication device 10A is mapped to any one of the reference points (black squares in FIG. 49) arranged according to a predetermined rule, and the amount of the interference applied to the position of the aerial communication device 10A is calculated by using the position (a latitude, a longitude, an altitude, and the like) of the mapped reference points. An example of the reference point obtained by mapping the position of the aerial communication device 10A can be a reference point having the closest distance (shortest distance) to the actual position of the aerial communication device 10A. Conceivable (a relationship indicated by a red arrow in the drawing). Further, a plurality of reference points for mapping the aerial communication device 10A may be provided. For example, the positions may be mapped to reference points having distances (quasi-shortest distance) which are not the shortest but are equivalent to the shortest. The positions may be mapped to $N_{RP,p}$ reference points in ascending order of distance with the number of reference points to be mapped with respect to the communication device p of the primary system set as $N_{RP,p}$ (FIG. 49 corresponds to $N_{RP,p}$=4). Incidentally, the arrangement of reference points may be configured by a finite number of reference points. In this case, as illustrated in the upper right of FIG. 49, the communication device of the primary system may exist further outside the arrangement of the reference points. In this case, the number of reference points to be mapped may be smaller than a predetermined value.

For example, in the case of the aerial communication device $10A_1$, the aerial communication device $10A_1$ is mapped to the reference point $G_{14}$ which is at the shortest distance of the aerial communication device $10A_1$ among the reference points $G_{11}$ to $G_{14}$. Further, in the case of the aerial communication device $10A_2$, the aerial communication device $10A_2$ is mapped to the reference point $G_{21}$ which is at the shortest distance of the aerial communication device $10A_2$ among the reference points $G_{21}$ to $G_{24}$. Incidentally, in the example of the aerial communication device $10A_3$, the aerial communication device $10A_3$ is mapped to the reference point $G_3$ which is at the shortest distance of the aerial communication device $10A_3$.

Figure 50:
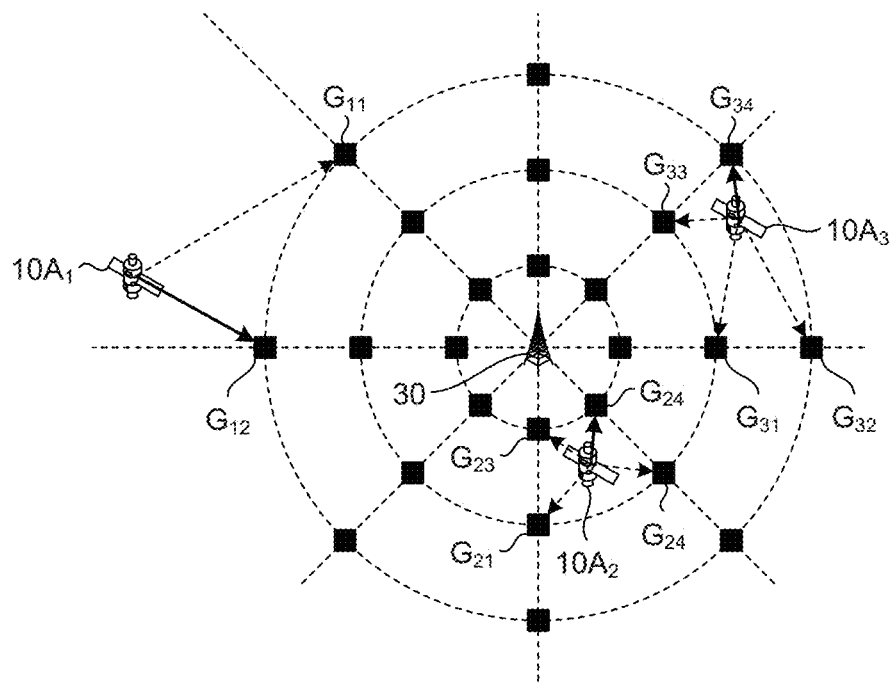
FIG. 50 is a diagram illustrating an arrangement example of the reference points.

FIG. 50 is a diagram illustrating another arrangement example of the reference points. FIG. 50 schematically illustrates a top view in a case where the reference points are arranged radially from the base station device 30. Similar to FIG. 49, in FIG. 50, the communication devices (the candidate sources of the interference with the primary system) 30 of the secondary system and three aerial communication devices (the communication devices which may be interfered with by the communication devices of the secondary system) $10A_1$ to $10A_3$ exist. In the example of FIG. 50, the reference points are arranged at equal intervals on all radial straight lines. Also in the example of FIG. 50, mapping of the aerial communication device 10A is possible as in the example of FIG. 40. For example, in the case of the aerial communication device $10A_1$, the aerial communication device $10A_1$ is mapped to the reference point $G_{12}$ which is at the shortest distance of the aerial communication device $10A_1$ among the reference points $G_{11}$ and $G_{12}$. Further, in the case of the aerial communication device $10A_2$, the aerial communication device $10A_2$ is mapped to the reference point $G_{24}$ which is at the shortest distance of the aerial communication device $10A_2$ among the reference points $G_{21}$ to $G_{24}$. Further, in the case of the aerial communication device $10A_3$, the aerial communication device $10A_3$ is mapped to the reference point $G_{34}$ which is at the shortest distance of the aerial communication device $10A_3$ among the reference points $G_{31}$ to $G_{34}$.

In the example of FIG. 50, the reference points are arranged at equal intervals on all the radial straight lines, but the arrangement of the reference points can be made non-uniform for each radial straight line.

Figure 51:
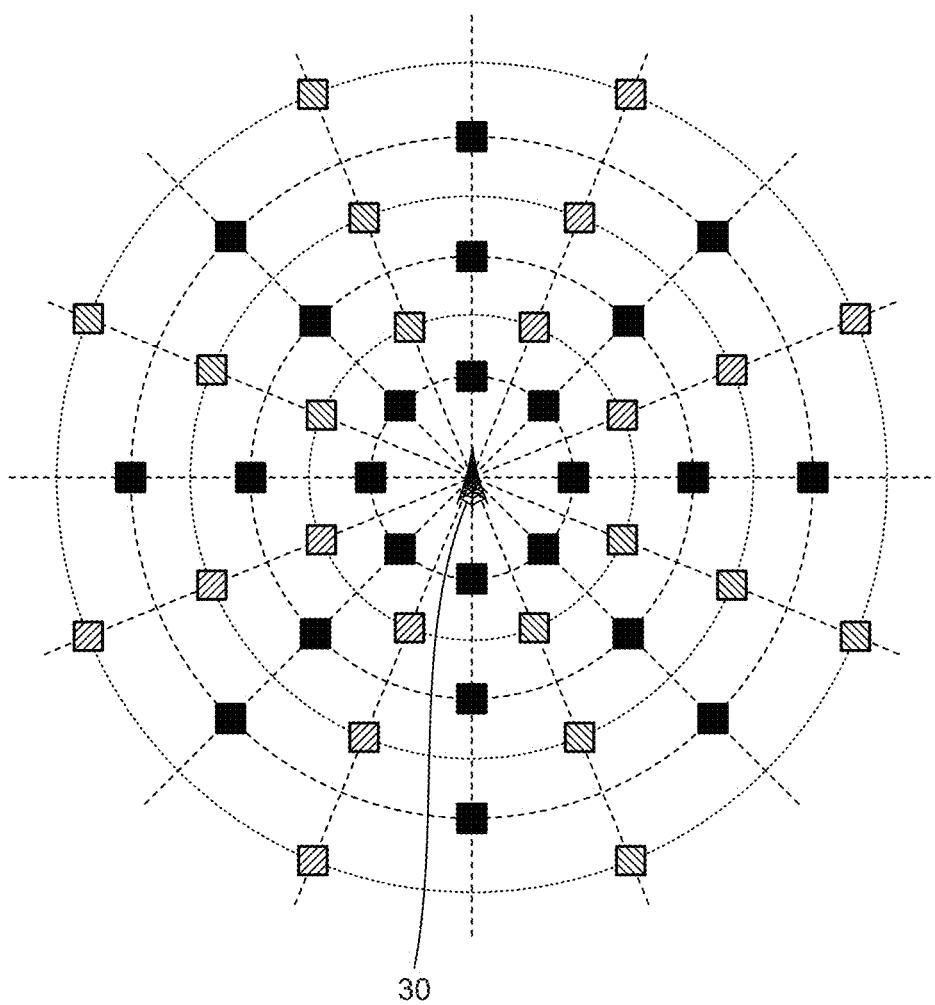
FIG. 51 is a diagram illustrating an arrangement example of the reference points.

FIG. 51 is a diagram illustrating another arrangement example of the reference points. As illustrated in FIG. 51, in a case where the reference points are arranged non-uniformly for each radial straight line, the reference point at the shortest distance from the base station device 30 may be different for each radial straight line. This is because in a case where the reference points are arranged radially, the density of the reference points decreases as the distance from the center (the base station device 30 in this example) increases. Therefore, a difference between the applied interference amount calculated at the reference point and the actual amount of the interference applied to the aerial communication device 10A may increase as the distance from the center increases. For this reason, the arrangement of the reference points for each radial straight line is made non-uniform, and the shortest distance of the reference point from the communication device of the secondary system such as the base station device 30 is different for each radial straight line. Accordingly, it is possible to mitigate the decrease in the density of the reference points even in a portion far from the communication device of the secondary system. Further, in the case of considering a concentric circle centered on the base station device 30, the reference points may be arranged at all intersections of a certain concentric circle and a radial straight line. Alternatively, the reference point may be arranged only at a part of the intersections between a concentric circle and a radial straight line.

Figure 52:
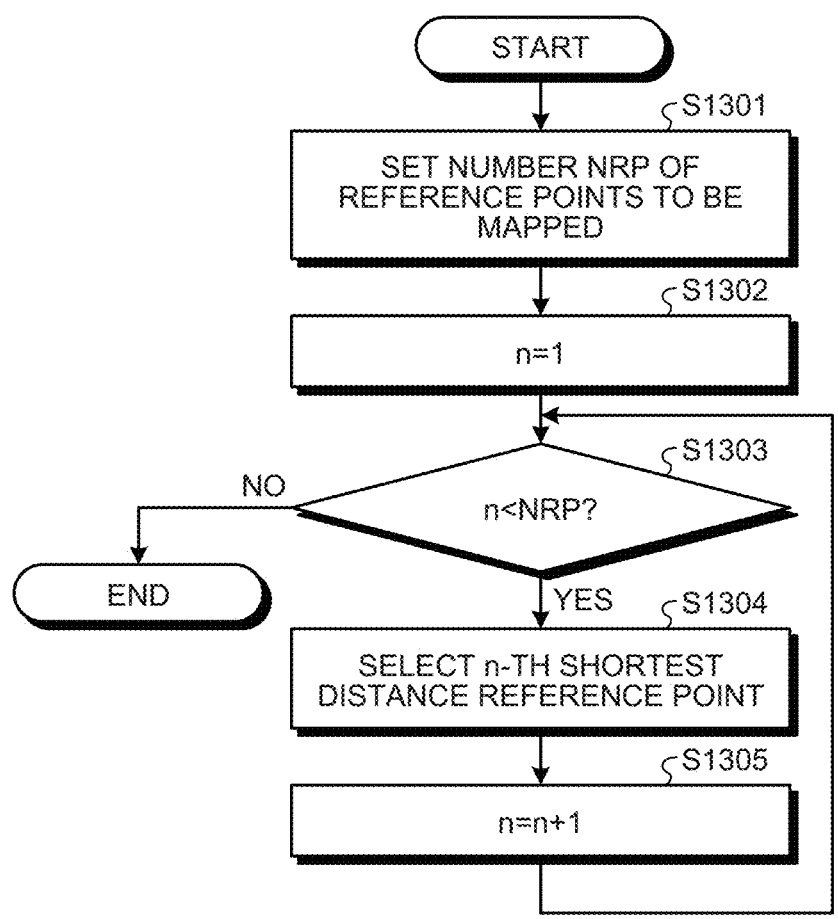
FIG. 52 is a diagram illustrating an example of a selection flow of a reference point.

FIG. 52 is a diagram illustrating an example of a selection flow of the reference point. Here, as an example, the operation subject of the flow is described as the communication control device 40. As illustrated in FIG. 52, the calculation unit 442 of the communication control device 40 sets the number NRP of the reference points to be mapped (step S1301). Subsequently, the calculation unit 442 of the communication control device 40 increments a loop counter n (step S1302).

Then, the following step S1304 and step S1305 are executed until the loop counter n is incremented to the number NRP of the reference points (step S1303 Yes). That is, in step S1304, the calculation unit 442 of the communication control device 40 selects the n-th shortest distance reference point. Then, in step S1305, the calculation unit 442 of the communication control device 40 increments the loop counter n, and the process returns to the process of step S1303. Thereafter, in a case where the loop counter n is incremented to the number NRP of the reference points (step S1303 No), the process ends.

This embodiment is also applicable even in a case where the reference points are arranged in the three-dimensional space. For example, in a case where the reference points are arranged in the air, the communication device of the secondary system of the base station device 30 is set as a center, the outer boundary line of the protection target area formed by the elevation angle is set as an outer edge where the reference points are arranged, and the reference points can be arranged on Ray that passes from the center inside the protection target area. Further, the reference point does not necessarily have to be arranged in the air and can be arranged on a horizontal plane.

In the case of considering mapping to the reference point having the shortest distance and the reference point having the quasi-shortest distance, in the example in FIG. 49 and the example in FIG. 50, the description is given about a plane surrounded by a plurality (for example, three or four or more) of reference points. However, this embodiment can be applied when a plane space assumed which plane is surrounded by a plurality (for example, four or five or more) of reference points, and the reference points surrounding the space are set as reference points having the shortest distance and quasi-shortest distance. Also, in the case of considering the shape of the earth and a latitude, a longitude, and an altitude, the auxiliary line of the broken line illustrated in FIG. 49 may not be a straight line. Even in such a case, this embodiment can be applied.

Figure 53:
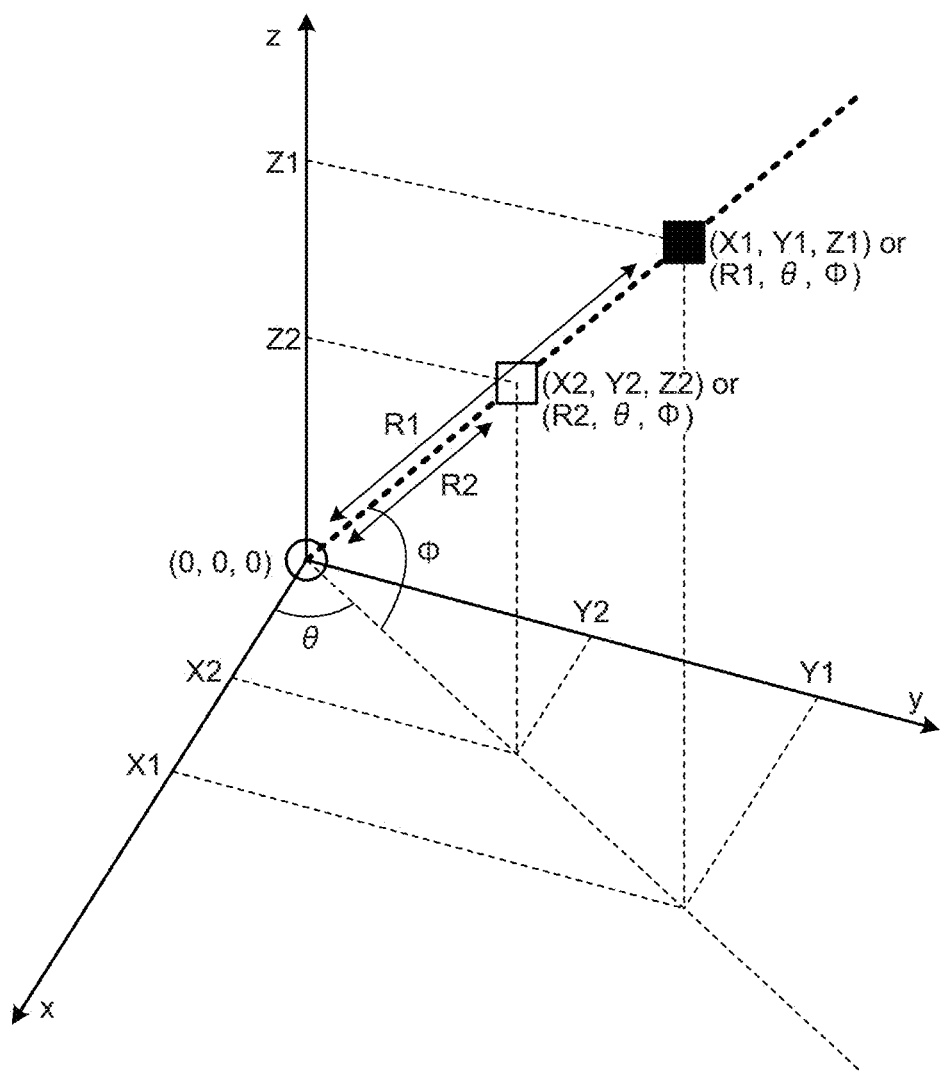
FIG. 53 is a diagram illustrating an example of definitions of a radial straight line and the reference point in a three-dimensional space.

FIG. 53 is a diagram illustrating an example of definitions of the radial straight line (thick broken line) and the reference point (black square) in a three-dimensional space. The origin illustrated in FIG. 53 corresponds to, for example, the position of the base station device 30 or the transmission point (antenna point) of the base station device 30. As illustrated in FIG. 53, in the case of Euclidean space, the radial straight line and the reference point may be defined by the x, y, and z coordinates. Alternatively, the radial straight line and the reference point may be defined by the distance (R in the drawing), the angle on the horizontal plane ($\theta$ in the drawing), and the angle on the vertical plane ($\phi$ in the drawing). Incidentally, in the example of FIG. 53, the Euclidean space (plane) is assumed in the definition, but in the position information, various expressional differences such as a latitude, a longitude, and an altitude may be made in addition to the Euclidean space. In the conversion of the expression of this position information, for example, the conversion may be performed into a desired expression form of position information after the distance between two points (for example, the position of the aerial communication device 10A and the position of the reference point, and the positions of two different communication devices) expressed as a latitude and a longitude by Vincenty's Formulae or the like is obtained.

Figure 54:
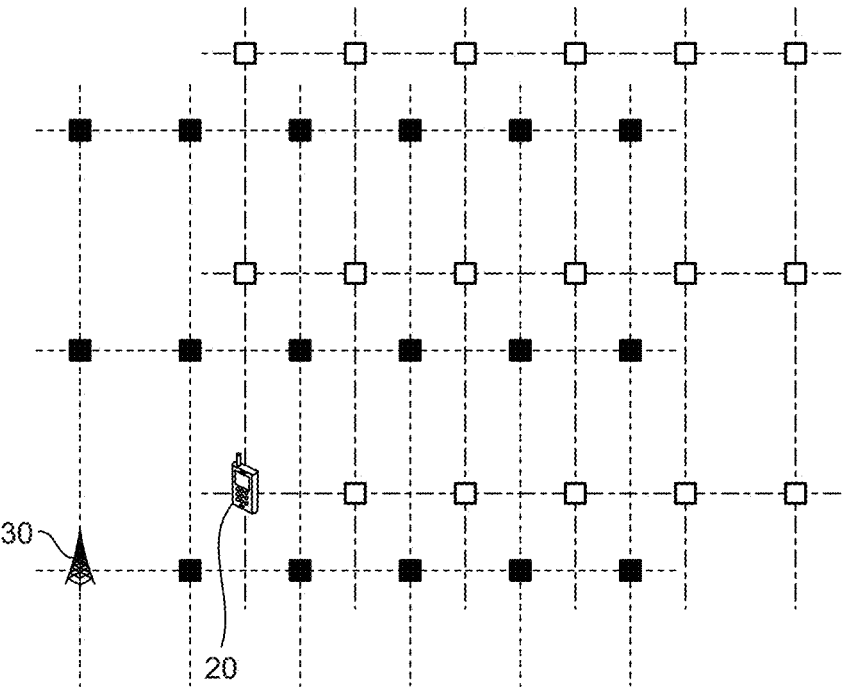
FIG. 54 is a diagram illustrating an arrangement example of the reference points.
Figure 55:
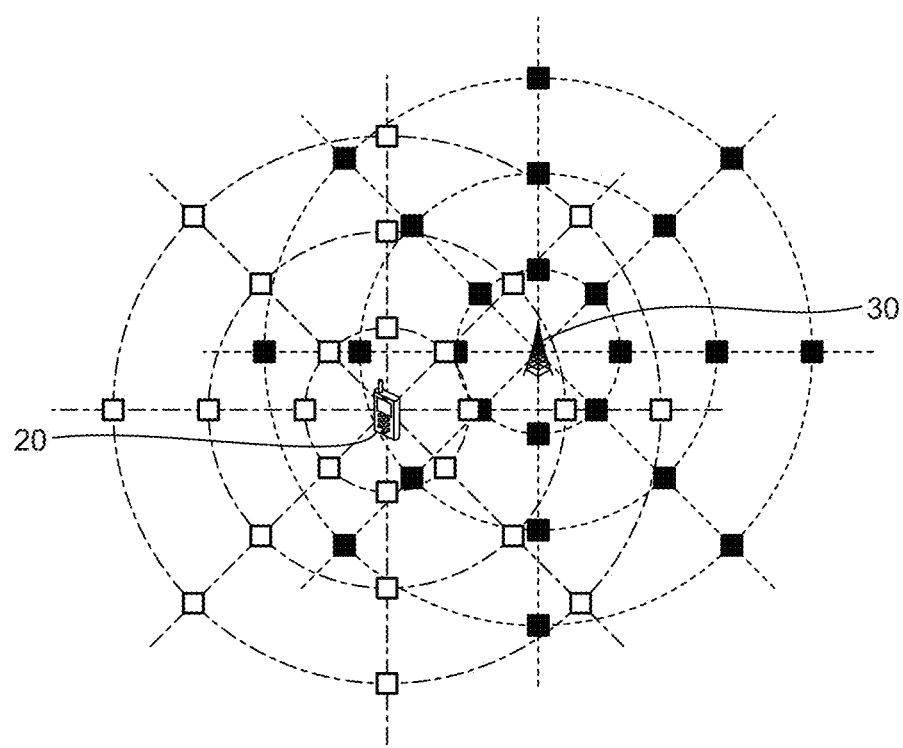
FIG. 55 is a diagram illustrating an arrangement example of the reference points.

In this embodiment, it is desirable that the arrangement of reference points is set for each communication device of the secondary system such as the terminal device 20 and the base station device 30. FIGS. 54 and 55 are diagrams illustrating arrangement examples of the reference points. FIG. 54 illustrates an example in which the reference points are arranged in a grid pattern for each of the terminal device 20 and the base station device 30. Further, FIG. 55 illustrates an example in which the reference points are arranged radially for each of the terminal device 20 and the base station device 30. In the example of FIG. 54 and the example of FIG. 55, the black square corresponds to the reference point for the base station device 30, and the white square corresponds to the reference point for the terminal device 20.

The arrangement interval of the reference points may be different for each communication device of the secondary system such as the terminal device 20 and the base station device 30. For example, the arrangement interval may be changed according to the Capability of the transmission power or the maximum transmission power of the secondary system communication device such as the terminal device 20 and the base station device 30. In a case where the transmission power and the maximum transmission power are large as in the base station, the influence of the applied interference amount can be expected to be large, so it is desirable to make the arrangement interval of the reference points short. Further, for example, in a case where the required accuracy of the position information of the communication device of the secondary system, the travel distance requiring the re-registration procedure to the communication control device 40, or the like is designated in advance by law or the like, the arrangement interval of the reference points may be determined by using these values. Further, in a case where the transmission power and the maximum transmission power are relatively small as in the terminal device 20, the arrangement interval of the reference point may be wide. Here, in a case where the reference points are arranged radially, the following settings can be exemplified as a method of making the arrangement intervals of the reference points short (wide).

1) To increase (decrease) the number of the radial straight lines
2) To increase (decrease) the number of the reference points per radial straight line
3) To make the interval between the reference points for each radial straight line short (wide)

Figure 56:
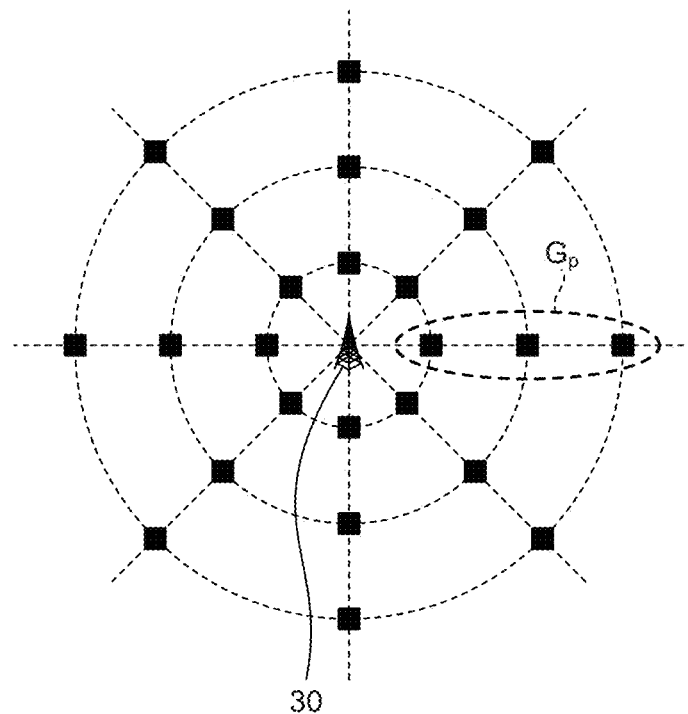
FIG. 56 is a diagram illustrating an arrangement example of the reference points.

In this embodiment, in a case where the reference points are arranged radially, it is possible to reduce the calculation amount and simplify the calculation in the calculation of the interference amount applied from the communication device of the secondary system to the reference point. FIG. 56 is a diagram illustrating an arrangement example of the reference points. As illustrated in FIG. 56, in the reference points arranged in the same radial shape, for example, three reference points $G_p$, it is possible to commonize some of the communication parameters of the secondary system and the primary system to be used for the interference calculation.

That is, the same radial straight line serves as a geographical constraint, so the benefits of commonizing the communication parameters can be obtained.

Figure 57:
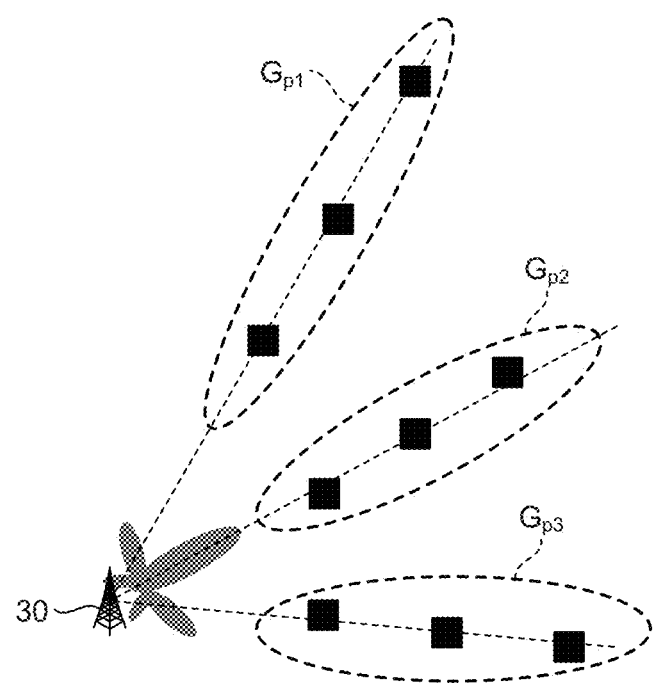
FIG. 57 is a diagram illustrating an example of commonization of the communication parameters.

FIG. 57 is a diagram illustrating an example of the commonization of the communication parameters. In FIG. 57, the antenna directivity gain of the communication device of the secondary system such as the base station device 30 is commonized. The antenna directivity gain is determined by the direction (a horizontal plane angle, a vertical plane angle, or the like), and thus the same value of gain can be assumed with respect to the reference points $G_{p1}$, $G_{p2}$, and $G_{p3}$ on the same radial straight line.

As for the commonization of the communication parameters in the applied interference amount calculation, it is desirable that the communication parameters on the communication device side of the secondary system such as the base station device 30 are commonized including the above-described antenna directivity gain. In addition to the antenna directivity gain of the communication device of the secondary system, the position (a latitude, a longitude, an altitude, and the like) of the communication device of the secondary system, the transmission power of the communication device of the secondary system, and the like can be exemplified. In this embodiment, the applied interference amount calculation can be simplified by commonizing at least a part of the communication parameters in the same radial shape.

Contrary to the above, it is difficult to commonize the communication parameters, and the antenna directivity gain of the communication device 10 of the primary system, the position (a latitude, a longitude, an altitude, or the like) of the communication device 10 of the primary system, a path loss model and a path loss variable factor (Shadowing, Log-normal fading, Slow fading, Fast fading, Multipath fading, or the like) between the communication device 10 of the primary system and the secondary system communication device such as the terminal device 20 and the base station device 30, the noise power of the primary system, the acceptable interference amount of the primary system communication device, an acceptable SINR, an acceptable SIR, an acceptable INR, or the like can be exemplified. For these, even for the same radial shape of reference points, it is desirable to use values for each reference point without commonizing the communication parameters. However, in a case where the communication device of a certain secondary system is mapped to a plurality of reference points, the communication parameters may be commonized for the reference points to which a target secondary system communication device is mapped. Further, in a case where parameters (fading margin or the like) for compensating for those fluctuations are provided, the parameters may be treated as common communication parameters.

Figure 58:
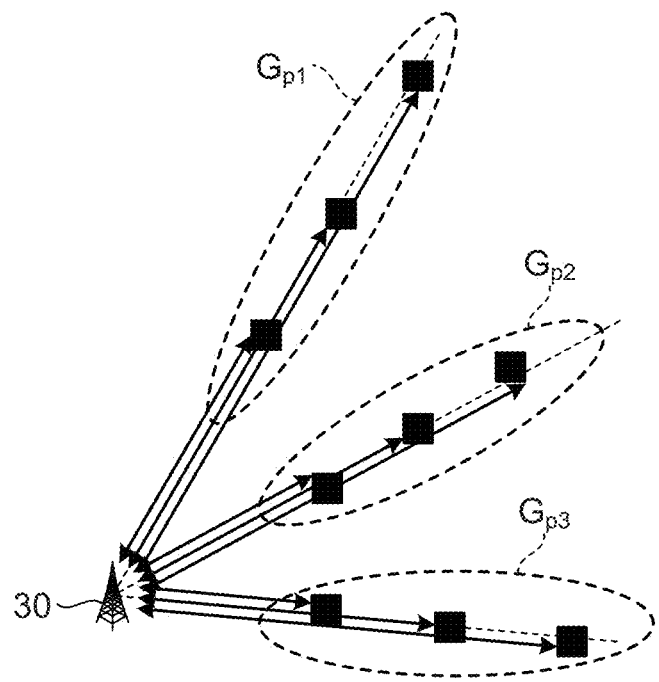
FIG. 58 is a diagram illustrating an example of partially commonizing parameters in path loss calculation.

In the path loss assumed when calculating the applied interference amount, the communication parameters can be partially commonized in some cases. FIG. 58 is a diagram illustrating an example of partially commonizing parameters in the path loss calculation. For example, as illustrated in FIG. 58, it is assumed that path loss L (a true value or a linear value, L≤1) is defined with respect to distance d by a model as shown in the following formula.

$$L = L_F d^{-\alpha}$$

Here, $L_F$ indicates a predetermined value determined by the surrounding environment, the frequency, and the like. In addition, $\alpha$ indicates an attenuation coefficient determined by the surrounding environment, the frequency, and the like. Here, assuming that the distances between different reference points (referred to as a and b) which are on the same radial straight line and the radial center are $d_a$ and $d_b$, respectively, the path loss of each reference point is calculated by the following formula (9) and formula (10).

$$L_1 = L_F d_1^{-\alpha} \tag{9}$$

$$L_2 = L_F d_2^{-\alpha} \tag{10}$$

When the distances $d_a$ and $d_b$ between these reference points and the center can be expressed by the ratio ($\beta$ corresponds to the ratio) of the reference distances such as $d_a = \beta_a * d_0$ and $d_b = \beta_b * d_0$ with reference to a certain distance $d_0$, the above path loss can be expressed as the following formulas (11) to (13).

$$L_a = L_F(\beta_a d_o)^{-\alpha} = L_{common} \beta_a^{-\alpha} \tag{11}$$

$$L_b = L_F(\beta_b d_o)^{-\alpha} = L_{common} \beta_b^{-\alpha} \tag{12}$$

$$L_{common} = L_F d_0^{-\alpha} \tag{13}$$

In the above formula, $L_{common}$ is a common path loss component on the same radial straight line and can be calculated in advance for the surrounding environment, the frequency, and the reference distance. Further, since $\beta$ can also be determined in advance by the arrangement rule of the reference points on the radial straight line, $\beta^{-\alpha}$ can also be calculated in advance.

In this embodiment, the applied interference amount calculation is simplified by arranging a reference point for each communication device of the secondary system. On the other hand, in this embodiment, it is also possible to arrange a reference point for each communication device 10 of the primary system. In this case, instead of mapping the communication device 10 of the primary system to the reference point in the above description, the communication device of the secondary system is mapped to the reference point. Further, in a case where the reference points are arranged radially, the center thereof is the communication device 10 of the primary system.

Figure 59:
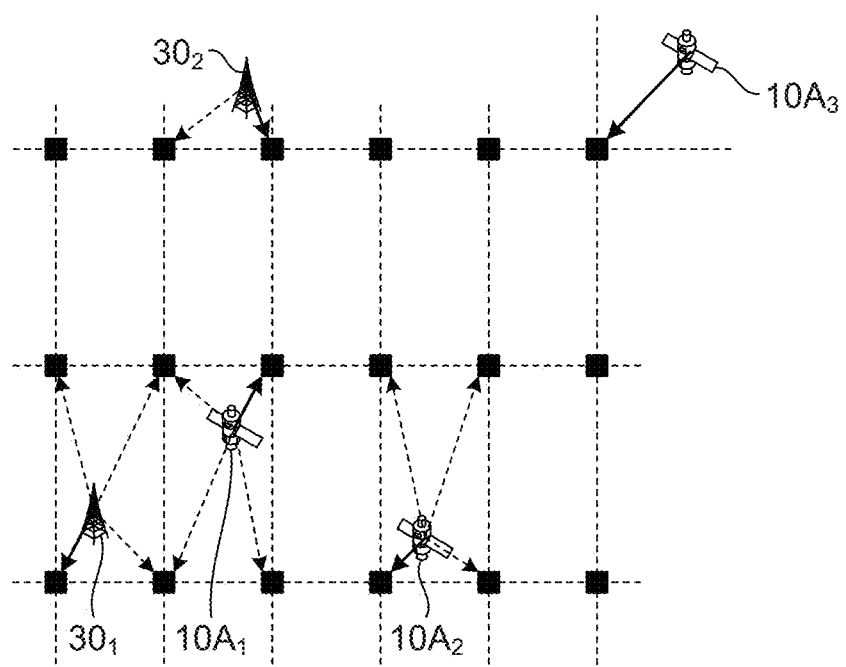
FIG. 59 is a diagram illustrating an example in which an arrangement of the reference points is commonized in a plurality of communication devices of the secondary system.

The applied interference amount calculation may be simplified by commonizing the arrangement of the reference points among a plurality of communication devices of the secondary system (and the primary system communication device). FIG. 59 is a diagram illustrating an example in which the arrangement of the reference points is commonized in the plurality of communication devices of the secondary system. FIG. 59 illustrates an example in which the reference point arrangement is commonized in the secondary system communication devices of the base station device $30_1$ and of the base station device $30_2$. In a case where the arrangement of the reference points is commonized, in addition to mapping the aerial communication devices $10A_1$ to $10A_3$ to the reference points, the base station device $30_1$ and the base station device $30_2$ are also mapped to the reference point positions instead of the actual positions. As for the mapping method, similarly to the communication device 10 of the primary system, it is desirable to map to one or more reference points including the shortest distance or the quasi-shortest distance.

After the reference point mapping is complete, the interference is calculated on the basis of the position of the communication device of the secondary system and the position of the reference point to which the communication device of the primary system is mapped. Alternatively, the position of the communication device of the primary system and the position of the reference point to which the secondary system communication device is mapped may be used, but the following explanation will be given on the basis of the former.

In the calculation of the above formula (5), in this embodiment, the position of the target communication device of the primary system is not the actual position $(x_p, y_p, z_p)$ but the position of the reference point $(x_{p,RP,n}, y_{p,RP,n}, z_{p,RP,n})$, and n is the reference point number in the case of mapping to a plurality of reference points.

In a case where the reference points are arranged radially, it is possible to commonize the values of the communication parameters as described in FIGS. 56 and 57. In a case where the antenna directivity gain of the communication device of the secondary system is commonized, the values of $As(x_{p,RP,n}, y_{p,RP,n}, z_{p,RP,n}, x_S, y_S, z_S)$ in the above formula (5) are the same for the same radial reference point. This means is that in a case where the antenna characteristics of the communication device of the secondary system are known in advance (for example, it can be known in advance by being acquired as the Capability information of the secondary system communication device), and the arrangement (a horizontal plane angle and a vertical plane angle) of the radial straight lines is determined by a predetermined rule, the calculation can be performed in advance (offline) regardless of the execution timing of the calculation of the applied interference amount. For example, assuming that the number of radial straight lines is $N_{rad}$, it is sufficient to calculate $N_{rad}$ antenna directivity gains of the communication device of the secondary system.

The (partial) commonization of communication parameters in this embodiment can also be applied to the calculation of path loss as described with reference to FIG. 58. With this (partial) commonization, path loss factors particularly depending on a distance can be calculated offline in advance. In particular, here, the reference distance may be set as the distance of the reference point positioned at the shortest distance from the center on the target radial straight line.

Figure 60:
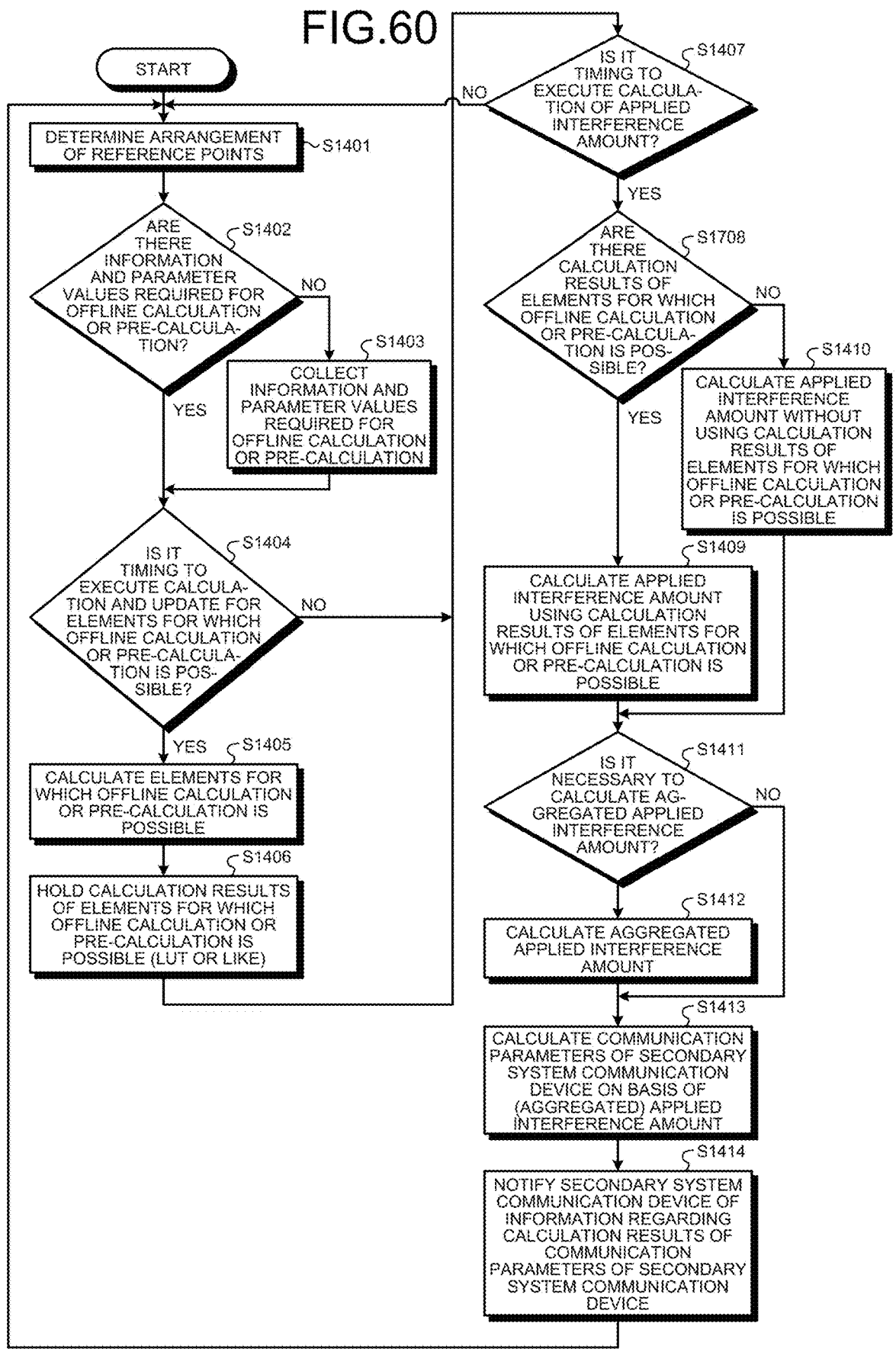
FIG. 60 is a diagram illustrating an example of a calculation flow of an applied interference amount considering offline calculation and pre-calculation.

FIG. 60 illustrates an example of a calculation flow of the applied interference amount considering the above offline calculation and pre-calculation. FIG. 60 is a diagram illustrating the example of the calculation flow of the applied interference amount considering the offline calculation and pre-calculation. Here, as an example, the operation subject of the flow is described as the communication control device 40.

As illustrated in FIG. 60, first, the calculation unit 442 of the communication control device 40 sets the arrangement (a grid pattern, a radial pattern, or the like) of the reference points (step S1401). Next, the calculation unit 442 of the communication control device 40 determines whether or not the information and parameter values required for the offline calculation and pre-calculation are sufficient (step S1402). Such information can be acquired from, for example, Capability information from the secondary system communication device and Capability information of the primary system communication device.

At this time, in a case where the information and parameter values required for the offline calculation and pre-calculation are not sufficient (step S1402 No), the calculation unit 442 of the communication control device 40 transmits, to the communication device of the secondary system or the communication device of the primary system, a request that notifies the required information (step S1403). Then, in a case where the information and parameter values required for the offline calculation and pre-calculation are gathered, and it is timing to execute the offline calculation and pre-calculation (step S1404), the calculation unit 442 of the communication control device 40 executes the offline calculation and pre-calculation of the antenna directivity gain, the distance-dependent elements of path loss, or the like as described above (step S1405). These calculation results may be held, for example, in a look-up table (LUT) format or a database format such as SQL.

Next, in a case where it is timing to perform the calculation of the applied interference amount for the communication device of the primary system (and the reference point to which the communication device of the primary system is mapped) (step S1407 Yes), the calculation unit 442 of the communication control device 40 executes the applied interference amount calculation. Here, in a case where there is a result of the offline calculation and pre-calculation (step S1408 Yes), the calculation unit 442 of the communication control device 40 executes the applied interference amount calculation by using the calculation results (step S1409). On the other hand, in a case where there is no result of the offline calculation and pre-calculation (step S1408 No), the calculation unit 442 of the communication control device 40 executes the calculation of the applied interference amount individually for each primary system communication device or reference point (step S410).

Further, in a case where it is necessary to calculate the aggregated applied interference amount (step S1411 Yes), the calculation unit 442 of the communication control device 40 calculates the aggregated amount of the interferences applied from the secondary system communication devices (step S1412). Examples of the condition for the necessity of calculating the aggregated applied interference amount include the existence, operation, and communication request of a plurality of secondary systems or a plurality of communication devices of the secondary system.

After the calculation of the applied interference amount or the aggregated interference is completed, the determination unit 443 of the communication control device 40 calculates the communication parameters (for example, the transmission power, the acceptable transmission power, the maximum transmission power, the use frequency channel, and the directivity pattern) of the communication device of the secondary system on the basis of the calculation results (step S1413). Then, the notification unit 445 of the communication control device 40 notifies the calculation results of the communication device of the target secondary system, for example, the base station device 30 (step S1414).

After calculating the above aggregated interference amount, the determination unit 443 of the communication control device 40 calculates the communication parameters of the communication devices of the secondary system such as the terminal device 20 and the base station device 30 such that the interference amount meets a predetermined criterion. For example, as an example of the criterion, as shown in the following formula (14), for all the communication devices 10 of the target primary system, the communication parameters are calculated such that the aggregated interference amount is equal to or less than a predetermined interference amount threshold $I_{th,p}$.

$$I_{Agg,p} \leq I_{th,p}, \forall p \quad (14)$$

Examples of the communication parameter include a transmission power $P_{Tx,s}$ and a maximum transmission power $P_{Tx,Max,s}$ of the secondary system communication device, or a transmission power-related parameter equivalent thereto.

<6-5. Notification and Setting of Communication Parameters>

In this embodiment, as described above, after obtaining the communication parameters to be used by the communication device of the secondary system, the notification unit 445 of the communication control device 40 actually notifies the communication device of the secondary system. On the other hand, the setting unit 244 of the terminal device 20 and the setting unit 344 of the base station device 30 set the notified communication parameter in the storage unit 22 or the storage unit 32.

Figure 61:
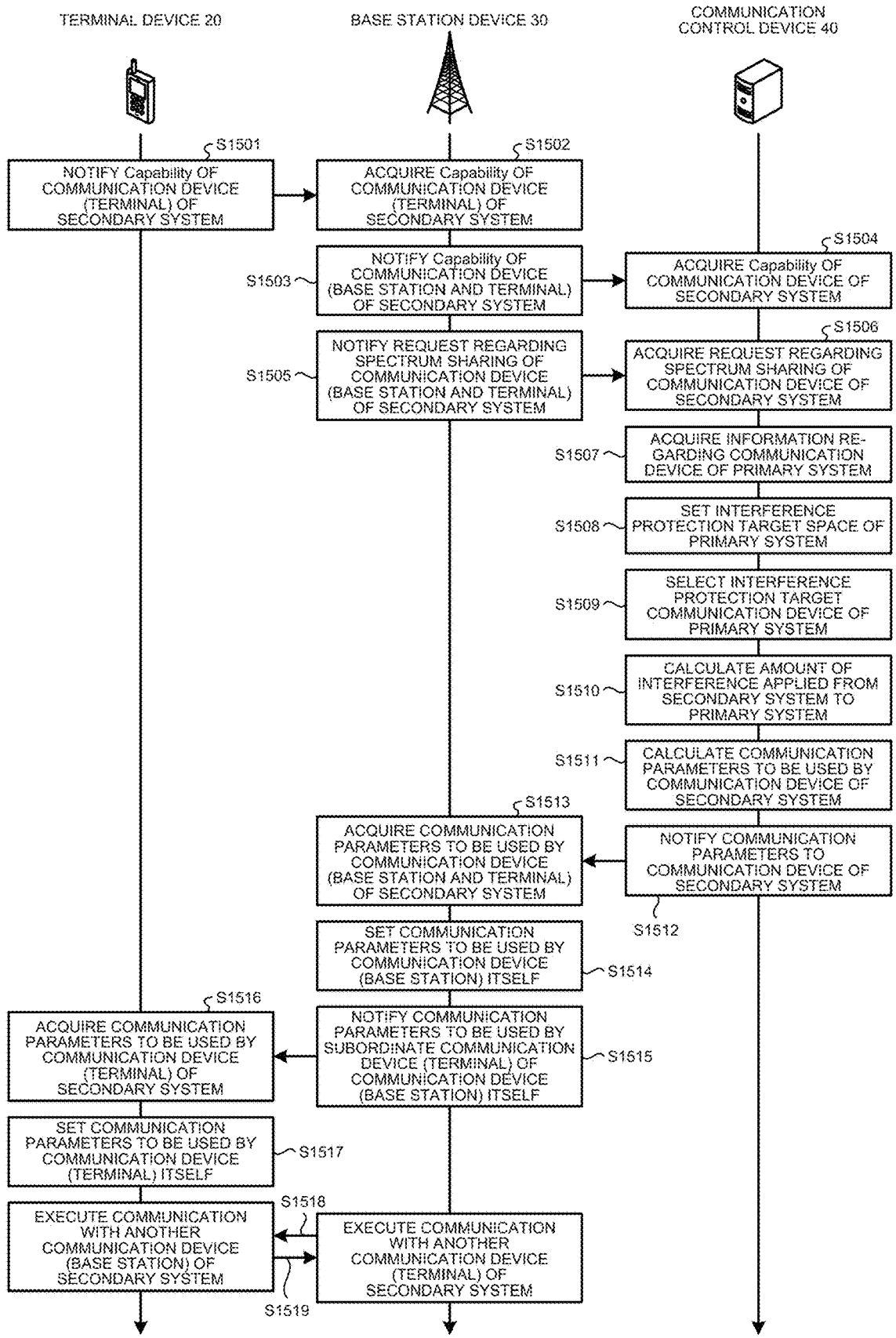
FIG. 61 is a diagram illustrating an example of a signaling procedure.

FIG. 61 is a diagram illustrating an example of a signaling procedure. FIG. 61 illustrates an example of a case where the communication control device 40 executes the protection target selection and the interference calculation of the aerial communication device 10A. Further, in the example of FIG. 61, it is assumed that the terminal device 20 is connected to the base station device 30 by random access or handover.

As illustrated in FIG. 61, the terminal device 20 notifies the connection-destination base station device of the information regarding the Capability of the terminal device 20 itself (step S1501). In response to this, the base station device 30 acquires the information regarding the Capability notified in step S1501 from the terminal device 20 (step S1502).

Here, examples of the information regarding Capability include frequency bands that can be used by terminals, frequency channel numbers, carrier aggregation capabilities, Dual Connectivity (Multi-Connectivity) capabilities, and the number of MIMO antennas (including the number of antenna panels). Further, the examples of the information regarding Capability include terminal categories, buffer sizes, the maximum transmission power, the minimum transmission power, QoS class (quality of service class), the position information (a latitude, a longitude, an altitude, and the like) of the terminal device 20, and the mobility of the terminal device.

Notification from the terminal device 20 to the base station device 30 may be executed by using, for example, a part of Radio Resource Control (RRC) signaling or uplink control information (UCI). Further, the notification may be executed by using an uplink physical channel (Physical Uplink Control Channel (PUCCH), Physical Uplink Shared Channel (PUSCH), or Physical Random Access Channel (PRACH)).

The base station device 30 notifies the communication control device 40 of the information regarding the Capability of the subordinate terminal device and the base station device itself (step S1503). On the other hand, the communication control device 40 acquires the information on the Capability from the base station device 30 (step S1504).

Examples of the information regarding the Capability of the base station device include the number of connectable terminal devices, the number of currently connected terminal devices, and the maximum number of frequency channels or the number of cells that can be provided to the terminal device in addition to the same information as the Capability of the terminal. Further, the examples of the information regarding the Capability of the base station device include the QoS class that can be provided to the terminal device 20, the position information (a latitude, a longitude, an altitude, or the like) of the base station device, and the mobility (fixation, portability, speed, or the like) of the base station device 30.

The base station device 30 notifies the communication control device 40 of a request regarding spectrum sharing (step S1505). On the other hand, the communication control device 40 acquires the request from the base station device 30 (step S1506). Here, examples of this request include the number of required frequency channels including the frequency channel targeted for the spectrum sharing with the primary system, frequency channel numbers, the total of frequency bandwidths, and required transmission power.

The communication control device 40 acquires information regarding the communication device 10 of the primary system (step S1507). Examples of this acquisition source include a database prepared by a country/region, a ministry, a government agency, and an equivalent organization. Further, for example, when the information regarding the communication device 10 of the primary system is designated in advance by law or the like, the information recorded in advance may be extracted. Examples of the information regarding the communication device 10 of this primary system include the position information (a latitude, a longitude, an altitude, ground/air, or the like) of the communication device, the mobility and flight (movement) path of the communication device, the service area (a latitude, a longitude, an altitude, or the like of the service area) of the primary system, the acceptable interference amount of the communication device, an acceptable Signal-to-Interference Ratio (SIR), an acceptable Signal-to-Interference-plus-Noise Ratio (SINR), an acceptable Carrier-to-Noise Ratio (CIR), an acceptable Carrier-to-Interference-plus-Noise Ratio (CINR), and an acceptable Interference-to-Noise Ratio (INR).

The selection unit 441 of the communication control device 40 sets the interference protection target space of the primary system according to the above-described criterion and the like (step S1508). Here, by using information such as the position information and mobility of the communication device 10 of the primary system and the communication device of the secondary system and the frequency channel for which the request is made, the surrounding environment and terrain are determined, and the interference protection target space is set.

The selection unit 441 of the communication control device 40 selects the protection target communication device 10 of the primary system by using the interference protection target space set in step S1508 and the acquired information such as the position, mobility, and path of the communication device 10 of the primary system (step S1509).

The selection unit 441 of the communication control device 40 calculates (estimates) the amount of the interference applied from the communication device of the secondary system to the protection target communication device of the primary system selected in step S1509 (step S1510).

The determination unit 443 of the communication control device 40 determines the communication parameters to be used by the communication device of the secondary system of the present invention described above on the basis of the calculation (estimation) result of the applied interference amount (step S1511). Then, the notification unit 445 of the communication control device 40 notifies the base station device 30 of the communication parameters (step S1512). If the request for spectrum sharing includes a desired communication parameter, the communication device of the secondary system may be notified of the result of comparison with the determined "the communication parameters to be used by the communication device".

The base station device 30 acquires the communication parameters to be used by the base station device 30 from the communication control device 40 (step S1513). In this way, in a case where the secondary system is a cellular system, at least one of the base station device and the terminal device acquires communication parameters from the communication management device. Here, from the viewpoint of simplifying signaling, an example is given in which the base station device 30 acquires the communication parameters. However, the terminal device 20 may acquire the communication parameters. Further, in a case where the secondary system is a wireless LAN, at least one of the Access Point (AP) device and the Station (STA) device acquires the communication parameters from the communication control device 40. It is desirable that the AP device acquires the communication parameters as in the case of the cellular system.

The setting unit 344 of the base station device 30 sets the communication parameters of the device itself on the basis of the communication parameters acquired by the notification (step S1514).

The notification unit 345 of the base station device 30 notifies the subordinate terminal device (STA device) 20 of the communication parameters (step S1515). The terminal device 20 acquires the communication parameters notified from the base station device 30 (step S1516).

Here, the base station device 30 may notify and designate the communication parameter acquired from the communication control device 40 as it is or may send notification with a change for the terminal device 20. For example, in a case where the value of the maximum transmission power is acquired from the communication control device 40, the base station device 30 may notify a value smaller than the notified maximum transmission power as the maximum transmission power of the terminal device 20 within a range not exceeding the notified maximum transmission power value. Alternatively, the transmission power of the terminal device 20 may be controlled so as not to exceed the notified maximum transmission power.

The notification from the base station device 30 to the terminal device 20 may be executed by using at least a part of RRC signaling, system information (SI), and downlink control information (DCI). Further, the notification may be executed by using at least a part of downlink physical channels (Physical Downlink Control Channel (PDCCH), Physical Downlink Shared Channel (PDSCH), and Physical Broadcast Channel (PBCH)). Further, the notification may be executed as signaling of a higher layer. Further, for this notification, at least one frequency channel of the frequency channel targeted for spectrum sharing and the frequency channel not targeted for spectrum sharing is used.

The setting unit 244 of the terminal device 20 sets the communication parameters of the device itself on the basis of the communication parameters acquired by the notification (step S1517). Then, communication is performed with another communication device (the base station device 30 is the communication partner in the case of uplink communication, and the terminal device 20 is the communication partner in the case of downlink communication) of the secondary system. For example, the wireless communication control unit 346 of the base station device 30 controls the wireless communication unit 31 to communicate with the terminal device 20, and the wireless communication control unit 246 of the terminal device 20 controls the wireless communication unit 21 to communicate with the base station device 30 (step S1518 and step S1519). This communication is executed by using the frequency channel targeted for spectrum sharing.

Figure 62:
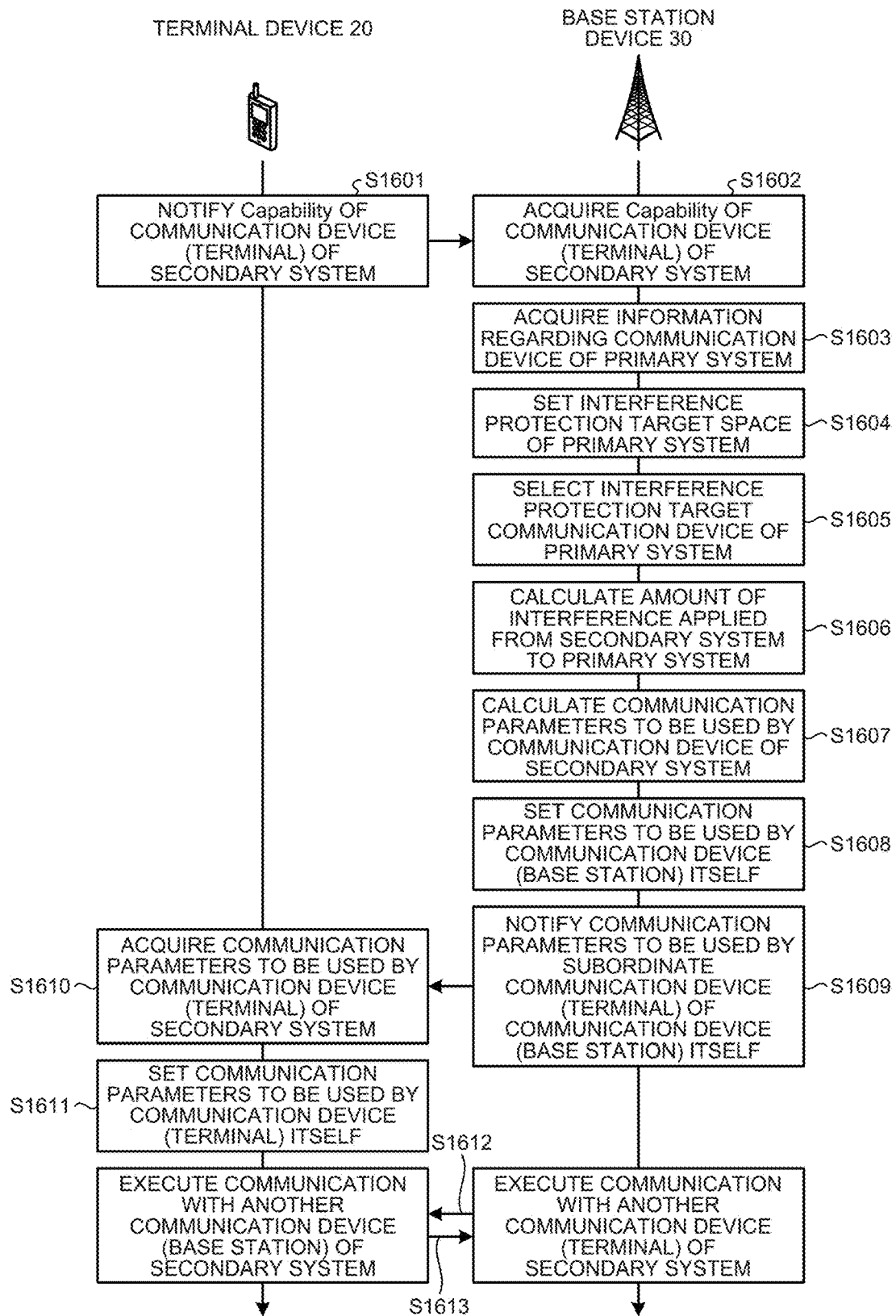
FIG. 62 is a diagram illustrating an example of the signaling procedure.

FIG. 62 is a diagram illustrating an example of the signaling procedure. FIG. 62 illustrates an example in which the protection target selection and the interference calculation are executed by the communication device of the secondary system. For example, in a case where the communication device of the secondary system is executed, it is desirable that the communication device is a base station device or an access point device from the viewpoint of a calculation capability or the notification and setting of the communication parameters after calculation. Here, as an example, an example is given in which the base station device 30 also serves as the communication control device 40. Incidentally, the information on the Capability regarding the terminal device 20 is used by the base station device 30 itself. The information regarding the communication device of the primary system is acquired from a database prepared by a country/region, a ministry, a government agency, and an equivalent organization or from the communication control device 40 or the like.

As illustrated in FIG. 62, the terminal device 20 notifies the connection-destination base station device of the information regarding the Capability of the terminal device 20 itself (step S1601). In response to this, the base station device 30 acquires the information regarding the Capability notified in step S1601 from the terminal device 20 (step S1602).

The base station device 30 acquires information regarding the communication device 10 of the primary system (step S1603). Examples of this acquisition source include a database prepared by a country/region, a ministry, a government agency, and an equivalent organization. Further, for example, when the information regarding the communication device 10 of the primary system is designated in advance by law or the like, the information recorded in advance may be extracted.

The selection unit 341 of the base station device 30 sets the interference protection target space of the primary system according to the above-described criterion and the like (step S1604). The selection unit 341 of the base station device 30 selects the protection target communication device 10 of the primary system by using the interference protection target space set in step S1604 and the acquired information such as the position, mobility, and path of the communication device 10 of the primary system (step S1605).

The calculation unit 342 of the base station device 30 calculates (estimates) the amount of the interference applied from the communication device of the secondary system with respect to the protection target communication device of the primary system selected in step S1605 (step S1606).

On the basis of the calculation (estimation) result of the applied interference amount, the determination unit 343 of the base station device 30 determines the communication parameters to be used by the communication device of the secondary system as described above (step S1607). Then, the setting unit 344 of the base station device 30 sets the communication parameters of the device itself on the basis of the communication parameters acquired by the notification (step S1608).

Then, the notification unit 345 of the base station device 30 notifies the subordinate terminal device (STA device) 20 of the communication parameters (step S1609). The terminal device 20 acquires the communication parameters notified from the base station device 30 (step S1610).

The setting unit 244 of the terminal device 20 sets the communication parameters of the device itself on the basis of the communication parameters acquired by the notification (step S1611). Then, communication is performed with another communication device (the base station device 30 is the communication partner in the case of uplink communication, and the terminal device 20 is the communication partner in the case of downlink communication) of the secondary system. For example, the wireless communication control unit 346 of the base station device 30 controls the wireless communication unit 31 to communicate with the terminal device 20, and the wireless communication control unit 246 of the terminal device 20 controls the wireless communication unit 21 to communicate with the base station device 30 (step S1612 and step S1613). This communication is executed by using the frequency channel targeted for spectrum sharing.

Figure 63:
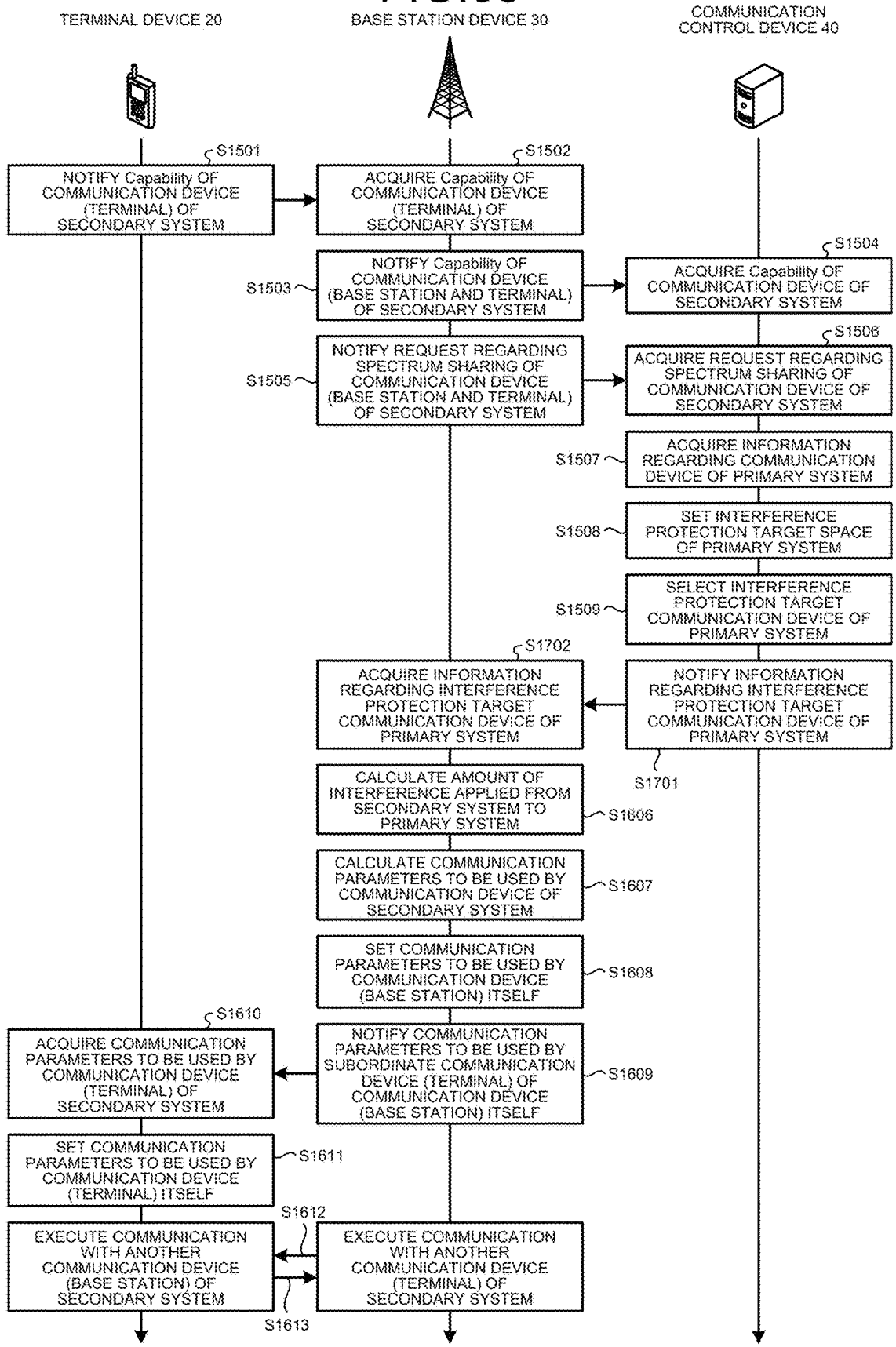
FIG. 63 is a diagram illustrating an example of the signaling procedure.

FIG. 63 is a diagram illustrating an example of the signaling procedure. FIG. 63 illustrates an example in which the protection target selection and the interference calculation of the present invention are executed by different devices. As an example of the different devices, the communication control device 40 executes the protection target selection, and the base station device 30 executes the interference calculation (and the calculation of the communication parameters of the communication device of the secondary system). The executing devices may have the opposite relationship.

In the case of the example of FIG. 63, the notification unit 445 of the communication control device 40 notifies the base station device of the secondary system of the information regarding the result of executing the protection target selection (step S1701). The process up to step S1701 is the same as the sequence illustrated in FIG. 61.

The base station device 30 acquires the information regarding the result of the protection target selection from the communication control device 40 (step S1702). Examples of the information regarding the result of the protection target selection include the position information (a latitude, a longitude, an altitude, ground/air, or the like) of the communication device, the mobility and flight (movement) path of the communication device, the service area (a latitude, a longitude, an altitude, or the like of the service area) of the primary system, the acceptable interference amount of the communication device, an acceptable Signal-to-Interference Ratio (SIR), an acceptable Signal-to-Interference-plus-Noise Ratio (SINR), and an acceptable Interference-to-Noise Ratio (INR). Subsequent processing is the same as the sequence illustrated in FIG. 62.

Figure 64:
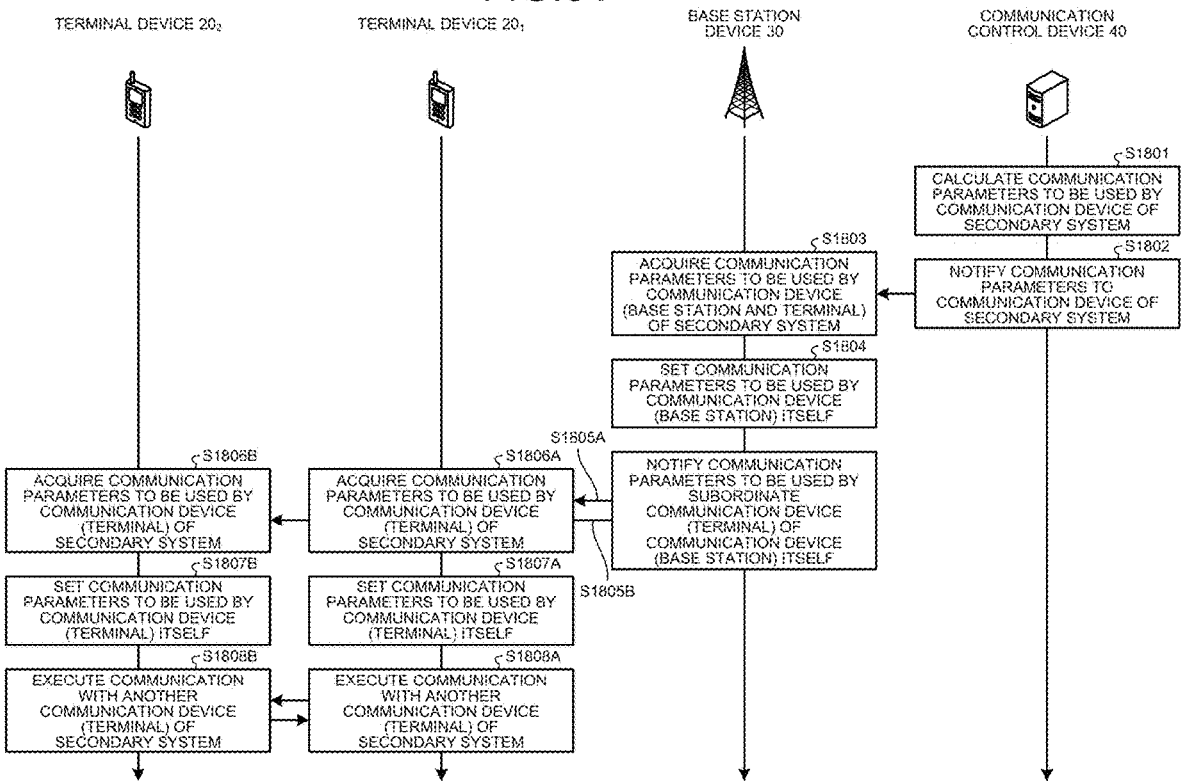
FIG. 64 is a diagram illustrating an example of the signaling procedure.

FIG. 64 is a diagram illustrating an example of the signaling procedure. FIG. 64 illustrates an example of the signaling procedure in a case where terminal-to-terminal communication, Device-to-Device (D2D), and Vehicle-to-Everything (V2X) are assumed as the communication of the secondary system. Further, in FIG. 64, the illustration is given from a point where the communication parameters of the communication device of the secondary system are calculated by the communication control device 40 in order to avoid duplication with the above description.

As illustrated in FIG. 64, the determination unit 443 of the communication control device 40 determines the communication parameters of the communication device of the secondary system (step S1801). Thereafter, the notification unit 445 of the communication control device 40 notifies the base station device 30 of the communication parameters (step S1802).

The base station device 30 acquires the communication parameters to be used by the base station device 30 from the communication control device 40 (step S1803). The setting unit 344 of the base station device 30 sets the communication parameters of the device itself on the basis of the communication parameters acquired by the notification (step S1804).

The notification unit 345 of the base station device 30 notifies the subordinate terminal devices $20_1$ and $20_2$ of the communication parameters (step S1805A and step S1805B).

The terminal-to-terminal communication, the D2D, and the V2X may be executed by using physical sidelink channels (Physical Sidelink Control Channel (PSCCH), Physical Sidelink Shared Channel (PSSCH), and Physical Sidelink Broadcast Channel (PSBCH)).

In a case where the target frequency channel for spectrum sharing is used for the side link, the communication parameter may be notified, acquired, and set in the form associated with a side link resource pool in the target frequency channel. The resource pool is side link wireless resources set by specific frequency resources (for example, Resource Blocks and Component Carriers) and time resources (for example, Radio Frames, Subframes, Slots, and Mini-slots). In a case where the resource pool is set within the frequency channel targeted for spectrum sharing, it is set by at least one of the RRC signaling, the system information, or the downlink control information from the base station device to the terminal device. Then, the communication parameters to be applied in the resource pool and the side link are also set by at least one of the RRC signaling, the system information, or the downlink control information from the base station device to the terminal device. The notification of the resource pool setting and the notification of the communication parameter to be used in the side link may be simultaneous or individual.

The terminal devices $20_1$ and $20_2$ acquire the communication parameters notified from the base station device (step S1806A and step S1806B).

The setting unit 244 of the terminal devices $20_1$ and $20_2$ sets the communication parameters of the device itself on the basis of the communication parameters acquired by the notification (step S1807A and step S1807B). Then, the wireless communication control unit 246 of the terminal devices $20_1$ and $20_2$ controls the wireless communication unit 21 to communicate with another terminal device 20 (step S1808A and step S1808B). This communication is executed by using the frequency channel targeted for spectrum sharing.

Incidentally, in a case where communication is executed by using the frequency channel targeted for spectrum sharing and the frequency channel not targeted therefor (for example, Carrier Aggregation, Dual-Connectivity, Multi-Connectivity, and Channel Bonding), at least some of the communication parameters used in each frequency channel may differ from each other. For example, the maximum transmission power and the value of the transmission power may be set to be different values for the frequency channel which is the target of spectrum sharing and the frequency channel which is not the target.

Figure 65:
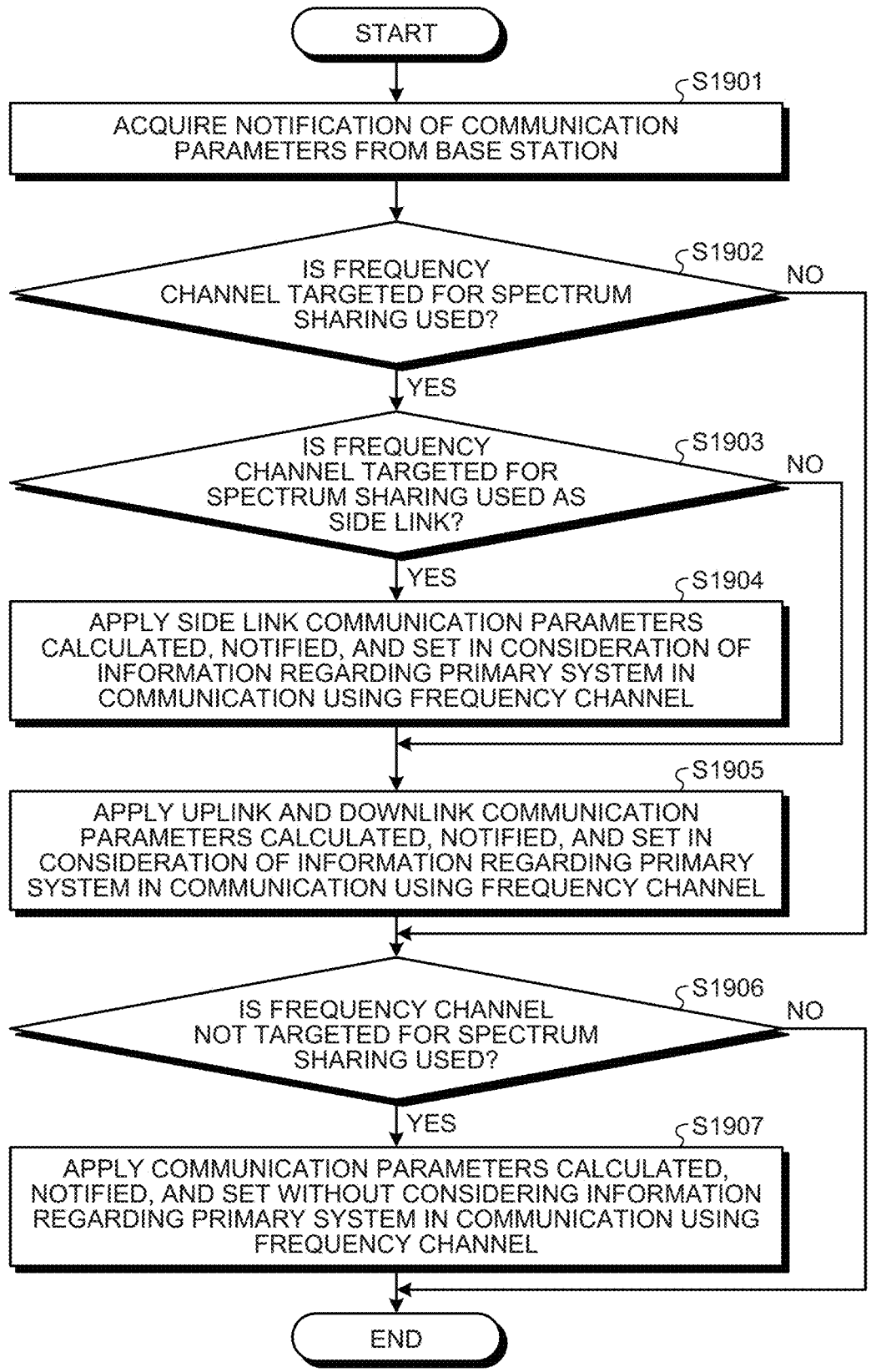
FIG. 65 is a diagram illustrating an example of an application flow of the communication parameters.

FIG. 65 is a diagram illustrating an example of an application flow of the communication parameters. FIG. 65 illustrates an example of the frequency channel which is the target of spectrum sharing or the frequency channel which is not the target of spectrum sharing. For example, in the maximum transmission power and the transmission power, it is desirable that the value used in the frequency channel targeted for spectrum sharing is smaller than the value used in the frequency channels not targeted for spectrum sharing. Further, the maximum transmission power and the transmission power used in the frequency channel which is the target of spectrum sharing may be notified, acquired, and set in the form of the difference from the maximum transmission power and the transmission power used in the frequency channel which is not the target of spectrum sharing.

Here, as an example, the operation subject of the flow is described as the terminal device 20. As illustrated in FIG. 65, the setting unit 244 of the terminal device 20 acquires the notification of the communication parameter from the base station device 30 (step S1901).

Here, in a case where the frequency channel targeted for spectrum sharing is used (step S1902 Yes), the setting unit 244 of the terminal device 20 determines whether or not to use the frequency channel targeted for spectrum sharing as a side link (step S1903). Incidentally, in a case where the frequency channel targeted for spectrum sharing is not used (step S1902 No), the process skips to the process of step S1906.

At this time, in a case where the frequency channel targeted for spectrum sharing is used as a side link (step S1903 Yes), the setting unit 244 of the terminal device 20 applies the side link communication parameters calculated, notified, and set in consideration of the information regarding the primary system in the communication using the frequency channel (step S1904). Incidentally, in a case where the frequency channel targeted for spectrum sharing is used as a side link (step S1903 No), the process skips to the process of step S1905.

Thereafter, the setting unit 244 of the terminal device 20 applies the uplink and downlink communication parameters calculated, notified, and set in consideration of the information regarding the primary system in the communication using the frequency channel (step S1905).

In a case where the frequency channel not targeted for spectrum sharing is used (step S1906 Yes), the setting unit 244 of the terminal device 20 applies the communication parameters calculated, notified, and set without considering the information regarding the primary system in the communication using the frequency channel (step S1907). Incidentally, in a case where the frequency channel not targeted for spectrum sharing is not used (step S1906 No), the process of step S1907 is skipped.

7. Modification

The above-described embodiment describes examples, and various modifications and applications are possible.

<7-1. Modification Regarding System Configuration>

The communication control device 40 of this embodiment is not limited to the device described in the above-described embodiment. For example, the communication control device 40 may be a device having a function other than controlling the base station device 30 which secondarily uses the frequency band in which the spectrum sharing is performed. For example, the network manager may include the function of the communication control device 40 of this embodiment. At this time, the network manager may be, for example, a Centralized Base Band Unit (C-BBU) having a network configuration called a Centralized Radio Access Network (C-RAN) or a device including the C-BBU. Further, the base station (including the access point) may have the function of the network manager. These devices (the network manager or the like) can also be regarded as the communication control device.

Incidentally, in the above-described embodiment, the communication system 1 is the first wireless system, and the base station device 30 is the second wireless system. However, the first wireless system and the second wireless system are not limited to this example. For example, the first wireless system may be a communication device (for example, the wireless communication device 10), and the second wireless system may be a communication system (communication system 2). Incidentally, the wireless system appearing in this embodiment is not limited to a system configured by a plurality of devices, and can be appropriately replaced with a "device", a "terminal", or the like.

In the above-described embodiment, the communication control device 40 is assumed to be a device belonging to the communication system 2 but does not necessarily have to be a device belonging to the communication system 2. The communication control device 40 may be an external device of the communication system 2. The communication control device 40 may not directly control the base station device 30 and may indirectly control the base station device 30 via a device configuring the communication system 2. Further, there may be a plurality of secondary systems (communication system 2). At this time, the communication control device 40 may manage a plurality of secondary systems. In this case, each secondary system can be regarded as the second wireless system.

Incidentally, generally, in spectrum sharing, the incumbent system which uses a target band is called the primary system, and the secondary user is called the secondary system. However, the primary system and the secondary system may be replaced with other terms. A macro cell in Heterogeneous Network (HetNET) may be the primary system, and a small cell or a relay station may be the secondary system. Further, the base station may be the primary system, and the Relay UE or Vehicle UE which realizes D2D or Vehicle-to-Everything (V2X) existing in the coverage thereof may be the secondary system. The base station is not limited to the fixed type and may be a portable type/mobile type.

The interface between entities may be wired or wireless. For example, the interface between entities (the communication device, the communication control device, or the terminal device) appearing in this embodiment may be a wireless interface which does not depend on spectrum sharing. Examples of the wireless interface which does not depend on spectrum sharing include a wireless interface which is provided by a mobile network operator via a licensed band and a wireless LAN communication which uses an incumbent unlicensed band.

<7-2. Another Modification>

The control device for controlling the wireless communication device 10, the terminal device 20, the base station device 30, the communication control device 40, or the proxy device 50 of this embodiment may be realized by a dedicated computer system or may be realized by a general-purpose computer system.

For example, a program for executing the above-described operations is stored and distributed in a computer-readable recording medium such as an optical disk, a semiconductor memory, a magnetic tape, and a flexible disk. Then, for example, the control device is configured by installing the program in a computer and executing the above-described processing. At this time, the control device may be an external device (for example, a personal computer) of the wireless communication device 10, the terminal device 20, the base station device 30, the communication control device 40, or the proxy device 50. Further, the control device may be an internal device (for example, the control unit 24, the control unit 34, the control unit 44, or the control unit 54) of the wireless communication device 10, the terminal device 20, the base station device 30, the communication control device 40, or the proxy device 50.

The communication program may be stored in a disk device included in a server device on a network such as the Internet so as to be downloaded to a computer, or the like. Further, the above-described functions may be realized by cooperation between an Operating System (OS) and application software. In this case, a part other than the OS may be stored and distributed in a medium, and the part other than the OS may be stored in the server device, so as to be downloaded to a computer, or the like.

Among the processing described in the above embodiment, all or part of the processing described as being automatically performed may be manually performed, or all or part of the processing described as being manually performed may be automatically performed by a known method. In addition, the processing procedures, specific names, information including various data and parameters described in the above-described specification and drawings may be arbitrarily changed unless otherwise specified. For example, the various information illustrated in each drawing is not limited to the illustrated information.

Each component of each device illustrated in the drawings is functionally conceptual, and does not necessarily have to be physically configured as illustrated. That is, the specific form of distribution and integration of each device is not limited to the illustrated one, and all or part of the device may be configured to be functionally or physically distributed and integrated in arbitrary units according to various loads, use conditions, and the like.

The above-described embodiment can be appropriately combined in an area in which the processing contents do not contradict each other. Further, the order of each step shown in the sequence diagram or the flowchart of this embodiment may be changed as appropriate.

8. Conclusion

As described above, according to one embodiment of the present disclosure, the communication control device 40 selects which aerial communication device of the primary system is necessarily considered as the protection target of interference from the communication devices of the secondary system.

In the aerial communication device of the primary system selected in this way, the interference from the communication device of the secondary system to the aerial communication device of the primary system is controlled to a predetermined level or less.

As a result, the opportunity to realize spectrum sharing between the secondary system and the primary system is promoted as compared with Patent Literature 1 described above, and thus it becomes possible to suppress that the improvement of utilization efficiency of finite frequency resources is hindered. As a result, the efficient use of radio resources is realized.

Although the embodiments of the present disclosure have been described above, the technical scope of the present disclosure is not limited to the above-described embodiments as they are, and various modifications may be made without departing from the gist of the present disclosure. Further, the component may be combined suitably over different embodiments and the modification.

The effects in each embodiment described in this specification are merely examples and are not limited, and other effects may be present.

Incidentally, this technology may also be configured as below.

(1)

A communication control device comprising: a selection unit that selects, on a basis of a protection target range which is set to air above a communication device of a second wireless system on a basis of a position of the communication device of the second wireless system which secondarily uses a frequency resource primarily used by a first wireless system, a communication device of the first wireless system as a target for calculating interference applied by the communication device of the second wireless system.

(2)

The communication control device according to (1), wherein
the selection unit sets a boundary of the protection target range on a basis of an elevation angle based on the position of the communication device of the second wireless system.

(3)

The communication control device according to (2), wherein
the selection unit sets the protection target range on a basis of a surrounding environment of the communication device of the second wireless system.

(4)

The communication control device according to (2), wherein
the selection unit sets the protection target range on a basis of a frequency resource secondarily used by the second wireless system.

(5)

The communication control device according to (2), wherein
the selection unit sets the elevation angle within a predetermined upper limit or within a range not deviating from a predetermined lower limit.

(6)

The communication control device according to (2), wherein
the selection unit sets the protection target range on a basis of a position, a moving speed, or a flight path of the communication device of the first wireless system.

(7)

The communication control device according to (6), wherein
the flight path includes time series data of coordinates regarding the communication device of the first wireless system, and
the selection unit sets a start point and an end point of the time series data of the coordinates to be compared with the protection target range on a basis of a time interval at which the calculation of the interference is performed.

(8)

The communication control device according to (1), further comprising:
a calculation unit that calculates an interference amount or an aggregated interference amount applied to the communication device of the first wireless system by the communication device of the second wireless system.

(9)

The communication control device according to (8), wherein
the calculation unit performs calculation of the interference amount in different calculation methods depending on whether or not the communication device of the first wireless system is included in the protection target range.

(10)

The communication control device according to (9), wherein
parameters used for calculating an amount of interference with the communication device of the first wireless system included in the protection target range are more than parameters used for calculating an amount of interference with the communication device of the first wireless system not included in the protection target range.

(11)

The communication control device according to (10), wherein the calculation unit uses radio wave propagation characteristics between the communication device of the first wireless system and the communication device of the second wireless system or antenna characteristics in calculating the amount of the interference with the communication device of the first wireless system included in the protection target range and does not use the radio wave propagation characteristics between the communication device of the first wireless system and the communication device of the second wireless system or the antenna characteristics in calculating the amount of the interference with the communication device of the first wireless system not included in the protection target range.

(12)

The communication control device according to (8), further comprising:

a determination unit that determines communication parameters of the communication device of the second wireless system on a basis of the interference amount or the aggregated interference amount calculated by the calculation unit.

(13)

The communication control device according to (8), wherein the calculation unit sets a reference point for calculating the interference applied to the communication device of the first wireless system for each communication device of the second wireless system and calculates the amount of the interference applied to the communication device of the first wireless system.

(14)

The communication control device according to (13), wherein the reference points are arranged on a straight line from the communication device of the second wireless system.

(15)

The communication control device according to (13), wherein the reference points are arranged at equal intervals on a straight line from the communication device of the second wireless system.

(16)

The communication control device according to (13), wherein the reference points are arranged at different intervals on a straight line from the communication device of the second wireless system.

(17)

The communication control device according to (13), wherein a reference point having a shortest distance from the communication device of the second wireless system differs depending on a straight line.

(18)

The communication control device according to (12), further comprising:

a notification unit that notifies another communication device of the second wireless system of the communication parameters determined by the determination unit.

(19)

A communication device comprising: a selection unit that selects, on a basis of a protection target range which is set to air above a communication device of a second wireless system on a basis of a position of the second wireless system which secondarily uses a frequency resource primarily used by a first wireless system, a communication device of the first wireless system as a target for calculating interference applied by the communication device of the second wireless system.

(20)

The communication device according to (19), in which the selection unit sets a boundary of the protection target range on a basis of an elevation angle based on the position of the communication device of the second wireless system.

(21)

The communication device according to (19), further including:

a calculation unit that calculates an interference amount or an aggregated interference amount applied to the communication device of the first wireless communication system by the communication device of the second wireless system.

(22)

A communication control method for causing a computer to execute: selecting, on a basis of a protection target range which is set to air above a communication device of a second wireless system on a basis of a position of the second wireless system which secondarily uses a frequency resource primarily used by a first wireless system, a communication device of the first wireless system as a target for calculating interference applied by the communication device of the second wireless system.

(23)

The communication control method according to (22), in which the selection unit sets a boundary of the protection target range on a basis of an elevation angle based on the position of the communication device of the second wireless system.

(24)

The communication control method according to (22), in which a calculation unit is further provided which calculates an interference amount or an aggregated interference amount applied to the communication device of the first wireless communication system by the communication device of the second wireless system.

REFERENCE SIGNS LIST 1, 2 COMMUNICATION SYSTEM
10 COMMUNICATION DEVICE
20 Terminal device
30 BASE STATION DEVICE
40 Communication control device
50 PROXY DEVICE
21, 31, 41, 51 WIRELESS COMMUNICATION UNIT
22, 32, 42, 52 STORAGE UNIT
23 INPUT/OUTPUT UNIT
33, 43, 53 NETWORK COMMUNICATION UNIT 24, 34, 44, 54 CONTROL UNIT
211, 311 RECEPTION PROCESSING UNIT
212, 312 TRANSMISSION PROCESSING UNIT
241, 341, 441, 541 SELECTION UNIT
242, 342, 442, 542 CALCULATION UNIT
243, 343, 443, 543 DETERMINATION UNIT
244, 344 SETTING UNIT
345, 445, 545 NOTIFICATION UNIT
246, 346 WIRELESS COMMUNICATION CONTROL UNIT

The invention claimed is:

1. A communication control device, comprising:
a selection unit that selects, on a basis of a protection target range which is set to air above a communication device of a second wireless system on a basis of a position of the communication device of the second wireless system which secondarily uses a frequency resource primarily used by a first wireless system, a communication device of the first wireless system as a target for calculating interference applied by the communication device of the second wireless system.

2. The communication control device according to claim 1, wherein
the selection unit sets a boundary of the protection target range on a basis of an elevation angle based on the position of the communication device of the second wireless system.

3. The communication control device according to claim 2, wherein
the selection unit sets the protection target range on a basis of a surrounding environment of the communication device of the second wireless system.

4. The communication control device according to claim 2, wherein
the selection unit sets the protection target range on a basis of a frequency resource secondarily used by the second wireless system.

5. The communication control device according to claim 2, wherein
the selection unit sets the elevation angle within a predetermined upper limit or within a range not deviating from a predetermined lower limit.

6. The communication control device according to claim 2, wherein
the selection unit sets the protection target range on a basis of a position, a moving speed, or a flight path of the communication device of the first wireless system.

7. The communication control device according to claim 6, wherein
the flight path includes time series data of coordinates regarding the communication device of the first wireless system, and
the selection unit sets a start point and an end point of the time series data of the coordinates to be compared with the protection target range on a basis of a time interval at which the calculation of the interference is performed.

8. The communication control device according to claim 1, further comprising:
a calculation unit that calculates an interference amount or an aggregated interference amount applied to the communication device of the first wireless system by the communication device of the second wireless system.

9. The communication control device according to claim 8, wherein
the calculation unit performs calculation of the interference amount in different calculation methods depending on whether or not the communication device of the first wireless system is included in the protection target range.

10. The communication control device according to claim 9, wherein
parameters used for calculating an amount of interference with the communication device of the first wireless system included in the protection target range are more than the parameters used for calculating the amount of interference with the communication device of the first wireless system not included in the protection target range.

11. The communication control device according to claim 10, wherein
the calculation unit uses radio wave propagation characteristics between the communication device of the first wireless system and the communication device of the second wireless system or antenna characteristics in calculating the amount of the interference with the communication device of the first wireless system included in the protection target range and does not use the radio wave propagation characteristics between the communication device of the first wireless system and the communication device of the second wireless system or the antenna characteristics in calculating the amount of the interference with the communication device of the first wireless system not included in the protection target range.

12. The communication control device according to claim 8, further comprising:
a determination unit that determines communication parameters of the communication device of the second wireless system on a basis of the interference amount or the aggregated interference amount calculated by the calculation unit.

13. The communication control device according to claim 12, further comprising:
a notification unit that notifies another communication device of the second wireless system of the communication parameters determined by the determination unit.

14. The communication control device according to claim 8, wherein
the calculation unit sets a reference point for calculating the interference amount applied to the communication device of the first wireless system for each communication device of the second wireless system and calculates the interference amount applied to the communication device of the first wireless system.

15. The communication control device according to claim 14, wherein reference points are arranged on a straight line from the communication device of the second wireless system.

16. The communication control device according to claim 14, wherein reference points are arranged at equal intervals on a straight line from the communication device of the second wireless system.

17. The communication control device according to claim 14, wherein reference points are arranged at different intervals on a straight line from the communication device of the second wireless system.

18. The communication control device according to claim 14, wherein the reference point having a shortest distance from the communication device of the second wireless system differs depending on a straight line.

19. A communication device, comprising:
a selection unit that selects, on a basis of a protection target range which is set to air above a communication device of a second wireless system on a basis of a position of the second wireless system which secondarily uses a frequency resource primarily used by a first wireless system, a communication device of the first wireless system as a target for calculating interference applied by the communication device of the second wireless system.

20. A communication control method, comprising:
selecting, on a basis of a protection target range which is set to air above a communication device of a second wireless system on a basis of a position of the second wireless system which secondarily uses a frequency resource primarily used by a first wireless system, a communication device of the first wireless system as a target for calculating interference applied by the communication device of the second wireless system.

* * * * *